United States Patent
Thayumanavan et al.

(10) Patent No.: US 9,012,584 B2
(45) Date of Patent: Apr. 21, 2015

(54) ORGANOBORONATE NANOPARTICLES AND METHODS OF USING THE SAME

(71) Applicants: Sankaran Thayumanavan, Amherst, MA (US); Conghui Yuan, Amherst, MA (US)

(72) Inventors: Sankaran Thayumanavan, Amherst, MA (US); Conghui Yuan, Amherst, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 14/206,142

(22) Filed: Mar. 12, 2014

(65) Prior Publication Data

US 2014/0275417 A1     Sep. 18, 2014

Related U.S. Application Data

(60) Provisional application No. 61/778,007, filed on Mar. 12, 2013.

(51) Int. Cl.
*C08G 79/08*     (2006.01)
*C08L 85/04*     (2006.01)

(52) U.S. Cl.
CPC .................. *C08G 79/08* (2013.01); *C08L 85/04* (2013.01)

(58) Field of Classification Search
CPC ................................ C08G 79/08; C08L 85/04
USPC ................................ 528/7; 524/857; 525/389
See application file for complete search history.

(56) References Cited

U.S. PATENT DOCUMENTS

2006/0258875 A1*    11/2006    Reyes et al. .................... 558/357
2010/0276310 A1*    11/2010    Chen et al. ..................... 206/223

* cited by examiner

*Primary Examiner* — Kelechi Egwim
(74) *Attorney, Agent, or Firm* — Schwegman Lundberg & Woessner, P.A.

(57) ABSTRACT

In various embodiments, the present invention provides an organoboronate nanoparticle. The nanoparticle includes a polymer, which includes a repeating unit that includes at least one organoboronate functional group. Various embodiments provide compositions including the nanoparticles, surface functionalized nanoparticles, nanoparticles including an encapsulant, methods of making the nanoparticles, and methods of using the nanoparticles, such as methods of stimuli-responsive release of encapsulants.

20 Claims, 37 Drawing Sheets

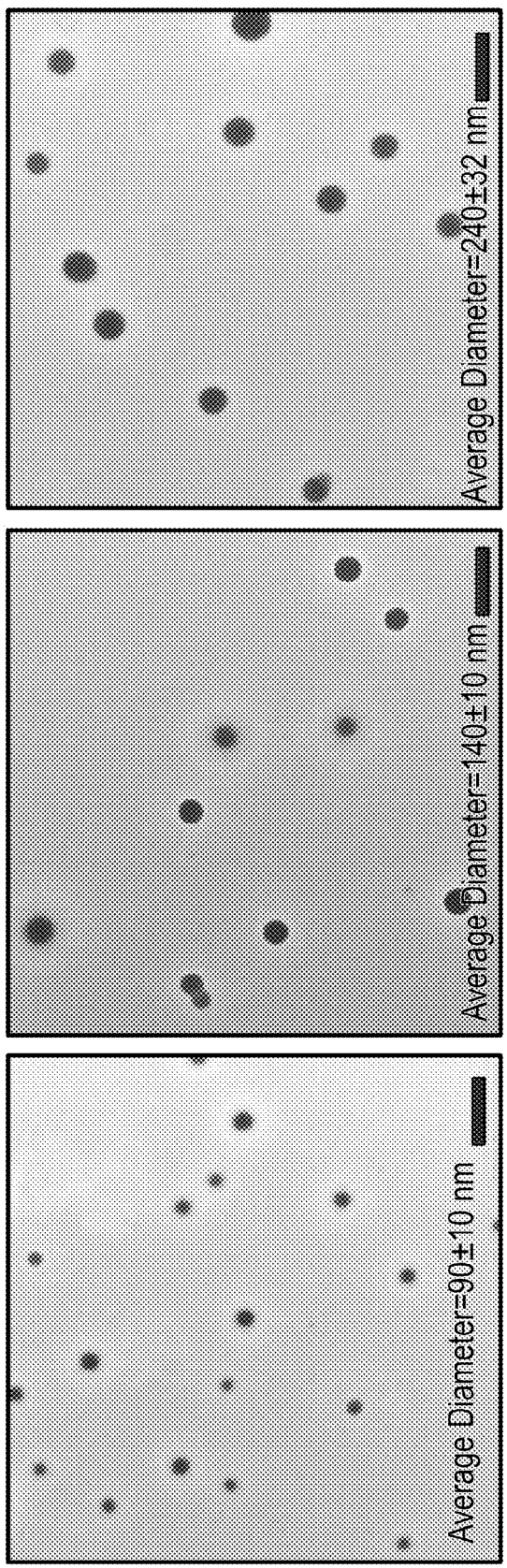

Chemical Shift (ppm)

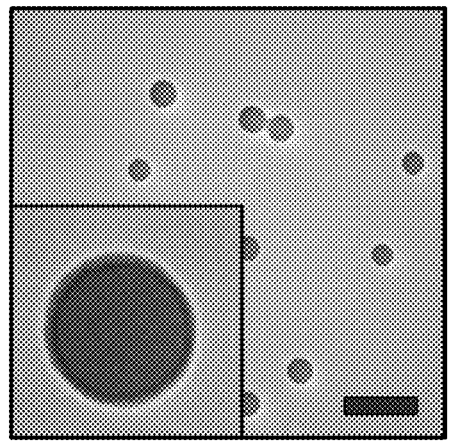 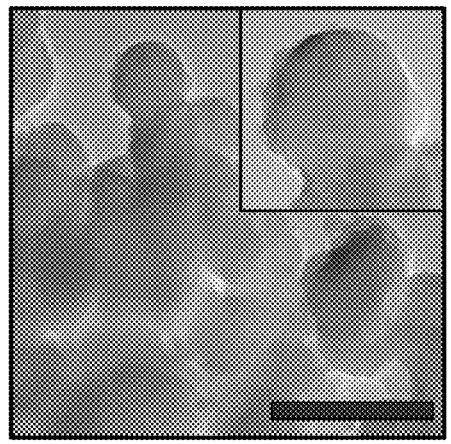
FIG. 19A        FIG. 19B
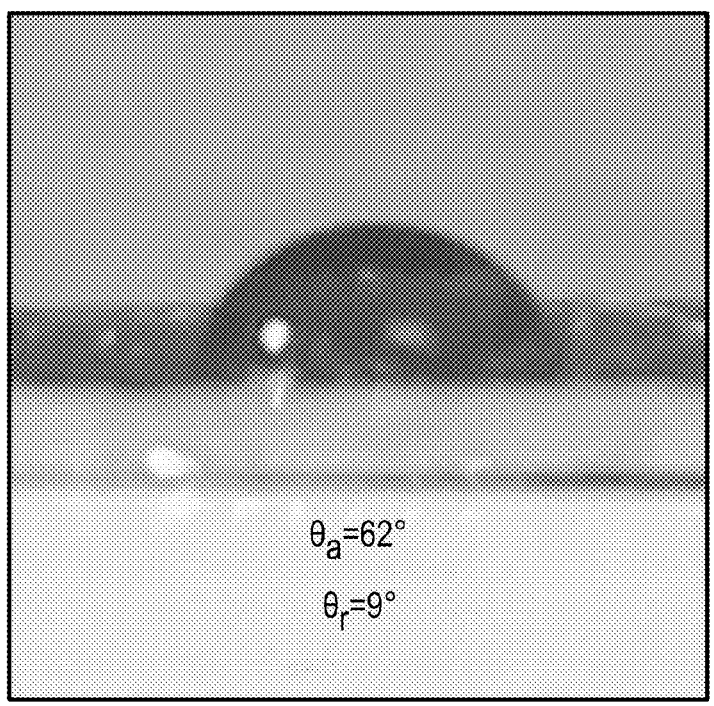
FIG. 20

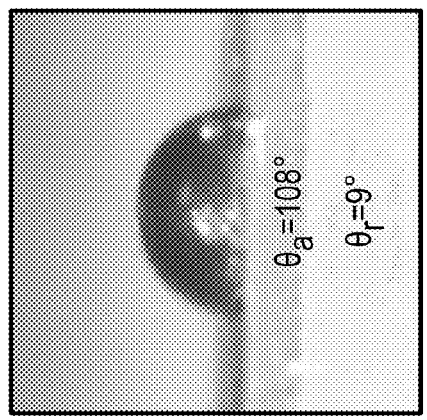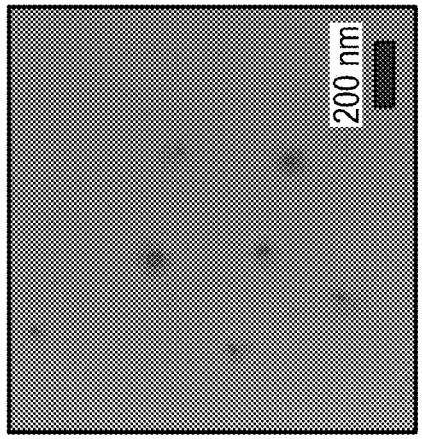
FIG. 22A   FIG. 22B   FIG. 22C
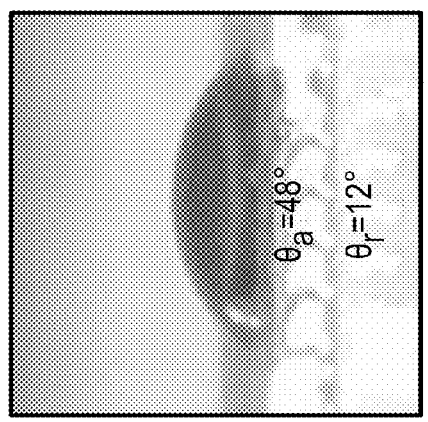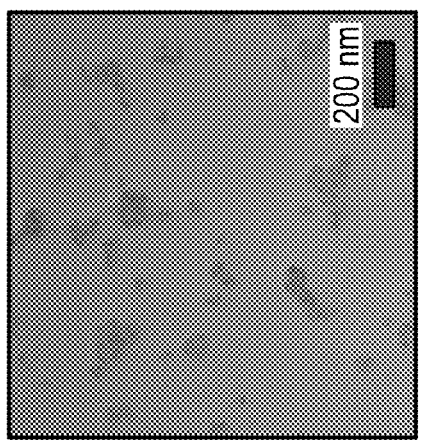
FIG. 23A   FIG. 23B   FIG. 23C

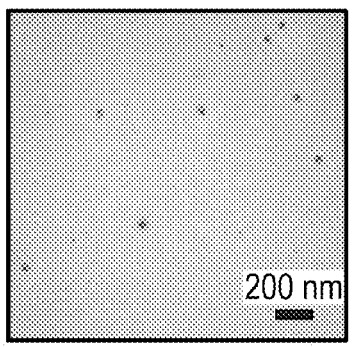 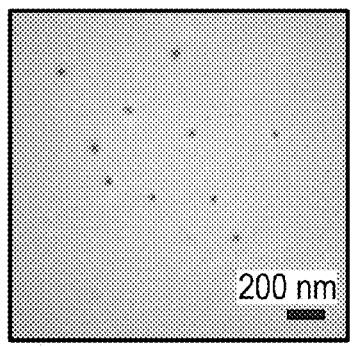 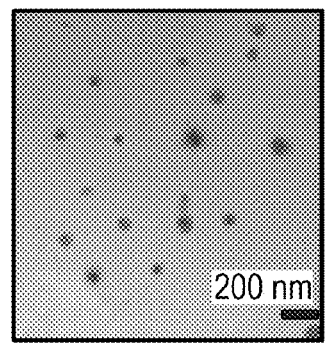
FIG. 24A    FIG. 24B    FIG. 24C
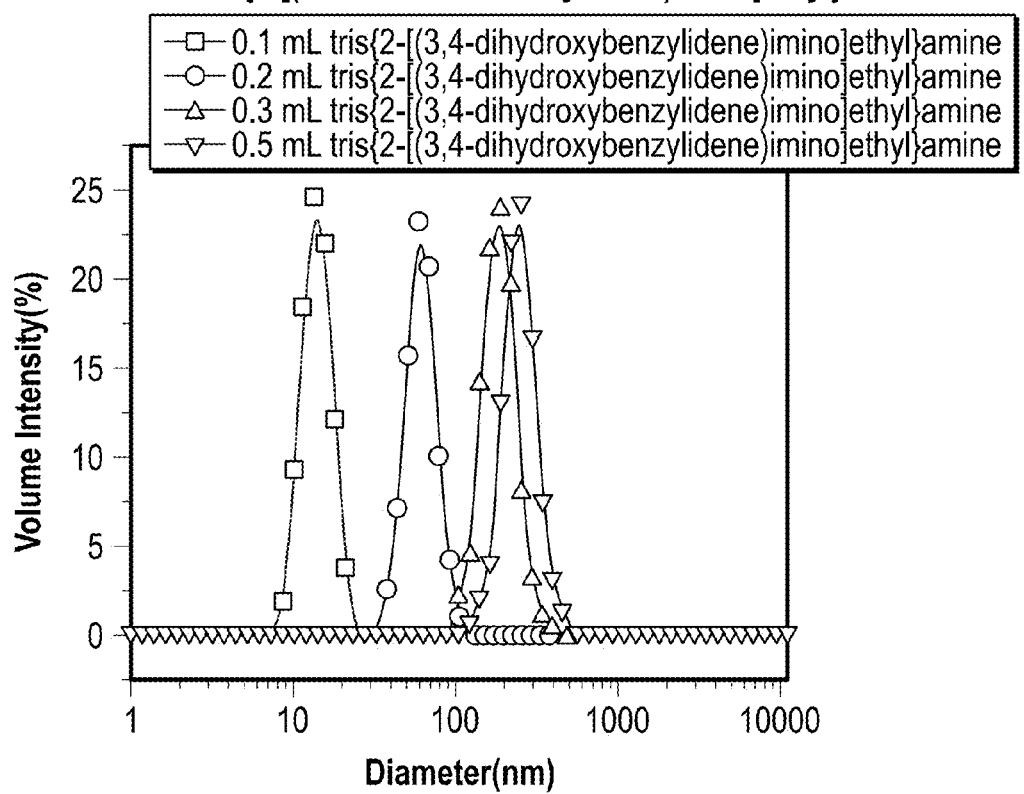
FIG. 25

ORGANOBORONATE NANOPARTICLES AND METHODS OF USING THE SAME

CROSS-REFERENCE TO RELATED APPLICATION

This application claims the benefit of priority to U.S. Provisional Patent Application Ser. No. 61/778,007, filed Mar. 12, 2013, the disclosure of which is incorporated herein in its entirety by reference.

STATEMENT OF GOVERNMENT SUPPORT

This invention was made with Government support under grant W911NF1010313, awarded by the U.S. Army Research Office, and under grant CMMI-1025020 awarded by the National Science Foundation (NSF-NSEC). The U.S. Government has certain rights in this invention.

BACKGROUND OF THE INVENTION

Nanoparticles have been employed in a variety of applications, including biomedicine, sensing, photonics, and catalysis. The extent of impact that a specific system has made in these areas can depend on whether convenient synthetic methods are available. While there has been extensive work with inorganic nanoparticles, organic nanostructures are mainly based on non-covalent supramolecular assemblies of organic small molecules and polymers. Monodisperse, functional organic nanoparticles, which can be achieved through facile synthetic strategies, are rare.

SUMMARY OF THE INVENTION

In various embodiments, the present invention provides an organoboronate nanoparticle. The nanoparticle includes a polymer. The polymer includes a repeating unit that includes at least one organoboronate functional group.

In various embodiments, the present invention provides a polymer. The polymer is a reaction product of a composition including a compound having the structure:

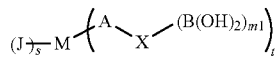

and a compound having the structure:

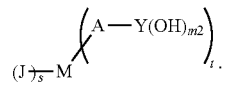

The variable M is independently at each occurrence selected from the group consisting of N, P, and C. At each occurrence s is independently chosen from 0, 1, 2, and 3. At each occurrence t is independently chosen from 1, 2, 3, and 4. If M=N or P then s+t=3 and if M=C then s+t=4. Each of A, X, and Y, independently at each occurrence, is a $(C_{1-15})$hydrocarbyl group, unsubstituted or optionally substituted with at least one J, and optionally interrupted or terminated by one to three amine groups. The variable A is divalent, X has valency of 1+m1, and Y has valency of 1+m2. The variable J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(O)R, N(R)C(S)R, $N(R)C(O)N(R)_2$, $N(R)C(S)N(R)_2$, N(C(O)R)C(O)R, N(OR)R, $C(=NH)N(R)_2$, C(O)N(OR)R, and C(=NOR)R, wherein R is independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J. Each m1 is independently at each occurrence 1 to 5 and each m2 is independently at each occurrence 1 to 5.

In various embodiments, the present invention provides an organoboronate nanoparticle that includes a polymer that is a reaction product of a composition. The composition includes a compound having the structure:

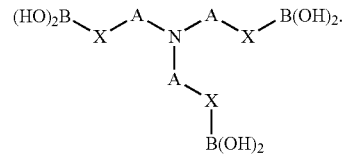

The composition also includes a compound having the structure:

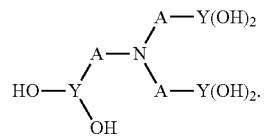

Each of A, X, and Y, independently at each occurrence, is a $(C_{1-15})$hydrocarbyl group, unsubstituted or optionally substituted with at least one J, and optionally interrupted or terminated by one to three amine groups, wherein A and X are divalent, and Y is trivalent. The variable J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(O)R, N(R)C(S)R, $N(R)C(O)N(R)_2$, $N(R)C(S)N(R)_2$, N(C(O)R)C(O)R, N(OR)R, $C(=NH)N(R)_2$, C(O)N(OR)R, and C(=NOR)R. The variable R is independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, and wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J.

In various embodiments, the present invention provides a nanoparticle. The nanoparticle includes a polymer. The repeating unit has the structure:

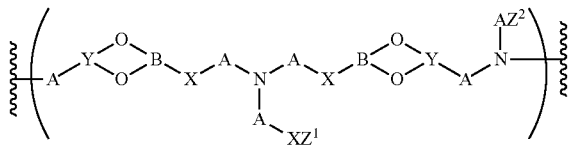

The variable $Z^1$ at each occurrence is independently selected from

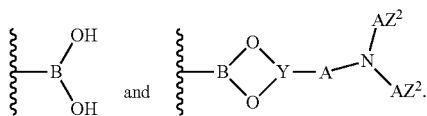

The variable $Z^2$ at each occurrence is independently selected from

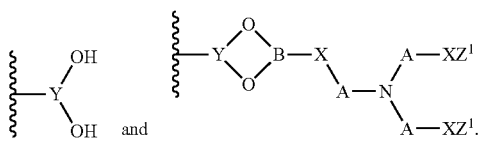

The variable n is about 2 to about 10,000,000, or about 100 to about 100,000. Each of A, X, and Y, independently at each occurrence, is a $(C_{1-15})$hydrocarbyl group, unsubstituted or optionally substituted with at least one J, and optionally interrupted or terminated by one to three amine groups. The variables A and X are divalent, and Y is trivalent. The variable J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, N(R)SO$_2$R, $N(R)SO_2N(R)_2$, N(R)C(O)OR, N(R)C(O)R, N(R)C(S)R, $N(R)C(O)N(R)_2$, $N(R)C(S)N(R)_2$, N(C(O)R)C(O)R, N(OR)R, C(=NH)N(R)_2$, C(O)N(OR)R, and C(=NOR)R, wherein R is independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$ aryl, $(C_1-C_{10})$aralkyl, $(C_1-C_{10})$heterocyclyl, $(C_1-C_{10})$heterocyclyl $(C_1-C_{10})$alkyl, $(C_1-C_{10})$heteroaryl, and $(C_1-C_{10})$heteroaryl $(C_1-C_{10})$alkyl, and wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J.

Various embodiments of the present invention have certain advantages over other nanoparticles, compositions including the same, and methods of using the same.

For example, embodiments of the nanoparticles can be synthesized at lower cost and with greater ease than other nanoparticles, such as other organic nanoparticles. In some embodiments, the nanoparticles can be used to encapsulate materials, such as hydrophobic materials. In some examples, the nanoparticles can encapsulate materials more easily than other nanoparticles. In some embodiments, a greater variety of materials can be encapsulated than in other nanoparticles. In some embodiments, the encapsulated material can be more stably encapsulated than materials encapsulated in other nanoparticles, such as compared to other organic nanoparticles. In some examples, a material encapsulated in the nanoparticle can be controllably released more easily or with greater control than other nanoparticle-encapsulated materials. In some embodiments, the encapsulant can be released from the nanoparticle using a stimuli sensitive release technique, allowing more facile or more controllable release of the encapsulant than other nanoparticles having encapsulants therein.

In some embodiments, the nanoparticles can be synthesized with a high degree of control over the average size of the nanoparticles. In some examples, the control over the size of the nanoparticles can be easier to carry out than size control in other nanoparticle syntheses. In various embodiments, the external surface of the nanoparticles can be more easily functionalized than other nanoparticles. In some examples, the nanoparticles can be used to coat the surface of an object more effectively and efficiently than other nanoparticles.

In some embodiments, the simple synthesis of the nanoparticles can allow the nanoparticles to be more useful than other nanoparticles for a variety of applications, for example, materials applications such as interfacial modifiers, compatibilizers, stimuli-sensitive release materials for, for example, self-healing applications, and biomedical applications such as drug delivery and sensing.

BRIEF DESCRIPTION OF THE FIGURES

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIGS. 5a-c illustrate TEM images of BON synthesized from different concentrations of CTAB, (A) 10.0, (B) 6.0 and (C) 1.0 mg/mL, in accordance with various embodiments.

Figures 8A, 8B, 8C:
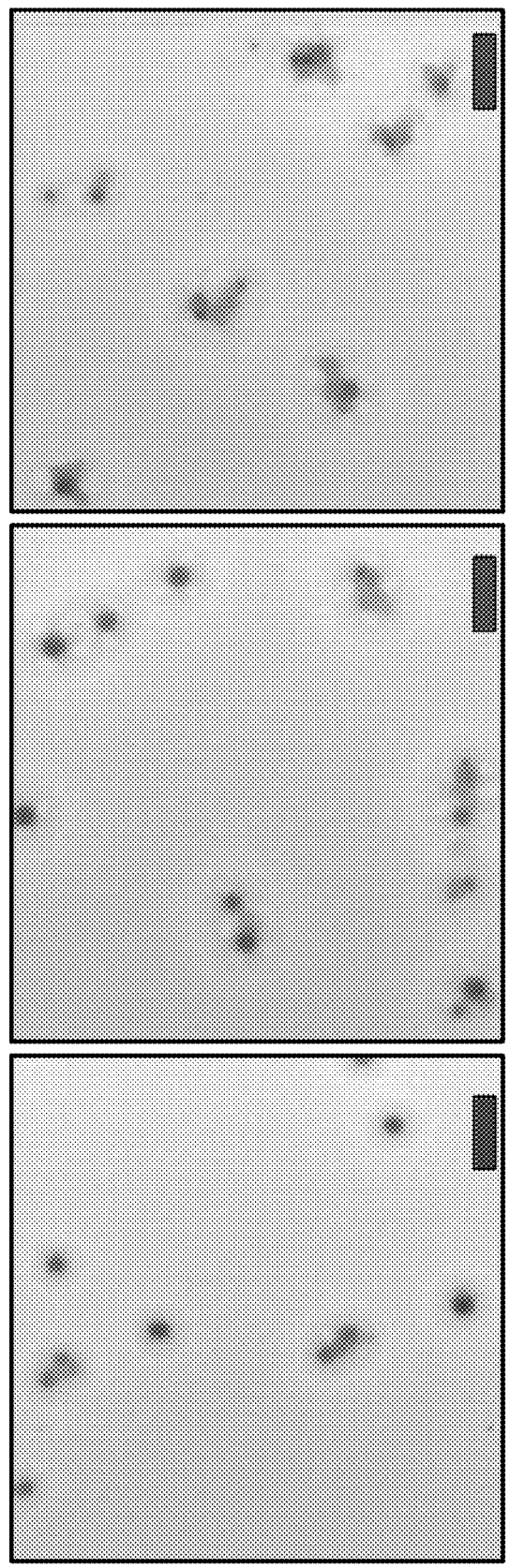
Figure 9A:
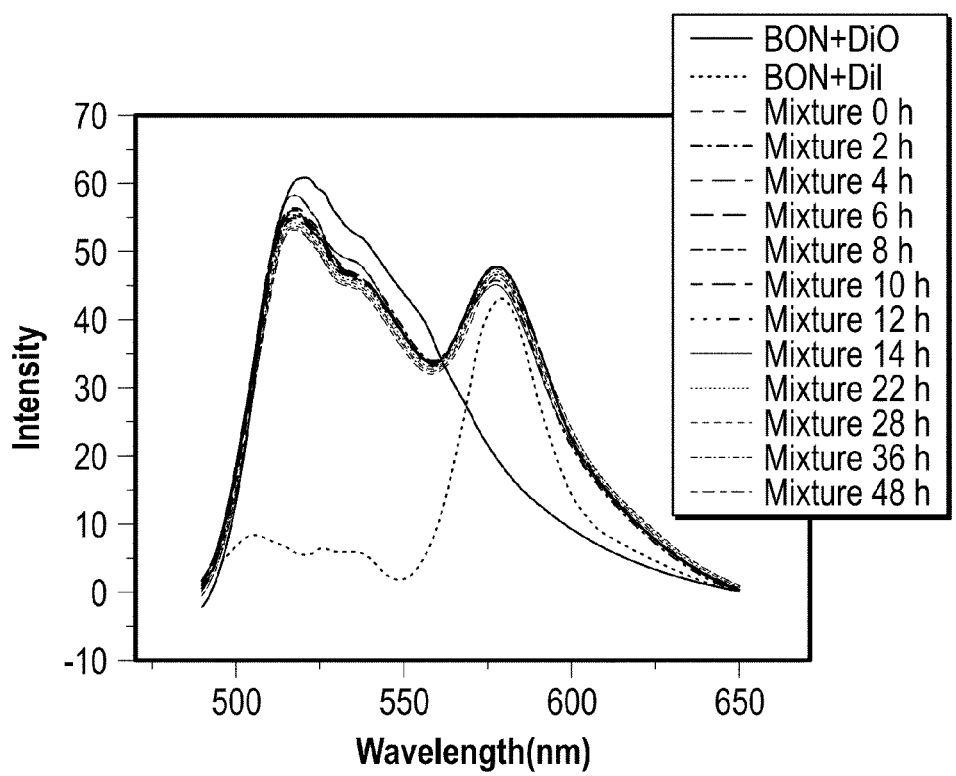
Figure 9B:
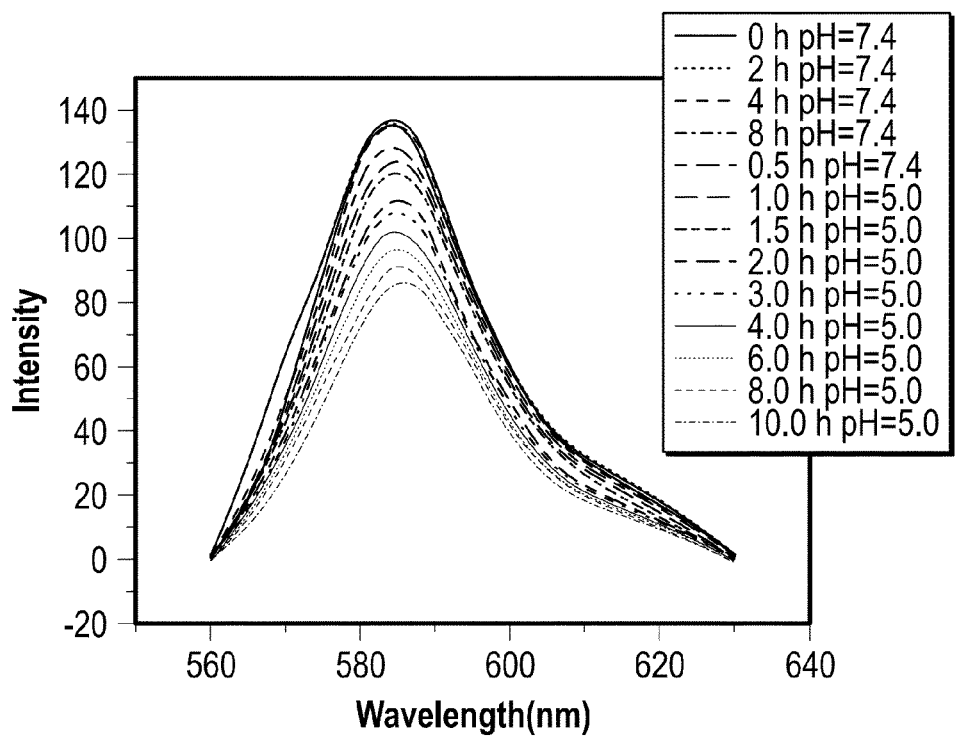
Figure 9C:
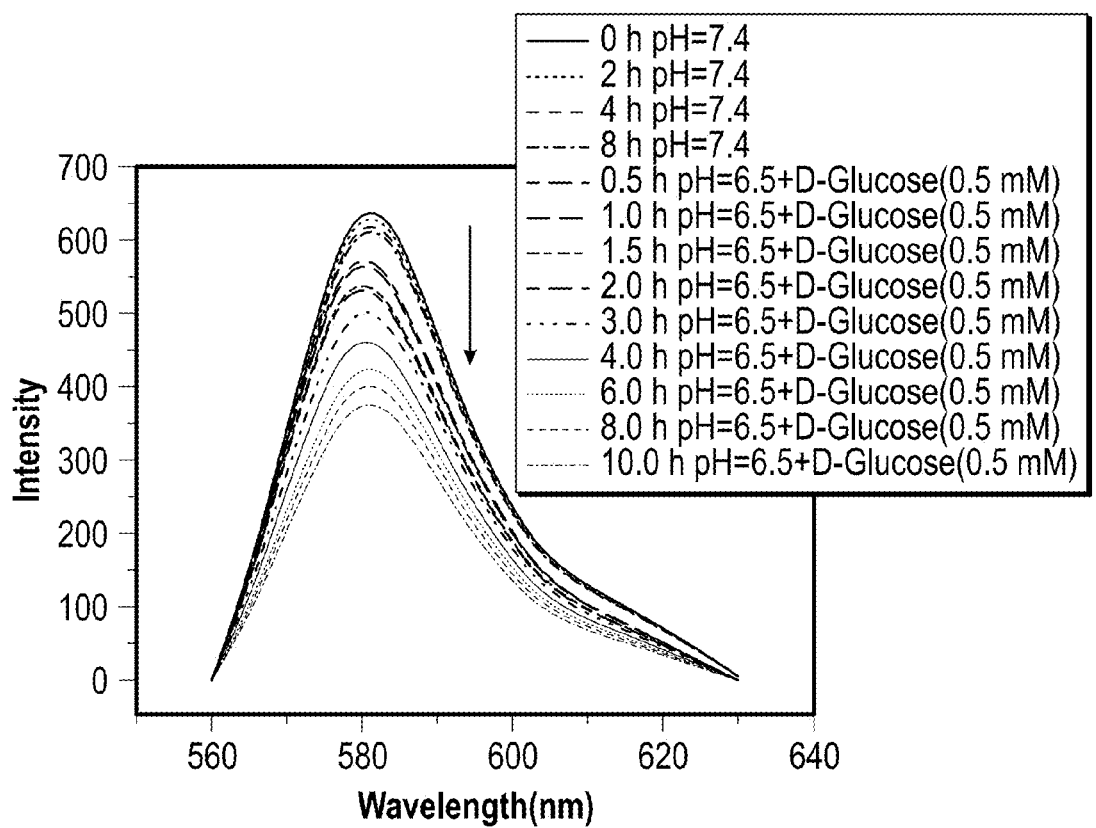
Figure 9D:
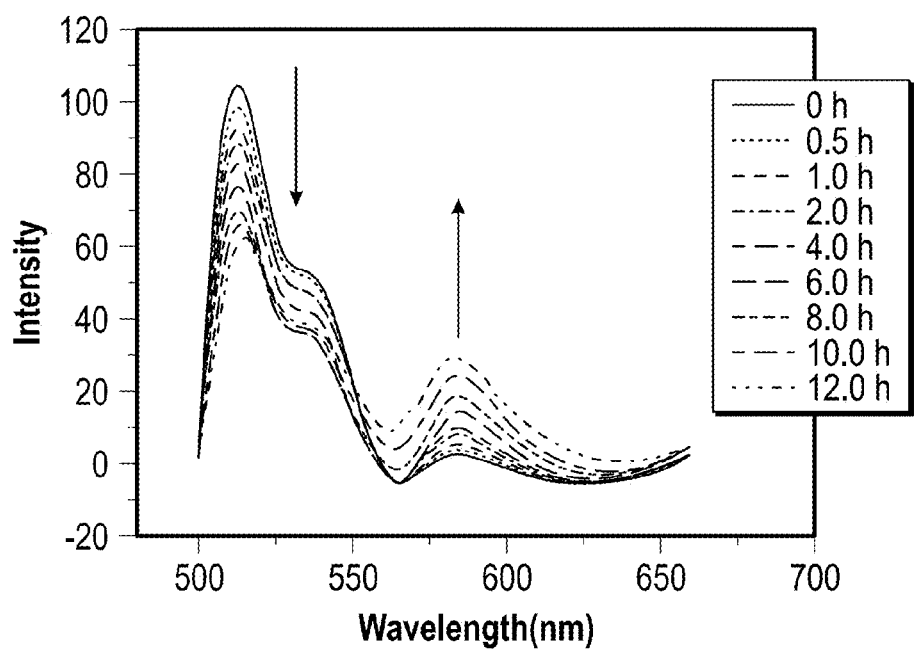
Figure 9E:
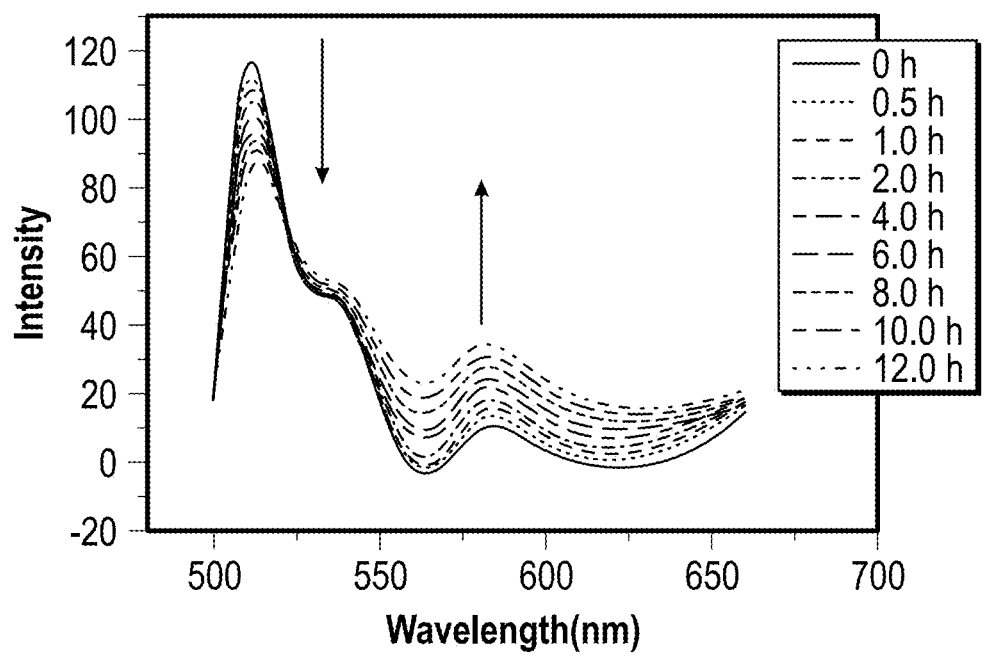
Figure 9F:
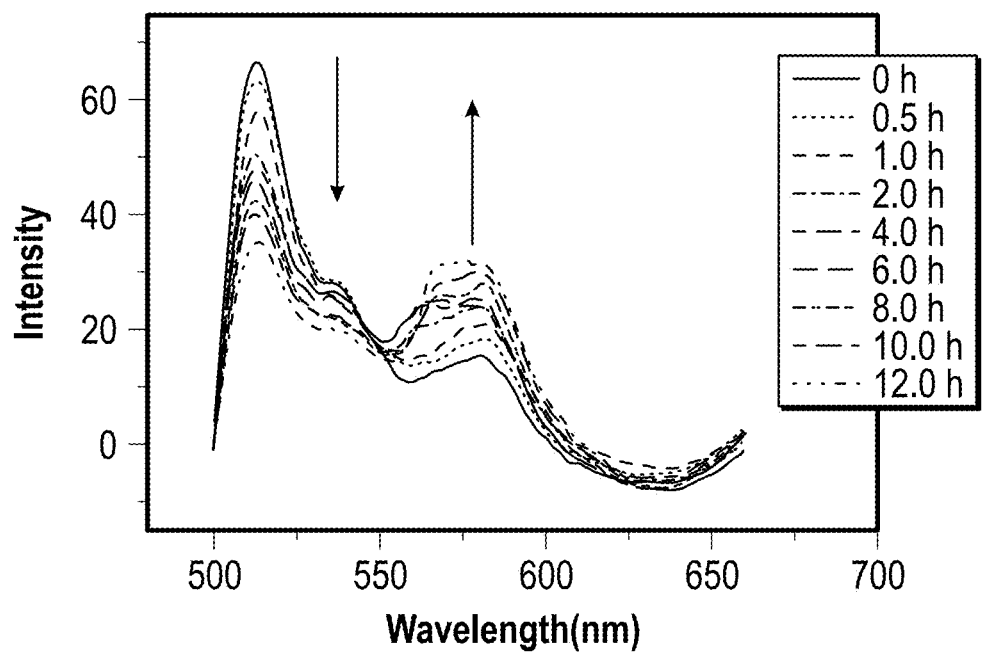

FIGS. 8a-c illustrate TEM images showing the morphologies of BON after immersing in pH=5.0 aqueous solution for (A) 1 h, (B) 2 h and (C) 4 h, in accordance with various embodiments.

FIGS. 9a-f illustrate (A) FRET behavior of dyes encapsulated in BON in neutral solution, the excitation wavelength of this system was 450 nm; fluorescence spectra to trace the release of a dye from BON in aqueous solution with (B) pH=5.0 and in (C) 0.5 mM glucose aqueous solution with pH=6.5; FRET evolution of dyes encapsulated in BON in solution at pH=5.0 (D), pH=6.0 (E) and pH=6.5 with D-glucose (F), in accordance with various embodiments.

Figure 10A:
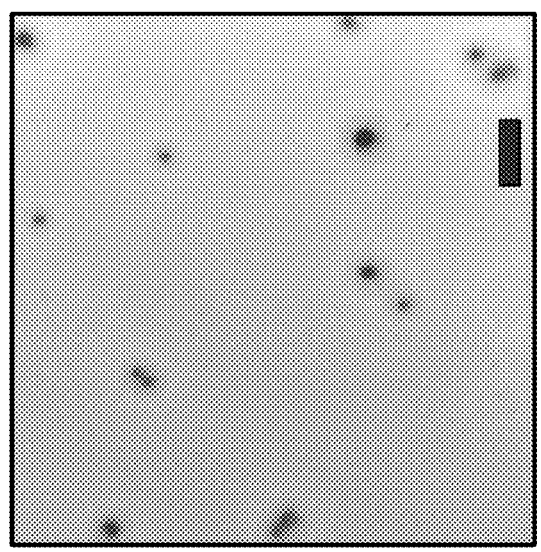
Figure 10B:
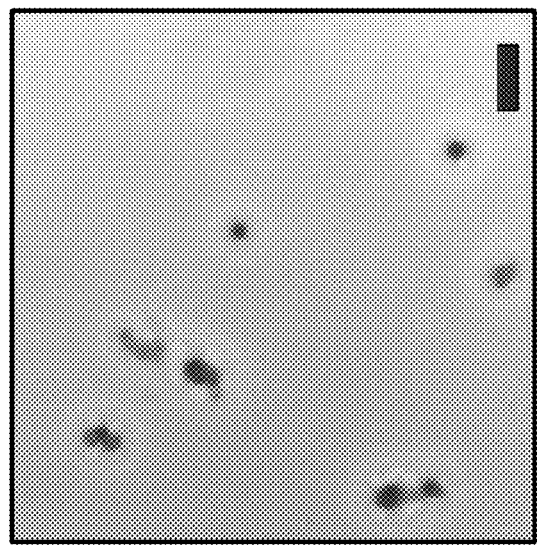
Figure 10C:
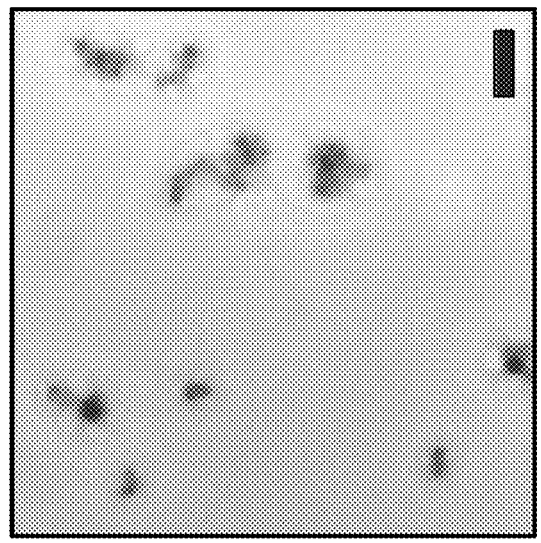

FIGS. 10a-c illustrate TEM images indicating the morphologies of BON after immersing in 0.5 mM of D-glucose aqueous solution with pH=6.5 for 1 (A), 2 (B) and 4 h (C), in accordance with various embodiments. The scale bars in the TEM images are 400 nm.

Figure 11:
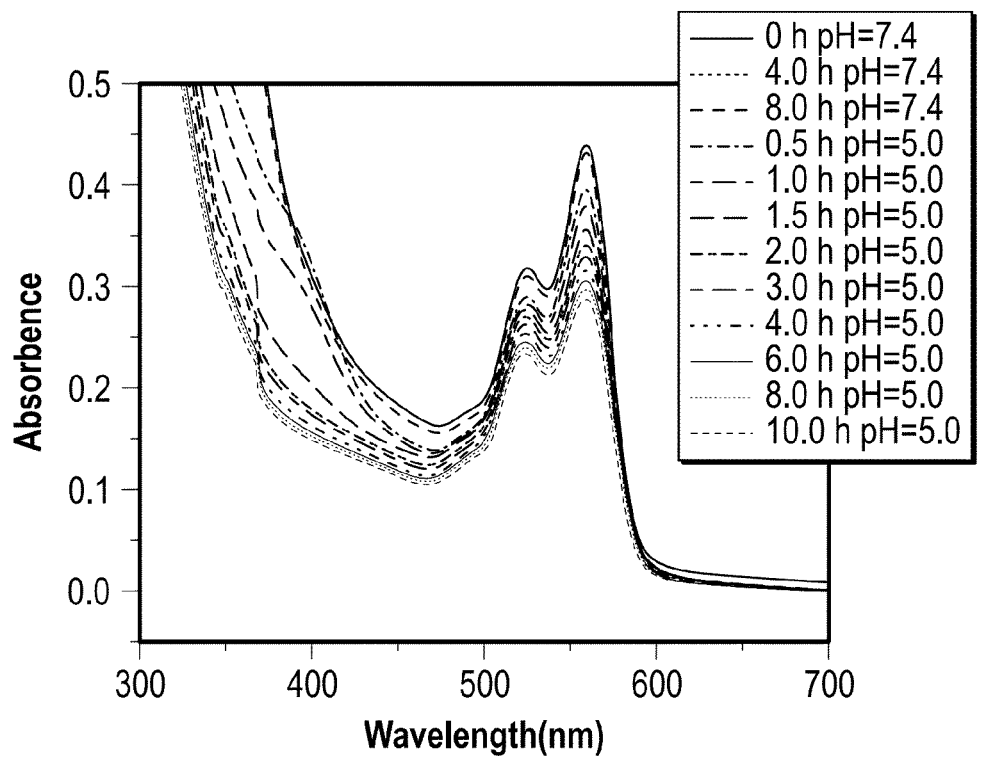

FIG. 11 illustrates absorption spectra evidencing the release of DiI from the BON at pH=5.0, in accordance with various embodiments.

FIGS. 12a-d illustrate FRET behavior of BON having dyes encapsulated therein at (A) pH 7.4; (B) pH 5.0; (C) evolution of dye emission at pH 5.0; and (D) plot of FRET ratio vs. time at pH 7.4, 6.5, 5.0 and in the presence of glucose at pH 6.5, in accordance with various embodiments.

Figure 13A:
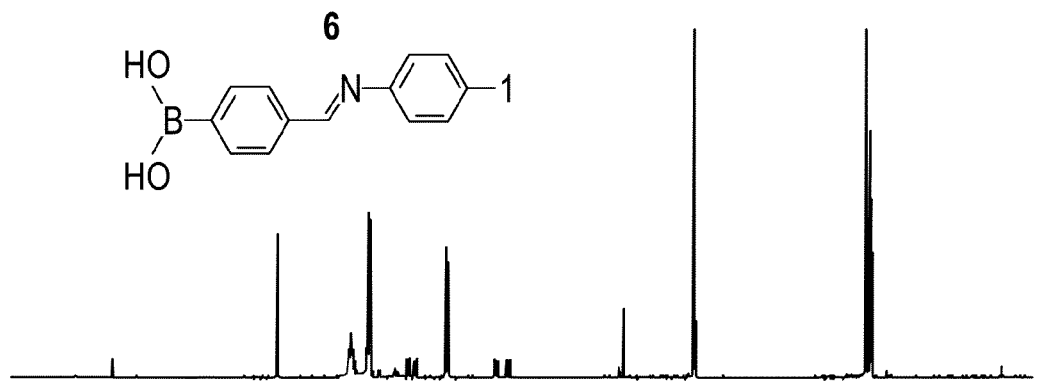
Figure 13B:
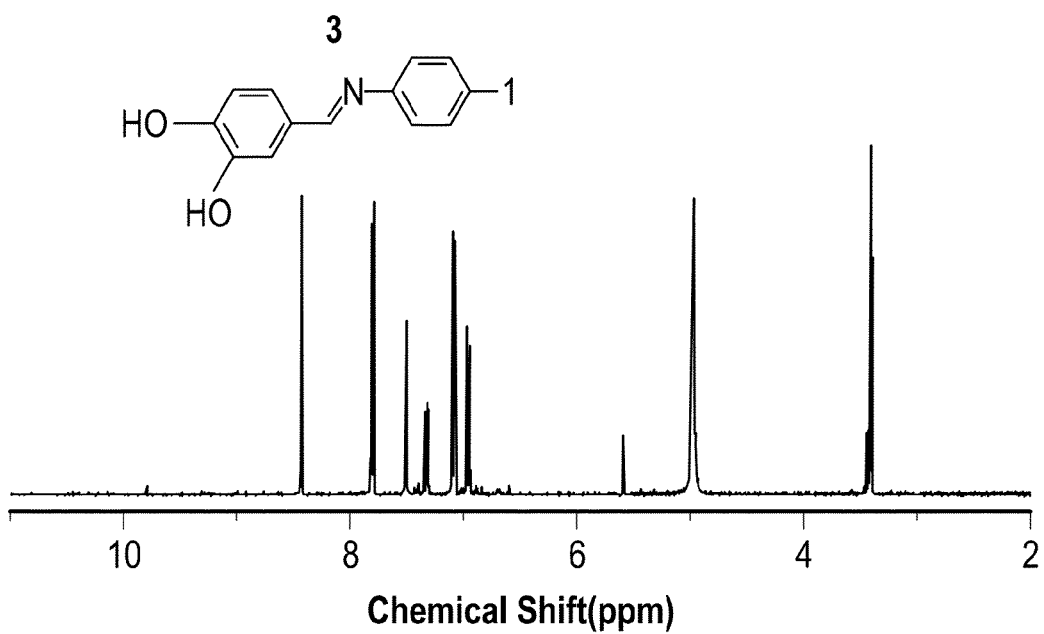

FIGS. 13a-b illustrate $^1$H NMR spectra of (A) (E)-4-(((4-iodophenyl)imino)methyl)benzene-1,2-diol (6) and (B) (E)-(4-(((4-iodophenyl)imino)methyl)phenyl)boronic acid (3) in methanol-$D_4$, in accordance with various embodiments.

Figure 14:
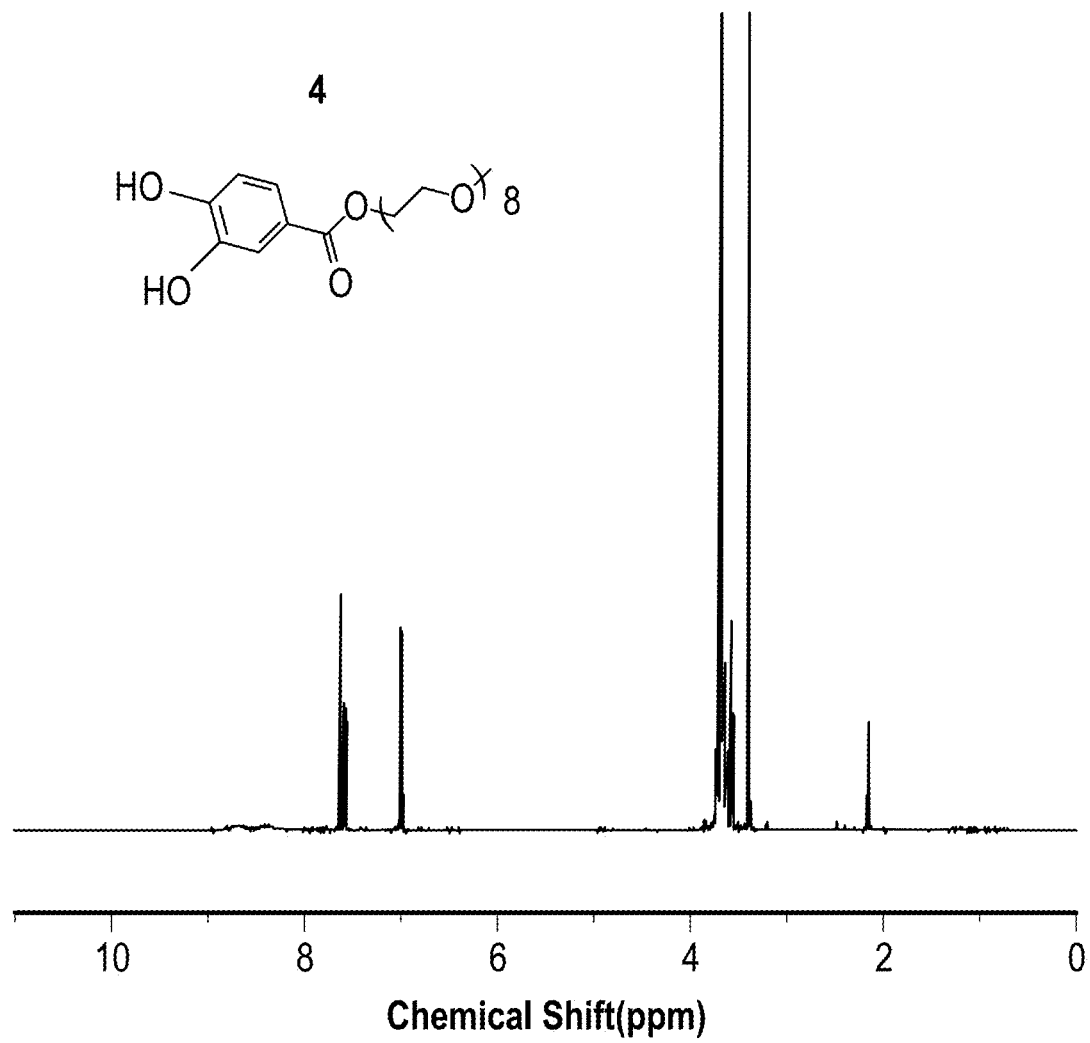

FIG. 14 illustrates a $^1$H NMR spectrum of methylocto (oxyethyl) 3,4-dihydroxybenzoate (4) in acetone-$D_6$, in accordance with various embodiments.

Figure 15A:
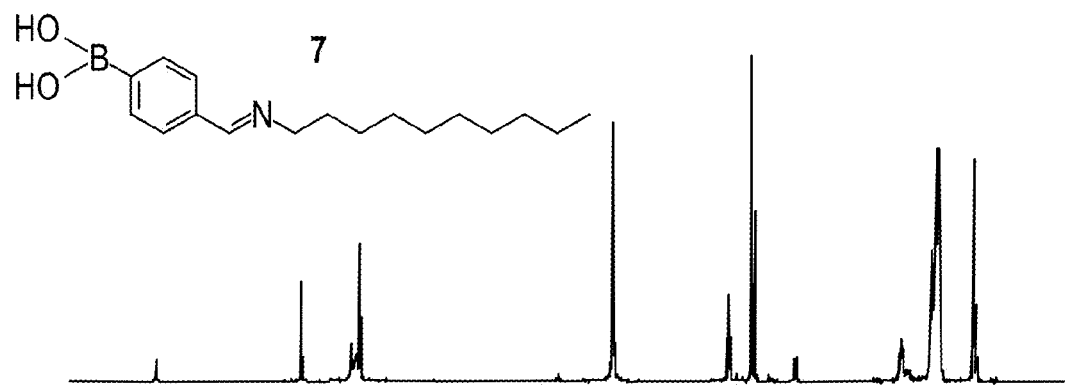
Figure 15B:
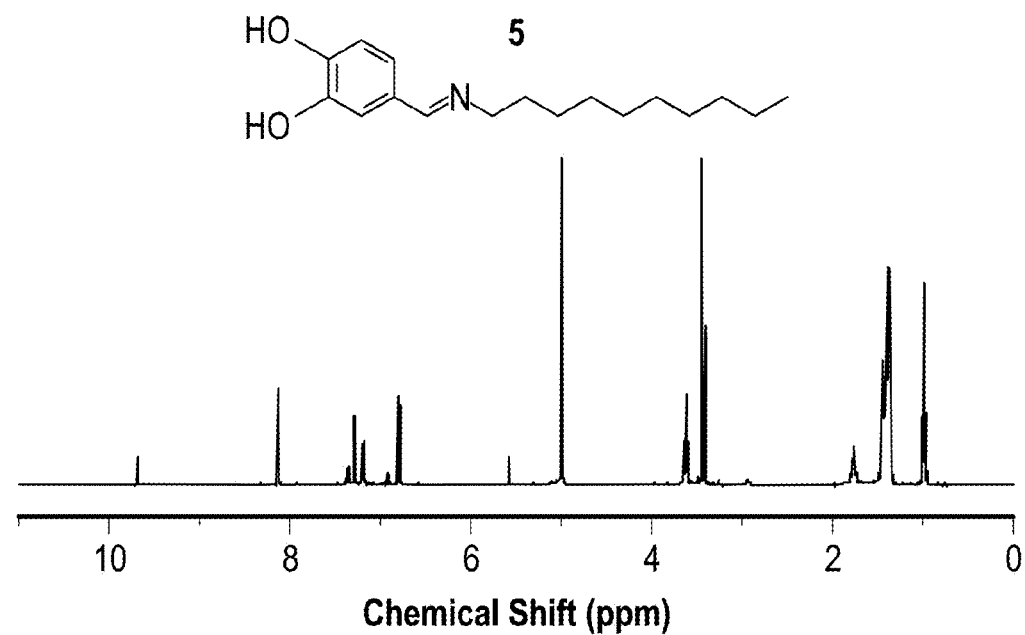

FIGS. 15a-b illustrate $^1$H NMR spectra of (A) (E)-(4-((decylimino)methyl)phenyl)boronic acid (7) and (B) (E)-4-((decylimino)methyl)benzene-1,2-diol (5) in methanol-$D_4$, in accordance with various embodiments.

FIGS. 16a-i illustrate (A) Schematic illustration of the surface functionalization of BON; (B) Chemical structures of 3-5; (C) TEM image of BON functionalized with 3 (scale bar=400 nm); (D) and (E) ImageJ analysis of TEM images of functionalized BON (with 3) and unfunctionalized BON; (F) XPS spectra of BON terminated with boronic acid groups and BON modified with 3; (G-I) water droplet profiles and contact angles of BON (unfunctionalized (G), functionalized with 4 (H), and with 5 (I)), in accordance with various embodiments.

Figure 17:
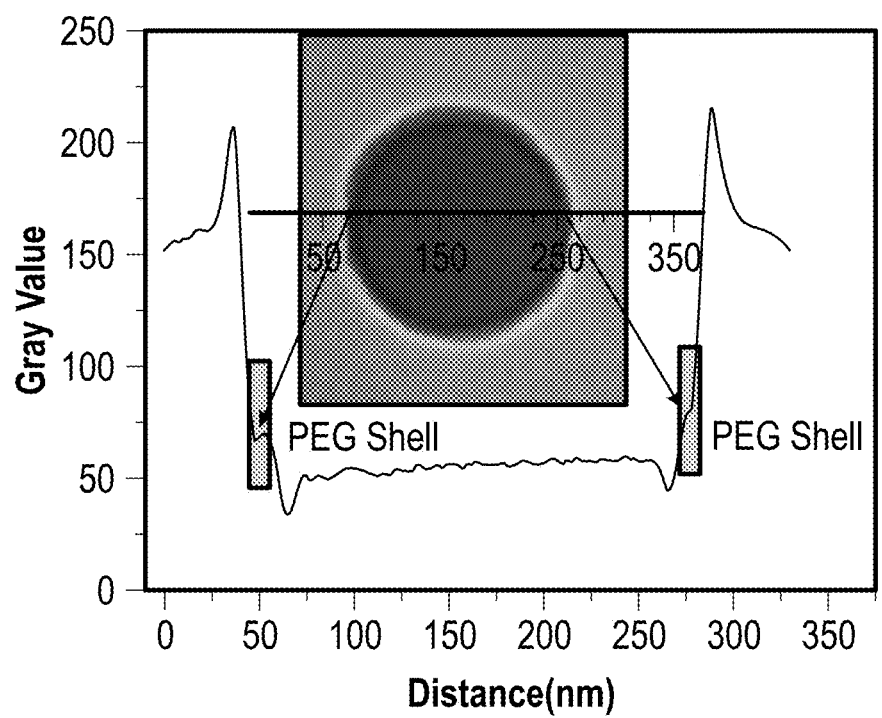
Figure 18:
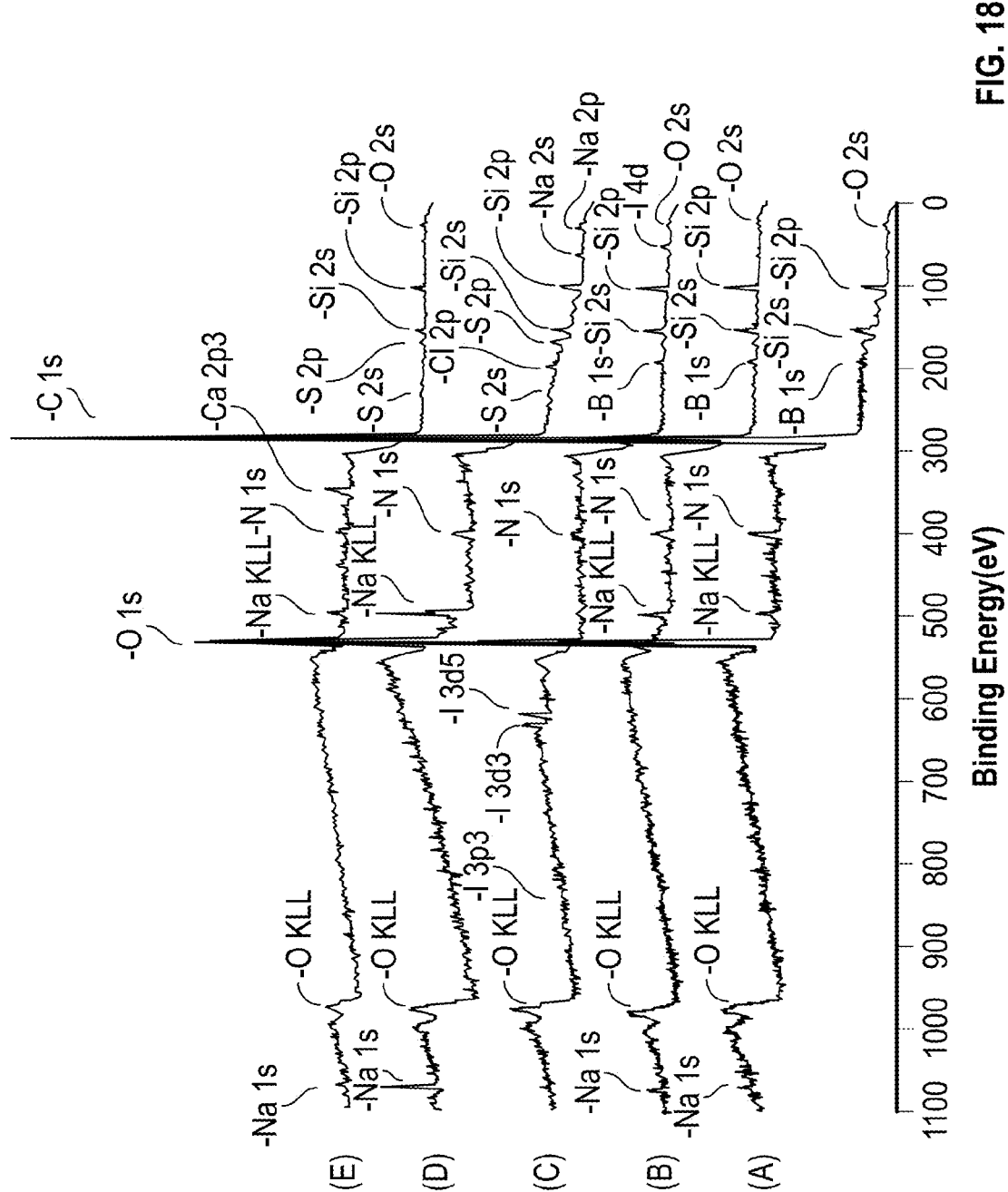

FIG. 17 illustrates the radial direction gray value evolution of the 4 modified BON, in accordance with various embodiments.

FIGS. 18a-e illustrate XPS of BON (A) terminated with catechol groups, (B) terminated with boronic acid groups, (C) BON modified with 3, (D) 4 and (E) 5, in accordance with various embodiments.

FIGS. 19a-b illustrate TEM images of the BON after the surface modification with 4 and 5, in accordance with various embodiments.

FIG. 20 illustrates water droplets on the surface of substrates made from BON modified with 3, in accordance with various embodiments.

Figure 21:
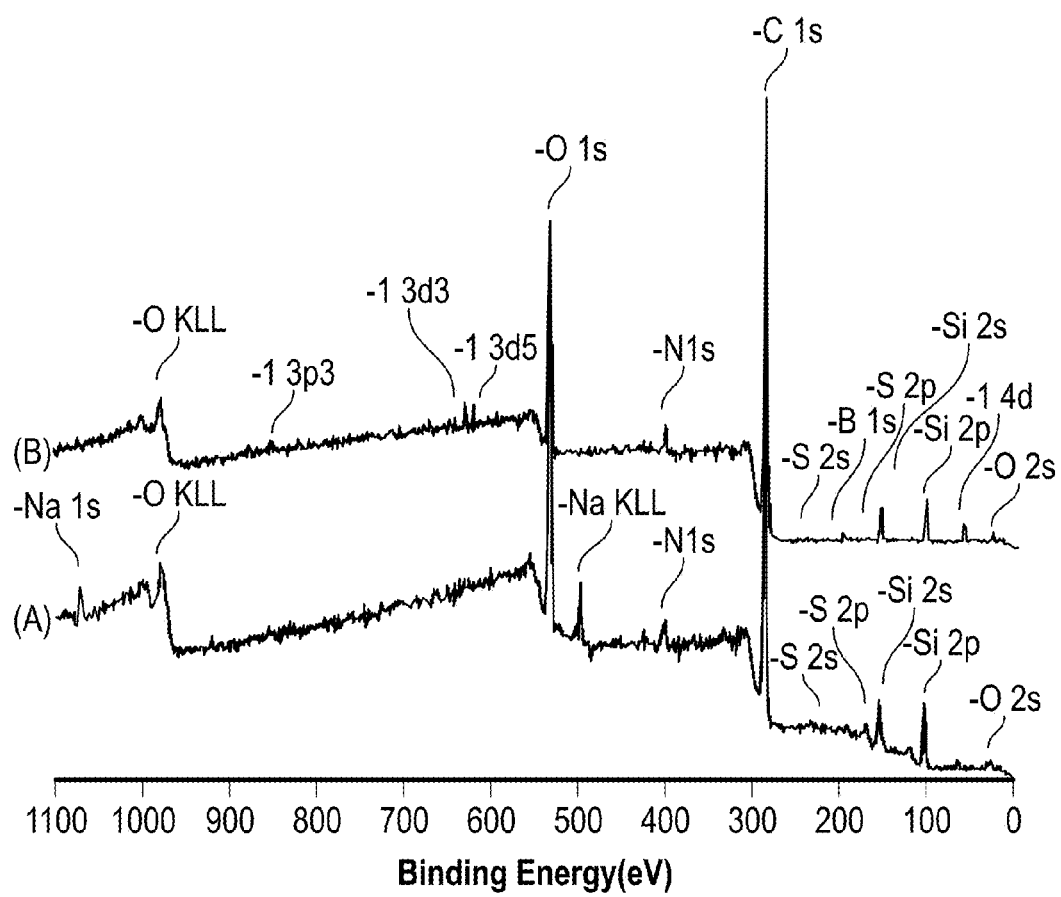

FIG. 21 illustrates XPS results of the BON terminated with boronic acid groups further modified by (A) 7 and (B) 6, in accordance with various embodiments.

FIGS. 22a-c illustrate water droplet profiles on the surface of substrates made from (A) catechol group terminated BON, (B) BON modified by 6, (C) BON modified by 7, in accordance with various embodiments.

FIGS. 23a-c illustrate boronate polymers encapsulated with one (A) and several (B) Ag nanoparticles, and Larger Ag nanoparticles encapsulated in the boronate polymer shells (C), in accordance with various embodiments.

FIGS. 24a-c illustrate growth of the boronate polymer shell on the Ag nanoparticles, From (A), (B) to (C), the amount of the tris{2-[(4-boronicacidbenzylidene)imino]ethyl}amine and tris{2-[(3,4-dihydroxy benzylidene)imino]ethyl}amine increasing, in accordance with various embodiments.

FIG. 25 illustrates diameter growth of the boronate nanoparticle, in accordance with various embodiments.

Figure 26:
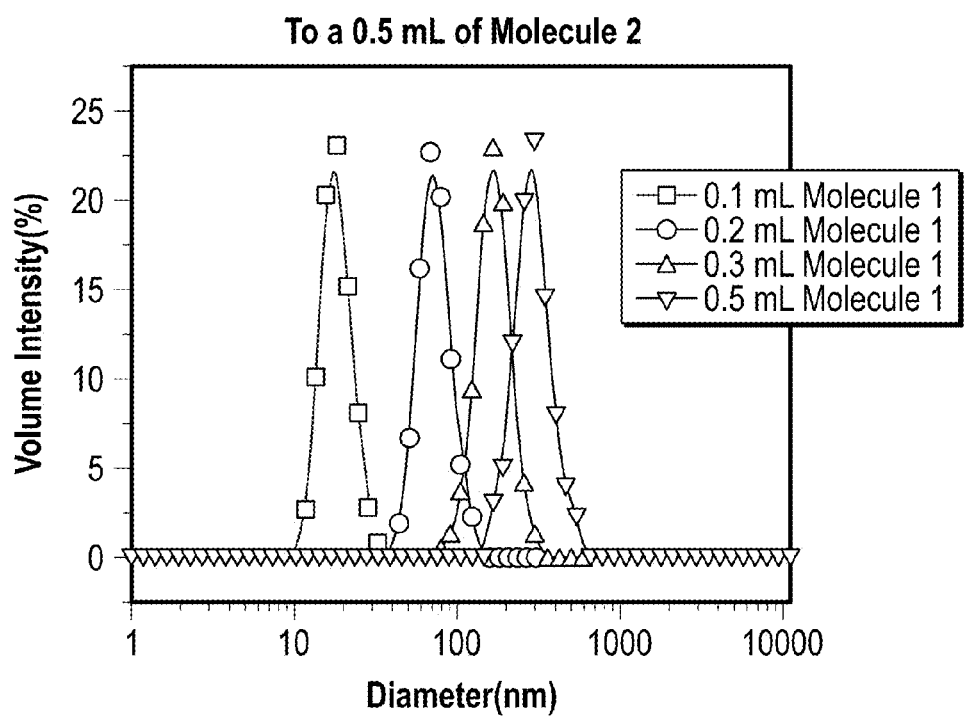

FIG. 26 illustrates diameter growth of the boronate nanoparticle, in accordance with various embodiments.

Figures 27A, 27B, 27C:
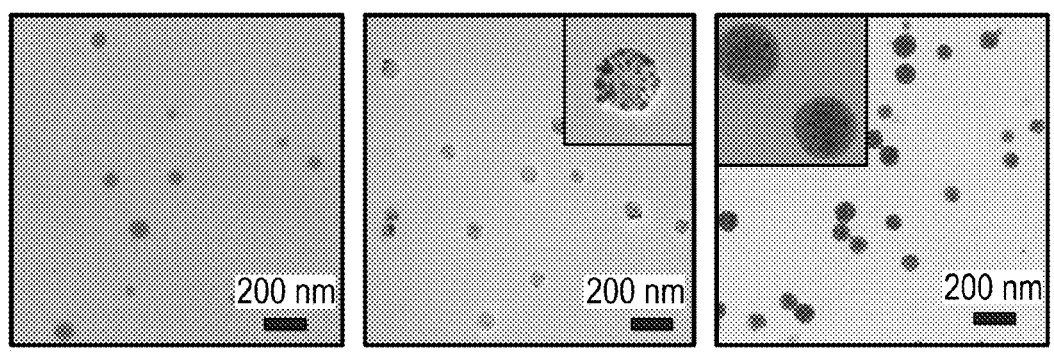

FIGS. 27a-c illustrate (A) boronate nanoparticle, (B) boronate nanoparticle with Ag nanoparticles on the surface, and (C) growth of boronate shell on the boronate nanoparticle marked with Ag nanoparticles, in accordance with various embodiments.

Figure 28:
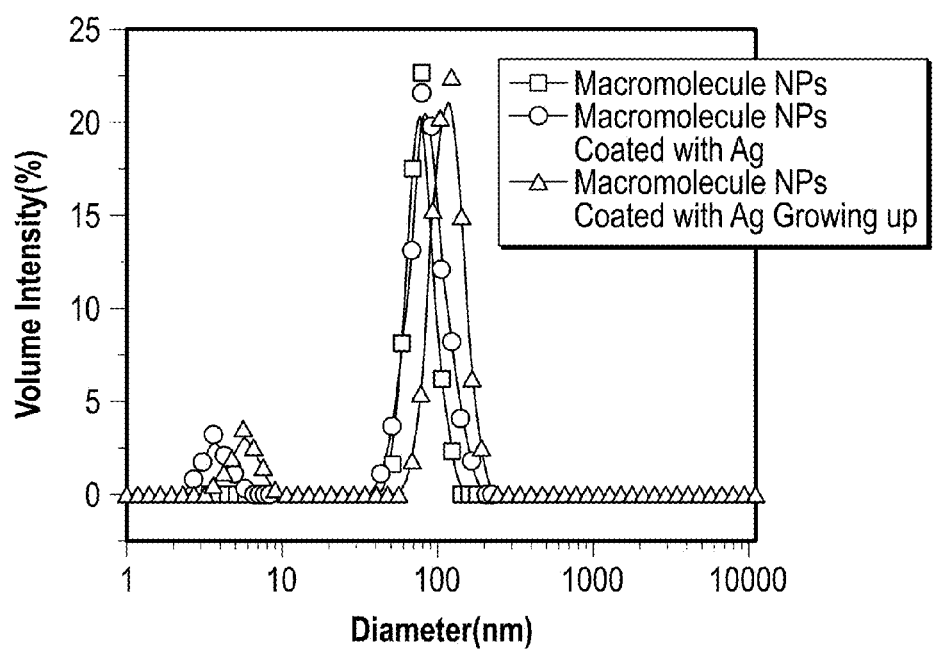

FIG. 28 illustrates DLS results for the growth of boronate nanoparticle marked by the Ag nanoparticles, in accordance with various embodiments.

Figure 29A:
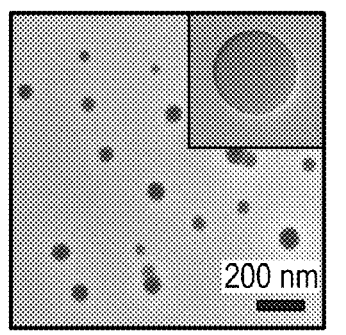
Figure 29B:
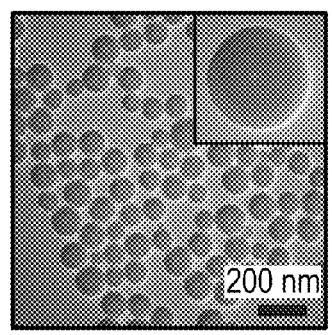
Figure 29C:
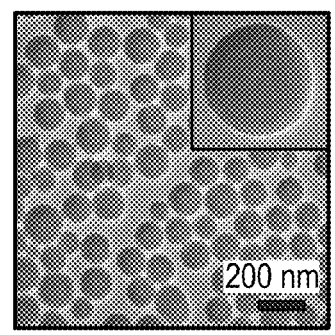

FIGS. 29a-c illustrates TEM images of boronate nanoparticles synthesized from 2 mg/mL (A), 3 mg/mL (B) and 5 mg/mL (C) of 8 and 9, in accordance with various embodiments.

Figure 30C:
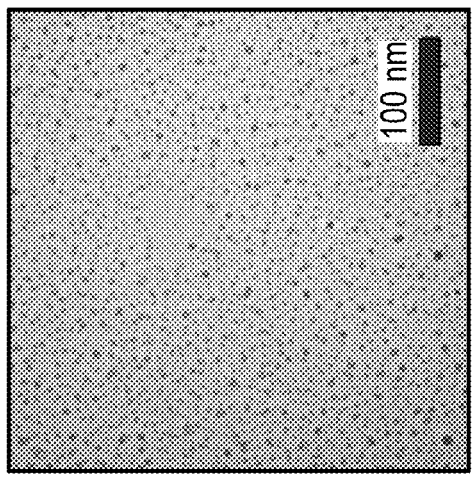
Figure 30B:
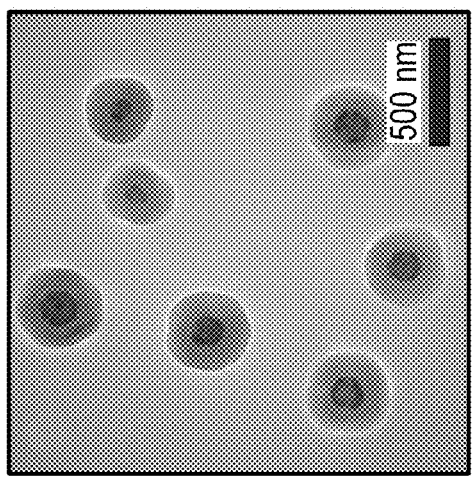
Figure 30A:
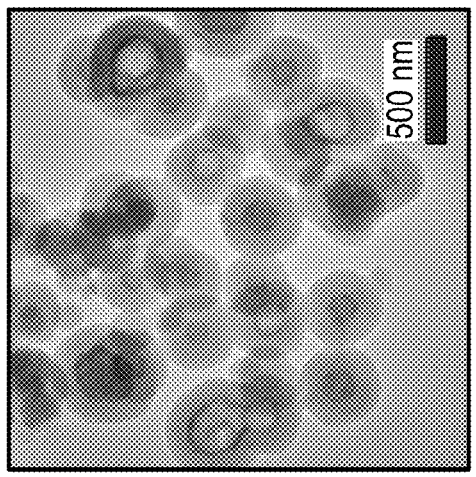
Figure 31D:
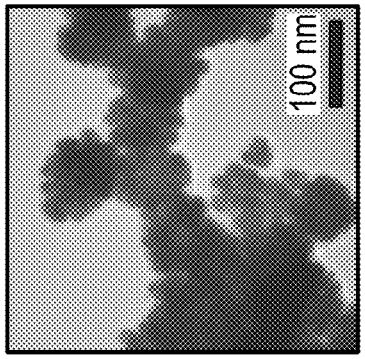
Figure 31C:
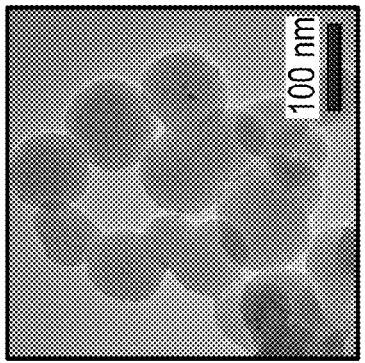
Figure 31B:
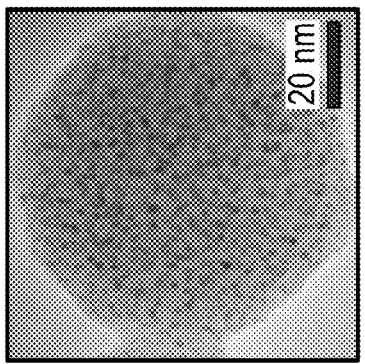
Figure 31A:
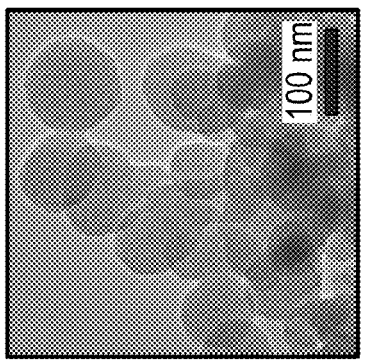

FIGS. 30a-c illustrate TEM images of (A) Ag nanoparticles, (B) Ag nanoparticles encapsulated in the boronate nanoparticles from 8 and 9, (C) Ag nanoparticles encapsulated in the boronate nanoparticles, made from low concentration of Ag nanoparticles, in accordance with various embodiments.

FIGS. 31a-d illustrate in situ growth of Ag nanoparticles in the boronate nanoparticles from 8 and 9, where (A) is with higher $AgNO_3$ concentration, (B) is the magnified TEM image of (A), (C) is with lower $AgNO_3$ concentration, (D) is derived from (A) after two days ageing, in accordance with various embodiments.

Figure 32:
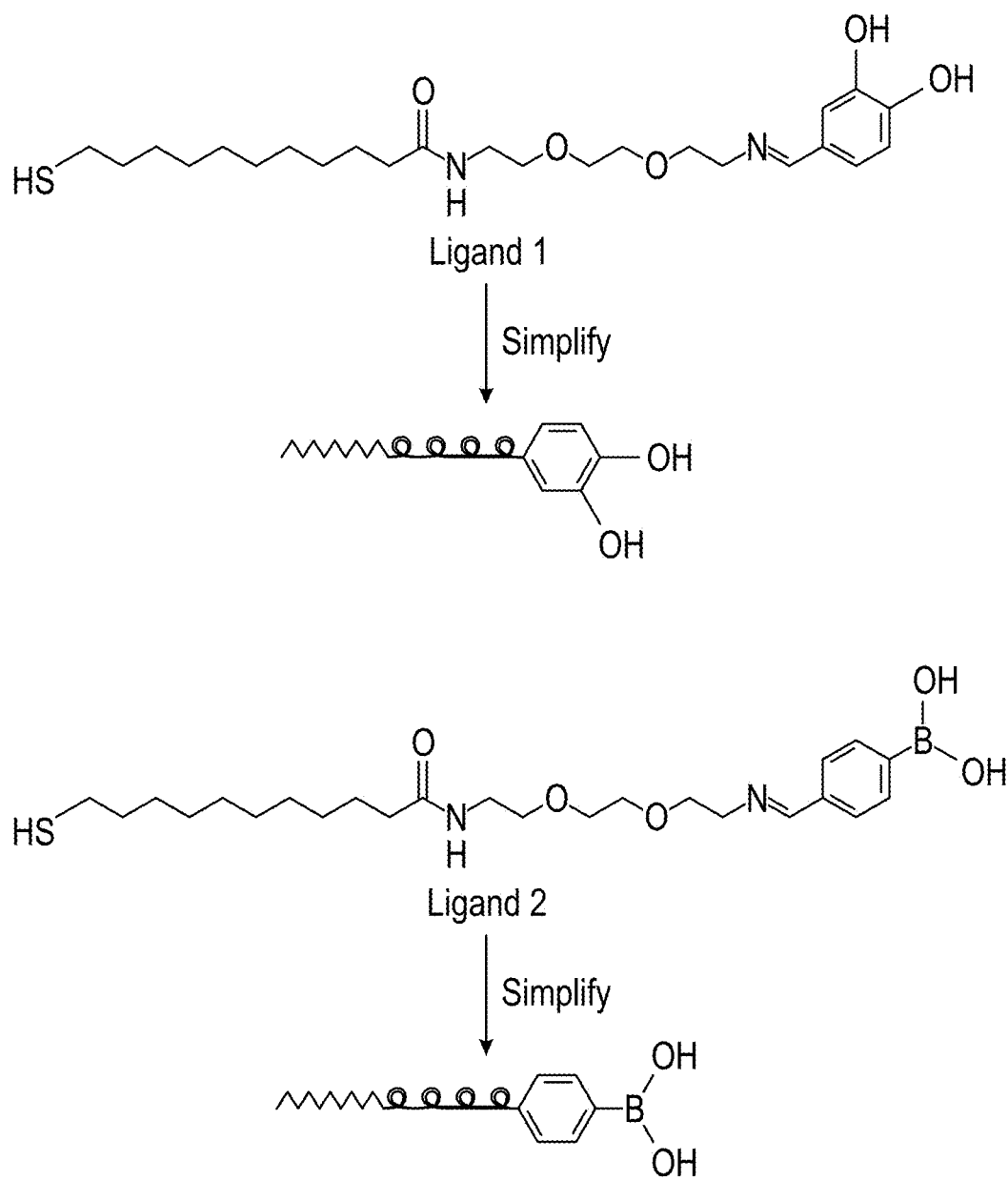

FIG. 32 illustrates a chemical structure of dihydroxyphenyl ligand (top) and a boronic acid ligand (bottom), in accordance with various embodiments.

Figure 33:
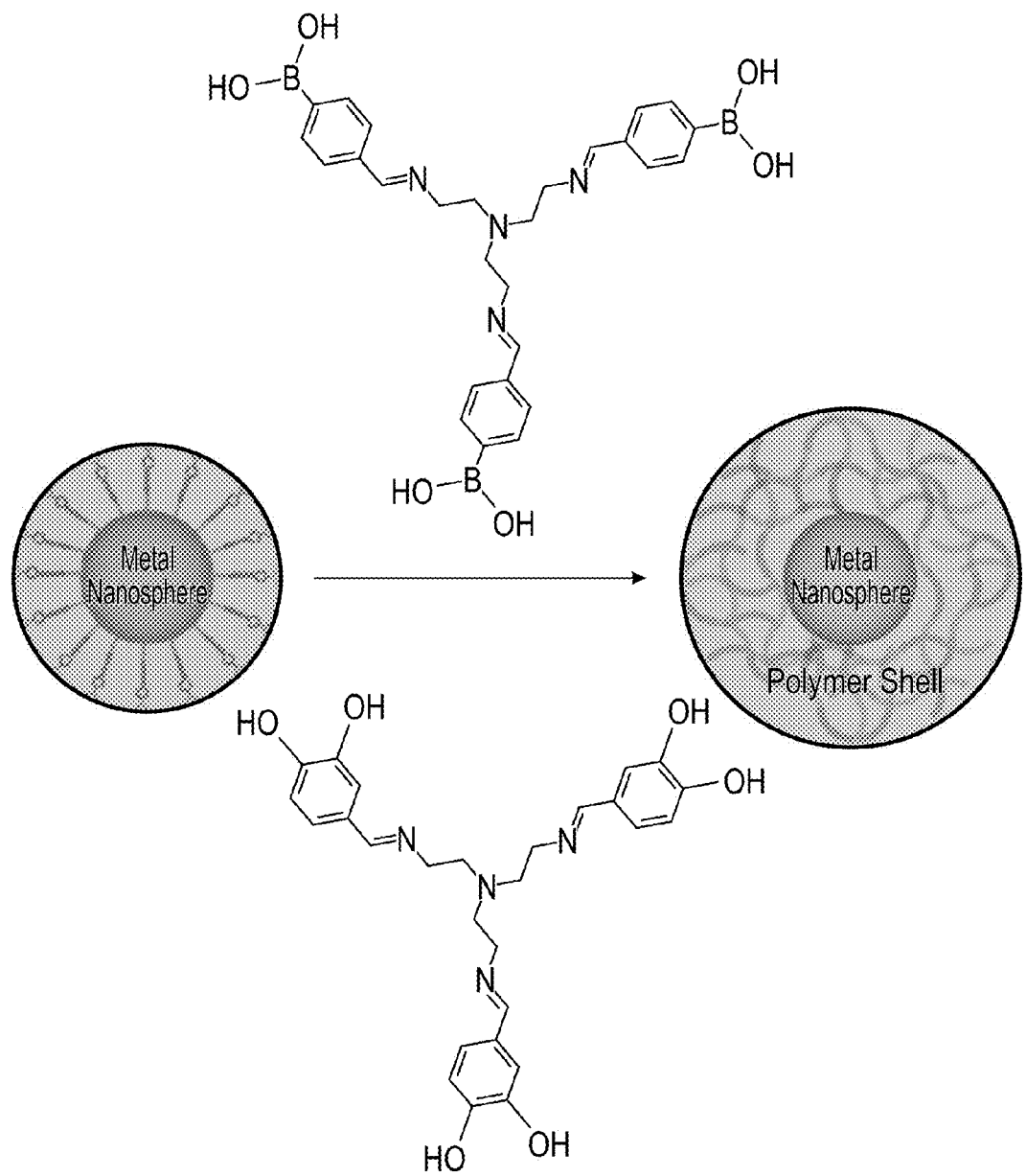

FIG. 33 illustrates a structure of ligand coated metal nanopheres and the growth of polymer shell, in accordance with various embodiments.

Figure 34:
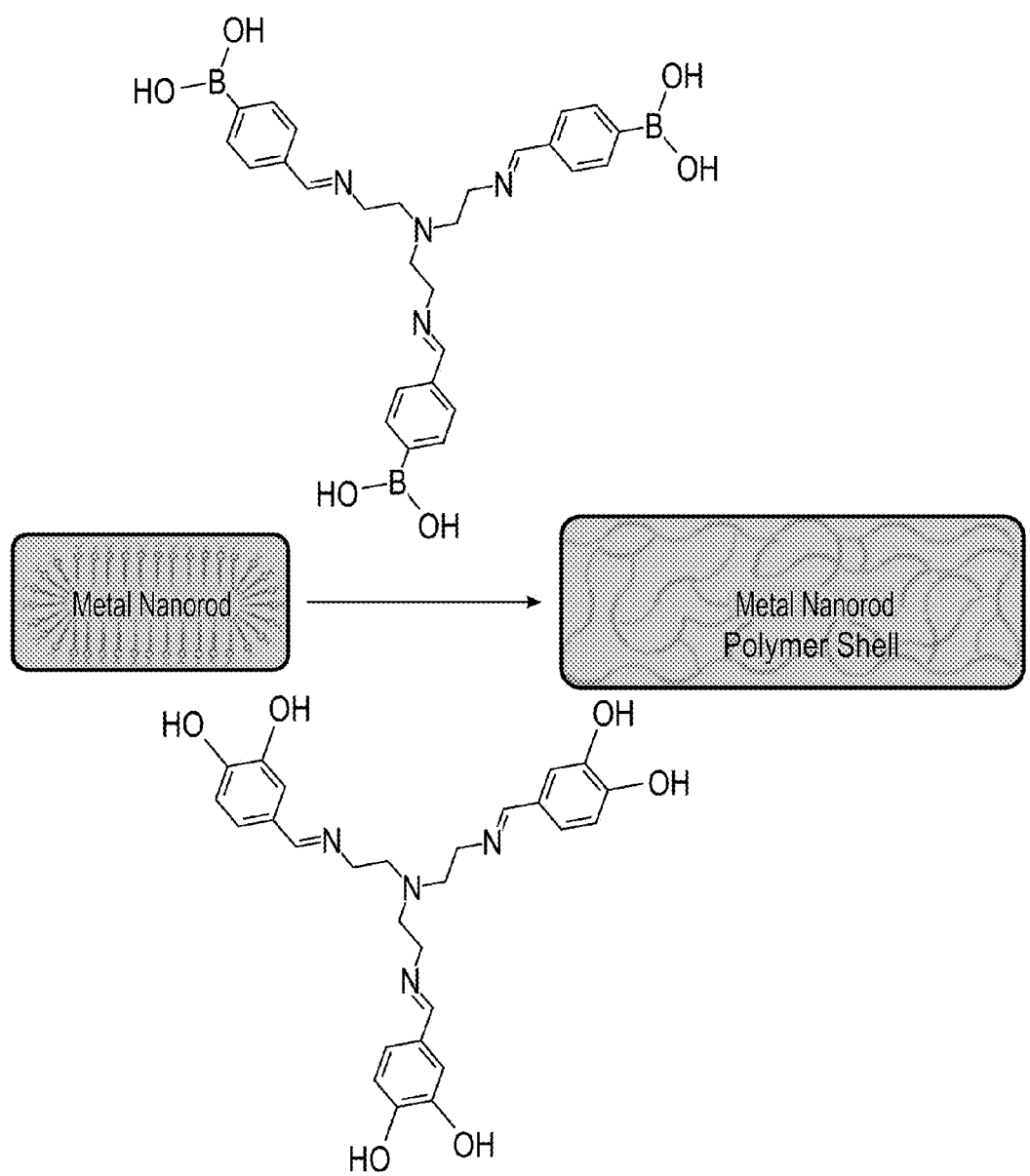

FIG. 34 illustrates a structure of ligand coated metal nanorods and the growth of polymer shell, in accordance with various embodiments.

Figure 35:
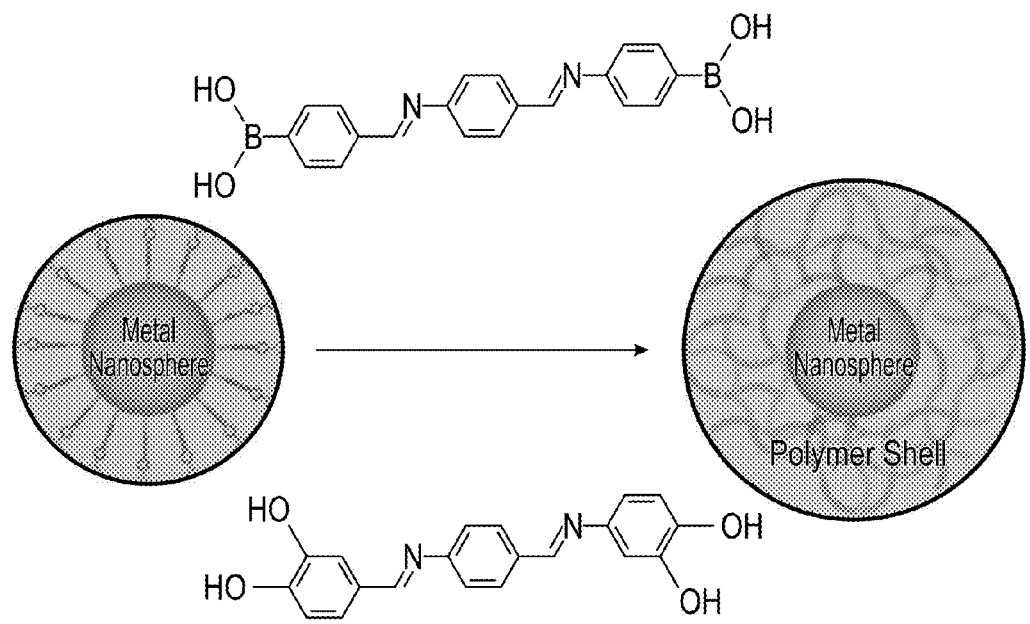

FIG. 35 illustrates a structure of ligand coated metal nanopheres and the growth of polymer shell from linear molecules 8 and 9, in accordance with various embodiments.

Figure 36:
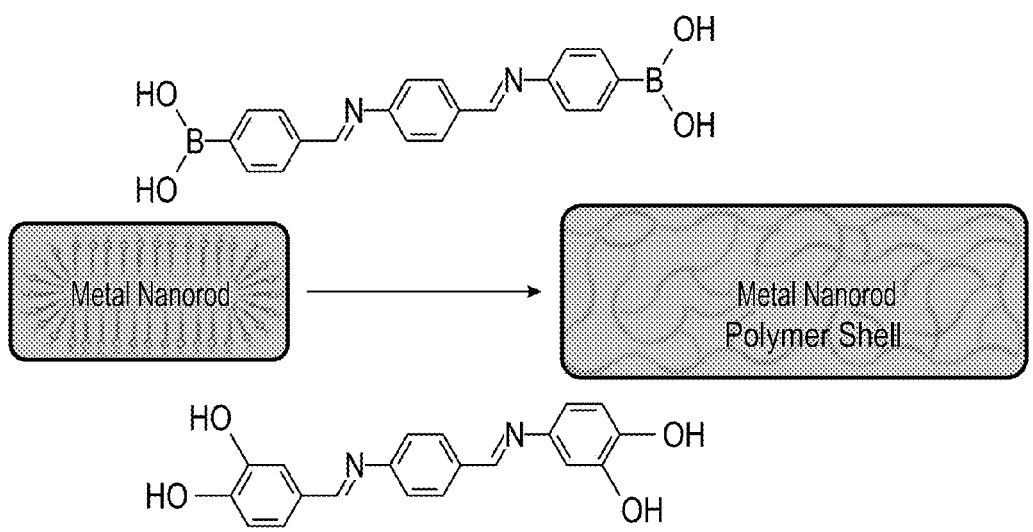

FIG. 36 illustrates a structure of ligand coated metal nanorods and the growth of polymer shell from linear molecules 8 and 9, in accordance with various embodiments.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as alkoxy groups, aryloxy groups, aralkyloxy groups, oxo(carbonyl) groups, carboxyl groups including carboxylic acids, carboxylates, and carboxylate esters; a sulfur-containing group such as alkyl and aryl sulfide groups; and other heteroatom-containing groups. Non-limiting examples of organic groups include OR', OC(O)N(R')$_2$, CN, CF$_3$, OCF$_3$, R', C(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$N(R')C(O)R', (CH$_2$)$_{0-2}$N(R')N(R')$_2$, N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen (in examples that include other carbon atoms) or a carbon-based moiety, and wherein the carbon-based moiety can itself be further substituted; for example, wherein R' can be hydrogen (in examples that include other carbon atoms), alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl, or R' can be independently mono- or multi-substituted with J; or wherein two R' groups bonded to a nitrogen atom or to adjacent nitrogen atoms can together with the nitrogen atom or atoms form a heterocyclyl, which can be mono- or independently multi-substituted with J.

Examples of organic groups include linear and/or branched groups such as alkyl groups, fully or partially halogen-substituted haloalkyl groups, alkenyl groups, alkynyl groups, aromatic groups, acrylate functional groups, and methacrylate functional groups; and other organic functional groups such as ether groups, cyanate ester groups, ester groups, carboxylate salt groups, and masked isocyano groups. Examples of organic groups include, but are not limited to, alkyl groups such as methyl, ethyl, propyl, isopropyl, n-butyl, s-butyl, and t-butyl groups, acrylate functional groups such as acryloyloxypropyl groups and methacryloyloxypropyl groups; alkenyl groups such as vinyl, allyl, and butenyl groups; alkynyl groups such as ethynyl and propynyl groups; aromatic groups such as phenyl, tolyl, and xylyl groups; cyanoalkyl groups such as cyanoethyl and cyanopropyl groups; halogenated hydrocarbon groups such as 3,3,3-trifluoropropyl, 3-chloropropyl, dichlorophenyl, and 6,6,6,5,5,4,4,3,3-nonafluorohexyl groups; alkenyloxypoly(oxyalkyene) groups such as allyloxy(polyoxyethylene), allyloxypoly(oxypropylene), and allyloxy-poly(oxypropylene)-co-poly(oxyethylene) groups; alkyloxypoly(oxyalkyene) groups such as propyloxy(polyoxyethylene), propyloxypoly(oxypropylene), and propyloxy-poly(oxypropylene)-co-poly(oxyethylene) groups; halogen substituted alkyloxypoly(oxyalkyene) groups such as perfluoropropyloxy(polyoxyethylene), perfluoropropyloxypoly(oxypropylene), and perfluoropropyloxy-poly(oxypropylene)-co-poly(oxyethylene) groups; alkoxy groups such as methoxy, ethoxy, n-propoxy, isopropoxy, n-butoxy, and ethylhexyloxy groups; aminoalkyl groups such as 3-aminopropyl, 6-aminohexyl, 11-aminoundecyl, 3-(N-allylamino)propyl, N-(2-aminoethyl)-3-aminopropyl, N-(2-aminoethyl)-3-aminoisobutyl, p-aminophenyl, 2-ethylpyridine, and 3-propylpyrrole groups; epoxyalkyl groups such as 3-glycidoxypropyl, 2-(3,4,-epoxycyclohexyl)ethyl, and 5,6-epoxyhexyl groups; ester functional groups such as actetoxyethyl and benzoyloxypropyl groups; hydroxy functional groups such as 2-hydroxyethyl groups; masked isocyanate functional groups such as propyl-t-butylcarbamate, and propylethylcarbamate groups; aldehyde functional groups such as undecanal and butyraldehyde groups; anhydride functional groups such as 3-propyl succinic anhydride and 3-propyl maleic anhydride groups; and metal salts of carboxylic acids such as the zinc, sodium, or potassium salts of 3-carboxypropyl and 2-carboxyethyl.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule, or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR', OC(O)N(R')$_2$, CN, NO, NO$_2$, ONO$_2$, azido, CF$_3$, OCF$_3$, R', O (oxo), S (thiono), C(O), S(O), methylenedioxy, ethylenedioxy, N(R')$_2$, SR', SOR', SO$_2$R', SO$_2$N(R')$_2$, SO$_3$R', C(O)R', C(O)C(O)R', C(O)CH$_2$C(O)R', C(S)R', C(O)OR', OC(O)R', C(O)N(R')$_2$, OC(O)N(R')$_2$, C(S)N(R')$_2$, (CH$_2$)$_{0-2}$N(R')C(O) R', (CH$_2$)$_{0-2}$N(R')N(R')$_2$, N(R')N(R')C(O)R', N(R')N(R')C(O)OR', N(R')N(R')CON(R')$_2$, N(R')SO$_2$R', N(R')SO$_2$N(R')$_2$, N(R')C(O)OR', N(R')C(O)R', N(R')C(S)R', N(R')C(O)N(R')$_2$, N(R')C(S)N(R')$_2$, N(COR')COR', N(OR')R', C(=NH)N(R')$_2$, C(O)N(OR')R', or C(=NOR')R' wherein R' can be hydrogen or a carbon-based moiety, and wherein the carbon-based moiety can itself be further substituted; for example, wherein R' can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R' can be independently mono- or multi-substituted with J; or wherein two R' groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$C H$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) group is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4-2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "heterocyclyl" as used herein refers to aromatic and non-aromatic ring compounds containing 3 or more ring members, of which, one or more is a heteroatom such as, but not limited to, N, O, and S. The term "heteroaryl" as used herein refers to aromatic ring compounds containing 5 or more ring members, of which, one or more is a heteroatom such as, but not limited to, N, O, and S; for instance, heteroaryl rings can have 5 to about 8-12 ring members. A heteroaryl group is a variety of a heterocyclyl group that possesses an aromatic electronic structure.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structures are substituted therewith.

The term "amine" as used herein refers to primary, secondary, and tertiary amines having, e.g., the formula N(group)$_3$ wherein each group can independently be H or non-H, such as alkyl, aryl, and the like. Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine. An "amino group" within the meaning herein can be a primary, secondary, tertiary or quaternary amino group. An "alkylamino" group includes a monoalkylamino, dialkylamino, and trialkylamino group.

The terms "halo" or "halogen" or "halide", as used herein, by themselves or as part of another substituent mean, unless otherwise stated, a fluorine, chlorine, bromine, or iodine atom, preferably, fluorine, chlorine, or bromine.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number average molecular weight can be measured by a variety of well-known methods including gel permeation chromatography, spectroscopic end group analysis and osmometry.

The term "weight-average molecular weight" as used herein refers ($M_W$), which is equal to $\Sigma M_i^2 n_i / \Sigma M_i n_i$, where $n_i$ is the number of molecules of molecular weight $M_i$. In various examples, the weight average molecular weight can be determined using light scattering, small angle neutron scattering, X-ray scattering, and sedimentation velocity.

The term "solvent" as used herein refers to a liquid that can dissolve a solid, liquid, or gas. Nonlimiting examples of solvents are silicones, organic compounds, water, alcohols, ionic liquids, and supercritical fluids.

The term "room temperature" as used herein refers to a temperature of about 15° C. to 28° C.

As used herein, the term "hydrocarbyl" refers to a functional group derived from a straight chain, branched, or cyclic hydrocarbon, such as an alkyl, alkenyl, alkynyl, aryl, cycloalkyl, acyl, or a combination thereof.

Organoboronate Nanoparticle

In various embodiments, the present invention provides one or more organoboronate nanoparticles. The nanoparticle includes a polymer including a repeating unit including at least one organoboronate functional group. The nanoparticle can include the polymer in any suitable proportion; for example, the nanoparticle can include about 0.0001 wt % or less, or about 0.001 wt %, 0.01, 0.1, 1, 2, 3, 4, 5, 10, 20, 30, 40, 50, 60, 70, 80, 90, 95, 96, 97, 98, 99, 99.9, 99.99, 99.999, or about 99.9999 wt % or more of the polymer. In some examples, the polymer can be the nanoparticle, and the nanoparticle consists of or consists essentially of the polymer; in other embodiments, the nanoparticle includes components in addition to the polymer. The polymer can include the organoboronate repeating unit in any suitable proportion; for example, the nanoparticle can include 0.0001 mol % of organoboronate-containing repeating units, or less, or about 0.001 mol %, 0.01, 0.1, 1, 2, 3, 4, 5, 10, 20, 30, 40, 50, 60, 70, 80, 90, 95, 96, 97, 98, 99, 99.9, 99.99, 99.999, or about 99.9999 mol % or more of the organoboronate-containing repeating units. The polymer can be any suitable polymer. The organoboronate functional group can be any boronate ester (e.g. ester of boronic acid) including an organic group. The repeating group can be an organic group. Embodiments of the present invention also provide any composition that includes at least one of the nanoparticles, and any method of using at least one of the nanoparticles.

The polymer can be the product of any suitable reaction. In one example, the polymer can be a reaction product of a composition including a phenylboronic acid-functional compound and a hydroxyphenyl-functional compound. In some embodiments, the polymer is a hyperbranched polymer, a dendronized polymer, or a polymer brush.

In some embodiments, the polymer can be a reaction product of a composition including a compound having the structure:

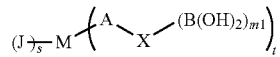

and a compound having the structure:

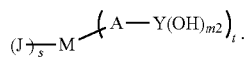

The variable M is independently at each occurrence selected from the group consisting of N, P, and C. At each occurrence s is independently chosen from 0, 1, 2, and 3. At each occurrence t is independently chosen from 1, 2, 3, and 4. If M=N or P then s+t=3 and if M=C then s+t=4. In some embodiments, t can be at least 2. Each of A, X, and Y, independently at each occurrence, can be a $(C_{2-15})$hydrocarbyl group, unsubstituted or optionally substituted with at least one J, and optionally interrupted or terminated by one to three amine groups. The variable A can be divalent, X has valency of 1+m1, and Y has valency of 1+m2. The variable J independently at each occurrence can be selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(O)R, N(R)C(S)R, $N(R)C(O)N(R)_2$, $N(R)C(S)N(R)_2$, N(C(O)R)C(O)R, N(OR)R, $C(=NH)N(R)_2$, C(O)N(OR)R, and C(=NOR)R, wherein R can be independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J. Each m1 can be independently at each occurrence 1 to 5 and each m2 is independently at each occurrence 1 to 5.

In some embodiments, the polymer can be a reaction product of a composition including a compound having the structure:

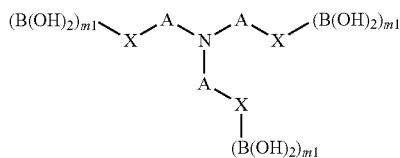

and a compound having the structure:

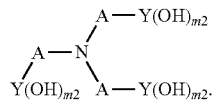

Each of A, X, and Y, independently at each occurrence, can be a $(C_{2-15})$hydrocarbyl group, unsubstituted or optionally substituted with at least one J, and optionally interrupted or terminated by one to three amine groups, wherein A can be divalent, X has valency of 1+m1, and Y has valency of 1+m2. The variable J independently at each occurrence can be selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(O)R, N(R)C(S)R, $N(R)C(O)N(R)_2$, $N(R)C(S)N(R)_2$, N(C(O)R)C(O)R, N(OR)R, $C(=NH)N(R)_2$, C(O)N(OR)R, and C(=NOR)R. The variable R can be independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J. The variable m1 can be independently at each occurrence 1 to 5 and each m2 can be independently at each occurrence 1 to 5.

In some embodiments, the polymer can be a reaction product of a composition including a compound having the structure:

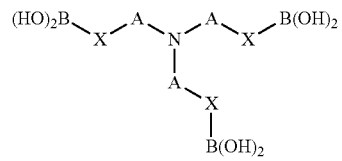

and a compound having the structure:

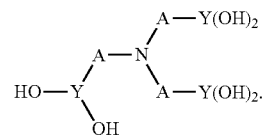

Each of A, X, and Y, independently at each occurrence, can be a $(C_{2-15})$hydrocarbyl group, unsubstituted or optionally substituted with at least one J, and optionally interrupted or terminated by one to three amine groups, wherein A and X are divalent, and Y can be trivalent. The variable J independently at each occurrence can be selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(O)R, N(R)C(S)R, $N(R)C(O)N(R)_2$, $N(R)C(S)N(R)_2$, N(C(O)R)C(O)R, N(OR)R, $C(=NH)N(R)_2$, C(O)N(OR)R, and C(=NOR)R. The variable R can be independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, and wherein each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J.

In the structures of starting materials for the polymer given herein, in some embodiments, each A independently at each occurrence can be a divalent N—$((C_{0-10})$alkyl)amino$(C_{1-10})$alkenyl group. Each A independently at each occurrence can be a divalent N—$((C_{0-10})$alkyl)formimidoyl group. Each A can be a divalent N-ethylformimidoyl group

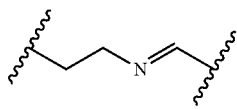 [SMILES: */C=N/CC*]

wherein the formimidoyl group can be directly bound to Y or X (e.g., wherein the carbon double-bonded to the nitrogen is directly bonded to Y or X). In some embodiments, A can be a $C_1$ hydrocarbyl group terminated by an amine having a double bond to the carbon, —C═N—.

In some embodiments, each Y independently at each occurrence can be a 1-($C_{0-7}$)alkylphenyl group, wherein the phenyl group is hydroxy-bound (e.g., wherein the phenyl group, rather than the ($C_{0-7}$)alkyl group, is bound to the two hydroxy groups; when the ($C_{0-7}$)alkyl group has C═0, Y is bound to A and the two hydroxy groups). The variable Y can be a trivalent 1,4,5-substituted phenyl group. The variable Y can be a trivalent 1,4,5-substituted phenyl group, wherein the 1-position can be bound to A and the 4- and 5-positions are hydroxy-bound. In various embodiments, X independently at each occurrence can be a divalent 1-($C_{0-7}$)alkylphenyl group, wherein the phenyl group boron-bound (e.g., wherein the phenyl group, rather than the ($C_{0-7}$)alkyl group, is bound to the $B(OH)_2$ group; when ($C_{0-7}$)alkyl has C═0, the phenyl group is bound to boron and A). The variable X can be a divalent 1,4-substituted phenyl group.

In various embodiments, the polymer can be a reaction product of a composition including a compound having the structure:

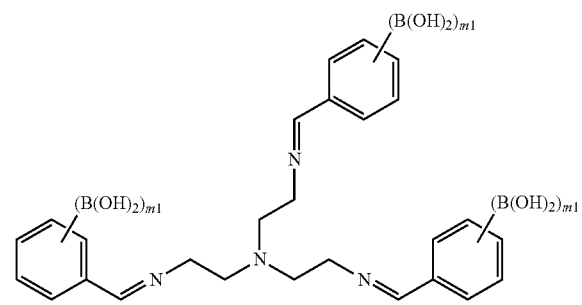

and a compound having the structure:

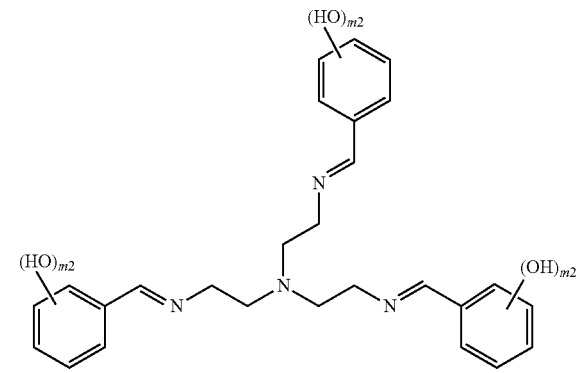

The variable m1 can be independently at each occurrence 1 to 5, and each m2 can be independently at each occurrence 1 to 5. In one example, m1 can be 1 and the phenyl groups can be 1,4-substituted. In one example, m2 can be 1 and the phenyl groups can be 1,4-substituted.

In some embodiments, the polymer can be a reaction product of a composition including a compound having the structure:

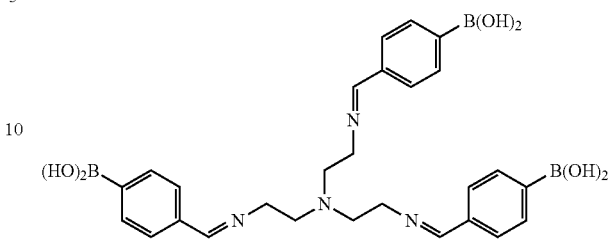

and a compound having the structure:

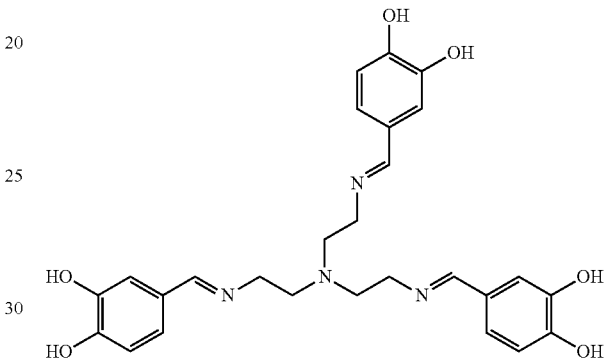

In various embodiments, the present invention provides a method of making a nanoparticle. The method can include forming a composition that includes a compound having the structure:

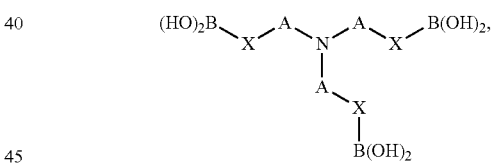

And a compound having the structure

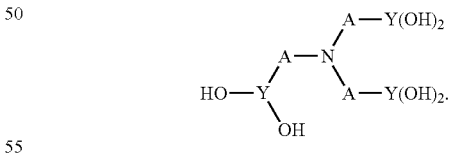

Each of A, X, and Y, independently at each occurrence, can be a ($C_{2-15}$)hydrocarbyl group, unsubstituted or optionally substituted with at least one J, and optionally interrupted or terminated by one to three amine groups, wherein A and X are divalent, and Y can be trivalent. The variable J independently at each occurrence can be selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, C(O)$CH_2$C(O)R, C(S)R, C(O)OR, OC(O)R, OC(O)OR, C(O)$N(R)_2$, OC(O)N(R)$_2$, C(S)N(R)$_2$, $(CH_2)_{0-2}$NHC(O)R, N(R)N(R)C(O)R, N(R)N(R)C(O)OR, N(R)N(R)C(O)N(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(C(O)R)C(O)R, N(OR)R, C(=NH)N(R)$_2$, C(O)N(OR)R, and C(=NOR)R. The variable R can be independently at each occurrence selected from the group consisting of hydrogen, (C$_1$-C$_{20}$)alkyl, (C$_1$-C$_{10}$)cycloalkyl, (C$_1$-C$_{10}$)cycloalkyl(C$_1$-C$_{10}$)alkyl, (C$_1$-C$_{10}$)aryl, (C$_1$-C$_{10}$)aralkyl, (C$_1$-C$_{10}$)heterocyclyl, (C$_1$-C$_{10}$)heterocyclyl(C$_1$-C$_{10}$)alkyl, (C$_1$-C$_{10}$)heteroaryl, and (C$_1$-C$_{10}$)heteroaryl(C$_1$-C$_{10}$)alkyl, and wherein each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J. The method can also include reacting the composition under conditions suitable to generate a nanoparticle.

In some embodiments, the repeating unit can have the structure:

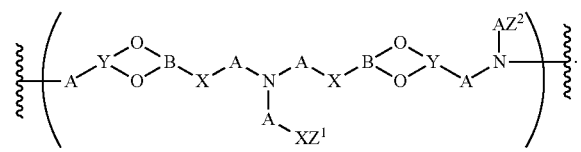

The variable n can be about 2 to about 10,000,000, or about 100 to about 100,000. Each of A, X, and Y, independently at each occurrence, can be a (C$_{2-15}$)hydrocarbyl group, unsubstituted or optionally substituted with at least one J, and optionally interrupted or terminated by one to three amine groups, wherein A and X are divalent, and Y is trivalent. The variable J independently at each occurrence can be selected from the group consisting of F, Cl, Br, I, OR, CN, CF$_3$, OCF$_3$, R, O, S, C(O), S(O), methylenedioxy, ethylenedioxy, N(R)$_2$, SR, S(O)R, SO$_2$R, SO$_2$N(R)$_2$, SO$_3$R, C(O)R, C(O)C(O)R, C(O)CH$_2$C(O)R, C(S)R, C(O)OR, OC(O)R, OC(O)OR, C(O)N(R)$_2$, OC(O)N(R)$_2$, C(S)N(R)$_2$, (CH$_2$)$_{0-2}$NHC(O)R, N(R)N(R)C(O)R, N(R)N(R)C(O)OR, N(R)N(R)C(O)N(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(C(O)R)C(O)R, N(OR)R, C(=NH)N(R)$_2$, C(O)N(OR)R, and C(=NOR)R, wherein R can be independently at each occurrence selected from the group consisting of hydrogen, (C$_1$-C$_{20}$)alkyl, (C$_1$-C$_{10}$)cycloalkyl, (C$_1$-C$_{10}$)cycloalkyl(C$_1$-C$_{10}$)alkyl, (C$_1$-C$_{10}$)aryl, (C$_1$-C$_{10}$)aralkyl, (C$_1$-C$_{10}$)heterocyclyl, (C$_1$-C$_{10}$)heterocyclyl(C$_1$-C$_{10}$)alkyl, (C$_1$-C$_{10}$)heteroaryl, and (C$_1$-C$_{10}$)heteroaryl(C$_1$-C$_{10}$)alkyl, and wherein each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J. In some embodiments, the polymer can have the structure:

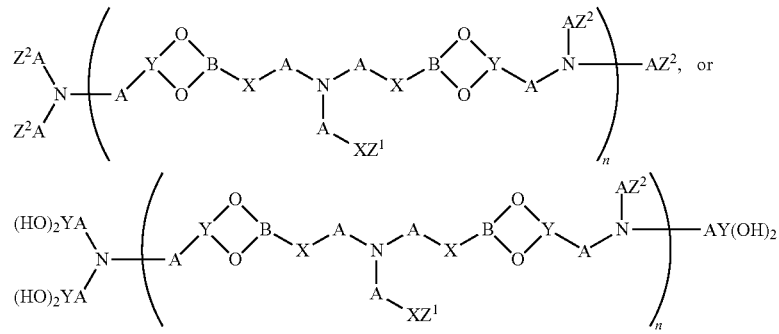

The variable $Z^1$ at each occurrence can be independently selected from

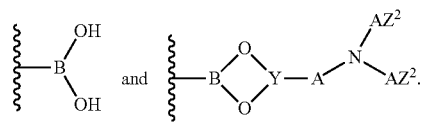

The variable $Z^2$ at each occurrence can be independently selected from

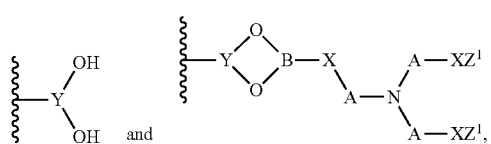

Although some of the examples of the polymer are shown herein to terminate with a Y(OH)$_2$ group, embodiments of the polymer of the present invention can terminate in any suitable fashion. In some examples, the polymer can terminate with a boronic acid group (e.g. —B(OH)$_2$) or any suitable ester thereof. In some examples, the polymer can terminate with a —Y(OH)$_2$ group or a dihydroxyphenyl group, or any suitable ester thereof. In some examples, one end of the polymer can terminate with a boronic acid group or ester thereof, and the other end of the polymer can terminate with a hydroxyphenyl group. In some examples, boronic acid or hydroxyphenyl groups that occur within $Z^1$ or $Z^2$ groups herein can occur at each occurrence independently as any suitable ester thereof, such as any suitable C$_{1-60}$ hydrocarbyl group bound to the oxygen atom thereof.

In the structures for the polymer given herein, in some embodiments, each A independently at each occurrence can be a divalent N—((C$_{0-10}$)alkyl)amino(C$_{1-10}$)alkenyl group. Each A independently at each occurrence can be a divalent N—(($C_{0-10}$)alkyl)formimidoyl group. Each A can be a divalent N-ethylformimidoyl group

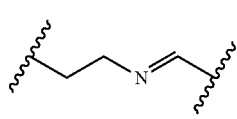 [SMILES: */C=N/CC*]

wherein the formimidoyl group can be directly bound to Y or X (e.g., wherein the carbon double-bonded to the nitrogen is directly bonded to Y or X). In some embodiments, A can be a $C_1$ hydrocarbyl group terminated by an amine having a double bond to the carbon, —C=N—.

In some embodiments, each Y independently at each occurrence can be a 1-($C_{0-7}$)alkylphenyl group, wherein the phenyl group is hydroxy-bound (e.g., wherein the phenyl group, rather than the ($C_{0-7}$)alkyl group, is bound to the two hydroxy groups; when the ($C_{0-7}$)alkyl group has C=0, Y is bound to A and the two hydroxy groups). The variable Y can be a trivalent 1,4,5-substituted phenyl group. The variable Y can be a trivalent 1,4,5-substituted phenyl group, wherein the 1-position can be bound to A and the 4- and 5-positions are hydroxy-bound. In various embodiments, X independently at each occurrence can be a divalent 1-($C_{0-7}$)alkylphenyl group, wherein the phenyl group boron-bound (e.g., wherein the phenyl group, rather than the ($C_{0-7}$)alkyl group, is bound to the $B(OH)_2$ group; when ($C_{0-7}$)alkyl has C=0, the phenyl group is bound to boron and A). The variable X can be a divalent 1,4-substituted phenyl group.

The polymer can be a product of a composition including any suitable boronic acid-containing compound and hydroxy-containing compound. For example, the polymer can be a reaction product of a compound having 1, 2, 3, 4, 5, or 6 —$B(OH)_2$ groups, and of another compound having 1, 2, 3, 4, 5, or 6 hydroxy groups.

In some embodiments, the polymer can have the structure:

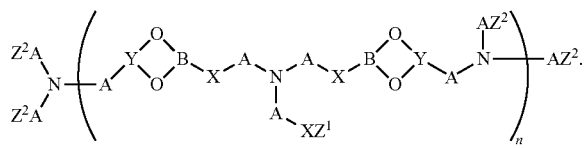

The variable $Z^1$ at each occurrence can be independently selected from

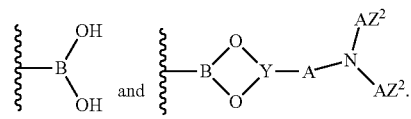

The variable $Z^2$ at each occurrence can be independently selected from

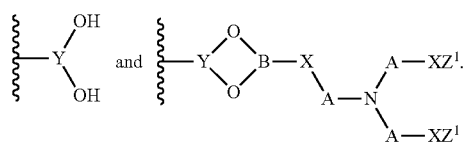

The variable A can be a divalent N-ethylformimidoyl group

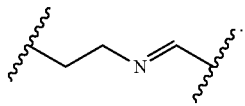 [SMILES: */C=N/CC*]

The formimidoyl group can be directly bound to Y or X. The variable X is a 1,4-divalent phenyl group, and Y can be a 1,3,4-trivalent phenyl group. The variable n can be about 2 to about 10,000,000, or about 100 to about 100,000.

In some embodiments, the polymer can be a reaction product of a composition including a bis-(mono or polyboronic acid-substituted) compound and a bis-(mono or polyhydroxy-substituted) compound, for example of a composition including a compound having the structure:

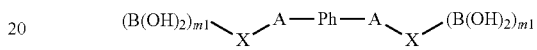

and a compound having the structure:

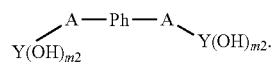

Each of A, X, and Y, independently at each occurrence, can be a ($C_{2-15}$)hydrocarbyl group, unsubstituted or optionally substituted with at least one J, and optionally interrupted or terminated by one to three amine groups, wherein A can be divalent, X has valency of 1+m1, and Y has valency of 1+m2. The variable J independently at each occurrence can be selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(O)R, N(R)C(S)R, $N(R)C(O)N(R)_2$, N(R)C(S)N(R)_2, N(C(O)R)C(O)R, N(OR)R, C(=NH)N(R)_2, C(O)N(OR)R, and C(=NOR)R. The variable R can be independently at each occurrence selected from the group consisting of hydrogen, ($C_1$-$C_{20}$)alkyl, ($C_1$-$C_{10}$)cycloalkyl, ($C_1$-$C_{10}$)cycloalkyl($C_1$-$C_{10}$)alkyl, ($C_1$-$C_{10}$)aryl, ($C_1$-$C_{10}$)aralkyl, ($C_1$-$C_{10}$)heterocyclyl, ($C_1$-$C_{10}$)heterocyclyl($C_1$-$C_{10}$)alkyl, ($C_1$-$C_{10}$)heteroaryl, and ($C_1$-$C_{10}$)heteroaryl($C_1$-$C_{10}$)alkyl, wherein each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J. Each m1 can be independently at each occurrence 1 to 5 and each m2 can be independently at each occurrence 1 to 5.

In some embodiments, the polymer can be a reaction product of a composition including a bis-(monoboronic acid-substituted) compound and a bis-(dihydroxy-substituted) compound, for example, wherein the repeating unit of the polymer has the structure:

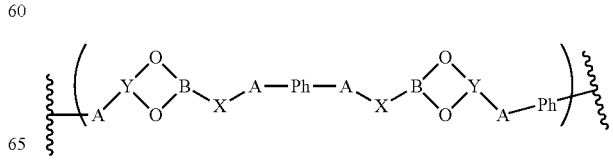

In some embodiments, the polymer can be a reaction product of a composition including a bis-(monoboronic acid-substituted) compound and a bis-(dihydroxy-substituted) compound, for example, wherein the polymer has the structure:

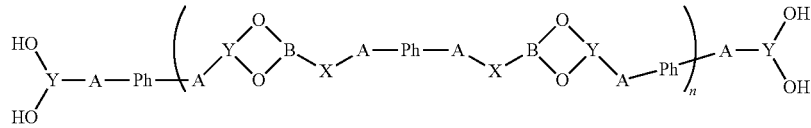

The variable n can be about 2 to about 10,000,000, or about 100 to about 100,000. Each of A, X, and Y, independently at each occurrence, can be a ($C_{2-15}$)hydrocarbyl group, unsubstituted or optionally substituted with at least one J, and optionally interrupted or terminated by one to three amine groups, wherein A and X can be divalent, and Y can be trivalent. The variable J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(O)R, N(R)C(S)R, $N(R)C(O)N(R)_2$, N(R)C(S)N(R)_2, N(C(O)R)C(O)R, N(OR)R, $C(=NH)N(R)_2$, C(O)N(OR)R, and C(=NOR)R. The variable R can be independently at each occurrence selected from the group consisting of hydrogen, ($C_1$-$C_{20}$)alkyl, ($C_1$-$C_{10}$)cycloalkyl, ($C_1$-$C_{10}$)cycloalkyl($C_1$-$C_{10}$)alkyl, ($C_1$-$C_{10}$)aryl, ($C_1$-$C_{10}$)aralkyl, ($C_1$-$C_{10}$)heterocyclyl, ($C_1$-$C_{10}$)heterocyclyl($C_1$-$C_{10}$)alkyl, ($C_1$-$C_{10}$)heteroaryl, and ($C_1$-$C_{10}$)heteroaryl($C_1$-$C_{10}$)alkyl, and wherein each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J. In an example, A is a $C_1$ hydrocarbyl group terminated by an amine having a double bond to the carbon, —C=N—.

In various embodiments, the present invention provides a nanoparticle including a polymer including a reaction product of a composition including a compound having the structure:

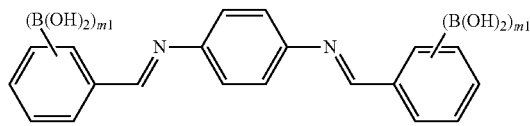

and a compound having the structure:

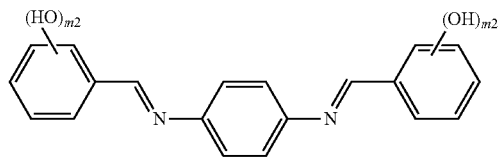

wherein each m1 is independently at each occurrence 1 to 5 and each m2 is independently at each occurrence 1 to 5. In some embodiments, m1 is 1 and the —$B(OH)_2$ group is at the 4-position. In some embodiments, m2 is 2 and the hydroxyl groups are at the 3- and 4-positions. In various embodiments, the central phenyl group can be substituted or unsubstituted, or can be replaced with another suitable moiety, such as any divalent organic group, such as a substituted or unsubstituted ($C_1$-$C_{20}$)hydrocarbylene.

The nanoparticle can have any suitable shape consistent with the synthetic techniques described herein. For example, the nanoparticle can be approximately spherical. The nanoparticle can have any suitable size. For example, the diameter of the nanoparticle can be about 1 nm to 1000 nm, 10 to 300 nm, or about 50-250 nm.

Encapsulant

In various examples, the nanoparticle can include an encapsulant. The encapsulant can be any suitable material that can be encapsulated by the nanoparticle. In some examples, the encapsulant can be added during the synthesis of the nanoparticle, such that the polymer forms around the encapsulant. In some examples, the encapsulant can be one or more hydrophobic molecules.

In some embodiments, the nanoparticle can include about 0.0001 wt % or less encapsulant, or about 0.001 wt %, 0.01, 0.1, 1, 2, 3, 4, 5, 10, 20, 30, 40, 50, 60, 70, 80, 90, 95, 96, 97, 98, 99, 99.9, 99.99, 99.999, or about 99.9999 wt % or more of the encapsulant. In some examples, the nanoparticle includes about 0.1 wt % to about 70 wt %, or about 1 wt % to about 40 wt % of the at least one encapsulant.

For nanoparticles including encapsulants, in various embodiments, the nanoparticle can stably encapsulate the encapsulant in suitable conditions for any suitable amount of time. For example, at approximately neutral pH conditions (e.g. pH 7.5, or about 7-8, or about 6.5-8.5), various embodiments of the nanoparticle can release substantially no encapsulant over a time period of about 2 days or less, or about 3 days, 4, 5, 6, 1 week, 2 weeks, 1 month, 2 months, 6 months, or over about 1 year or more.

Various embodiments of the nanoparticles can be subjected to suitable conditions to cause the release of at least some of the encapsulant therein. For example, at low pH (e.g., less than about 6.5, or about 5 (or less) to 6.5, or about 5 (or less) to 6), the nanoparticle can release the encapsulant over a suitable period of time. In another example, upon contacting with a boronic acid binder, the nanoparticle can release the encapsulant over the a suitable period of time. In some examples, a boronic acid binder can be a carbohydrate, such as glucose, such as D-glucose.

In some embodiments, the nanoparticles can be subjected to various stimuli to affect stimuli-sensitive functional groups and to thereby cause the release of an encapsulant. The stimuli-sensitive groups can be any suitable group, and can be part of the backbone of the polymer or can be functional groups appended thereto. The release can be any suitable type of release, such as a slow release or a fast release. The mechanism of the release can include, for example, cleavage of one or more locations of the polymer or altering the morphology of the polymer. The encapsulant can be a drug. The stimuli can be any suitable stimuli that enables the drug encapsulant to be released in a therapeutically useful location in a therapeutically useful concentration.

In various embodiments, the present invention provides a method of using a nanoparticle having an encapsulant therein. The method includes obtaining or providing a nanoparticle having encapsulant therein. The method also includes subjecting the nanoparticle to conditions sufficient to cause at least some of the encapsulant to be released from the nanoparticle.

Surface Functionalization

In various examples, the nanoparticles can be functionalized at their surface. By suitably varying the proportion of starting materials, the proportion of unreacted boronic acid or hydroxy groups at the surface of the nanoparticle can be varied. For example, by using an excess of boronic acid-substituted starting material, the nanoparticle product can have an excess of boronic acid-functionalities at its surface. In another example, by using an excess of hydroxy-substituted starting material, the nanoparticle product can have an excess of hydroxy substituents at its surface.

The surface of the nanoparticle can be allowed to react with any material having a functional group capable of reacting with and forming a bond with the excess boronic acid functionalities or the excess hydroxy functionalities. In one example, a surface functionalization agent having at least one boronic acid moiety therein can be allowed to react with a nanoparticle having excess hydroxy substitutent at the surface, forming an ester of the boronic acid and thereby forming a covalent bond between the surface functionalization agent and the surface of the nanoparticle. In another example, a surface functionalization agent having at least one hydroxy moiety therein can be allowed to react with a nanoparticle having excess boronic acid substituents at its surface, forming an ester of the boronic acid and thereby forming a covalent bond between the surface functionalization agent and the surface of the nanoparticle.

The surface functionalization agent can have any suitable structure, provided the structure includes a functional group that can react at the surface of the nanoparticle with either a boronic acid functionality or a hydroxy functionality. For example, the surface functionalization agent can be $(HO)_2Y$-J or $(HO)_2Y$—$R^1$—$R^2$. The variable Y can be a divalent or trivalent $(C_{2-15})$hydrocarbyl group, unsubstituted or optionally substituted with at least one J, and optionally interrupted or terminated by one to three amine groups. The variable $R^1$ can be $(C_1-C_{10})$hydrocarbyl, optionally interrupted or terminated by one or more amino-groups, optionally unsubstituted or substituted with at least one J. The variable $R^2$ can be H, $(C_3-C_{10})$cycloalkyl$(C_0-C_{10})$alkyl, $(C_1-C_{10})$heterocyclyl$(C_0-C_{10})$alkyl, $(C_4-C_{10})$aryl$(C_0-C_{10})$alkyl, or $(C_1-C_{10})$heteroaryl $(C_0-C_{10})$alkyl; wherein each alkyl, cycloalkyl, aryl, heterocyclyl, and heteroaryl can be independently unsubstituted or further substituted with at least one J. The variable J independently at each occurrence can be selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(O)R, N(R)C(S)R, N(R)C(O)N(R)_2$, $N(R)C(S)N(R)_2$, N(C(O)R)C(O)R, N(OR)R, $C(=NH)N(R)_2$, C(O)N(OR)R, and C(=NOR)R. The variable R can be independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J.

In some examples, the surface functionalization agent can be

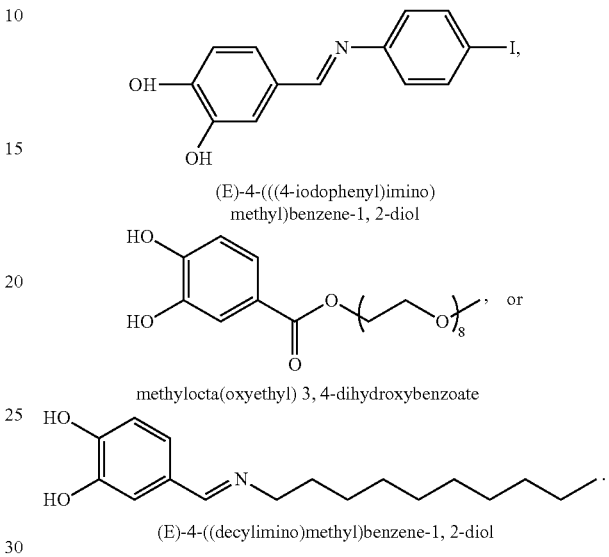

(E)-4-(((4-iodophenyl)imino)methyl)benzene-1, 2-diol methylocta(oxyethyl) 3, 4-dihydroxybenzoate (E)-4-((decylimino)methyl)benzene-1, 2-diol In some examples, the surface-functionalization agent can be $(HO)_2B$—X—$R^1$—$R^2$. The variable X can be a divalent $(C_{2-15})$hydrocarbyl group, unsubstituted or optionally substituted with at least one J, and optionally interrupted or terminated by one to three amine groups. The variable $R^1$ can be $(C_1-C_{10})$hydrocarbyl, optionally interrupted or terminated by one or more amino-groups, optionally unsubstituted or substituted with at least one J. The variable $R^2$ can be H, $(C_3-C_{10})$cycloalkyl$(C_0-C_{10})$alkyl, $(C_1-C_{10})$heterocyclyl$(C_0-C_{10})$alkyl, $(C_4-C_{10})$aryl$(C_0-C_{10})$alkyl, or $(C_1-C_{10})$heteroaryl$(C_0-C_{10})$alkyl; wherein each alkyl, cycloalkyl, aryl, heterocyclyl, and heteroaryl can be independently unsubstituted or further substituted with at least one J. The variable J independently at each occurrence can be selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)SO_2N(R)_2$, N(R)C(O)OR, N(R)C(O)R, N(R)C(S)R, N(R)C(O)N(R)_2$, $N(R)C(S)N(R)_2$, N(C(O)R)C(O)R, N(OR)R, $C(=NH)N(R)_2$, C(O)N(OR)R, and C(=NOR)R. The variable R independently at each occurrence can be selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl can be independently unsubstituted or substituted with 1-3 J.

In some embodiments, the surface functionalization agent can be

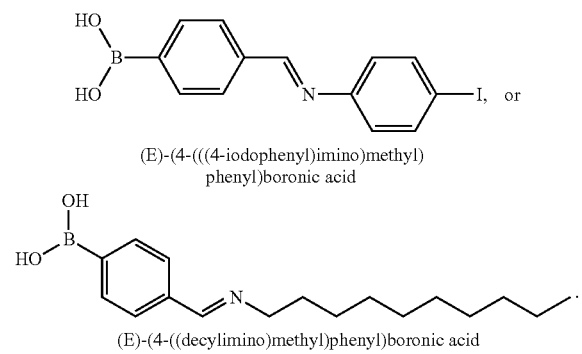

(E)-(4-(((4-iodophenyl)imino)methyl)phenyl)boronic acid (E)-(4-((decylimino)methyl)phenyl)boronic acid Coating of Objects In some examples the present invention provides an object coated with the nanoparticles of the present invention. The object can be any suitable object. For example, the object can be a nanoobject. In some examples, the object can be nanorod or a nanosphere.

In some embodiments, the present invention provides a method of using the one or more nanoparticles to coat an object. The method includes obtaining or providing the nanoparticles of an embodiment of the present invention, and also includes coating an object with the nanoparticles using any suitable method.

EXAMPLES

The present invention can be better understood by reference to the following examples which are offered by way of illustration. The present invention is not limited to the examples given herein.

Materials.

Tris(2-aminoethyl)amine, 3,4-dihydroxybenzaldehyde, 4-formylphenylboronic acid, 4-iodoaniline, decylamine, 3,4-dihydroxybenzoic acid, cetyl trimethyl ammonium bromide (CTAB), poly(ethylene glycol) methyl ether ($M_n$:350), p-toluenesulfonic acid monohydrate, 3,3'-dioctadecyloxacarbocyanine perchlorate (DiO), 1,1'-dioctadecyl-3,3,3',3'-tetramethylindocarbocyanine perchlorate (DiI) and other conventional reagents were obtained from commercial sources and were used as received, unless otherwise mentioned.

Characterization.

$^1$H-NMR spectra were recorded on a 400 MHz Bruker NMR spectrometer with 1000 scans at a relaxation time of 2 s. Dynamic light scattering (DLS) measurements were performed by using a Malvern Nanozetasizer. The fluorescence spectra were obtained from a JASCO FP-6500 spectrofluorimeter. UV/Vis spectra of the samples in aqueous solutions were measured on a Unico UV/Vis 2802PCS instrument. Transmission electron microscopy (TEM) images were taken from JEOL 2000FX at 200 KV. FT-IR spectra were tested by a Bruker Alpha-P Diamond ATR-FTIR. X-ray photoelectron spectroscopy (XPS) was performed with a Physical Electronics Quantum 2000 (the angel is 45°, which leads to a sampling depth of approximately 25 angstrom). Contact angles of water were examined on a Ramé-Hart telescopic goniometer. To make the samples for XPS and contact angle testing, BON in aqueous solutions were dropped onto a silicon slides and dried at room temperature.

Example 1

Boronate Ester Formation Reaction to Generate Boronate Organic Nanoparticles (BON)

Example 1-1

Synthesis of tris{2-[(4-boronicacidbenzylidene)imino]ethyl}amine (1)

To a solution of 4-formylphenylboronic acid (0.45 g, 3 mmol) in 5 mL of methanol and 10 mL of dichloromethane (DCM), was added tris(2-aminoethyl)amine (0.146 g, 1 mmol) in 5 mL DCM dropwise. The reaction mixture was stirred at ambient temperature overnight. After 80% of the solvent was removed by rotary evaporation, the mixture was stored at −4° C. overnight. The crystalline precipitate was filtered and dried in vacuo to obtain a yellowish solid (yield: 85%). $^1$H NMR (400 MHz, methanol-$D_4$, ppm) δ 2.95 (t, 6H), 3.65-3.72 (t, 6H), 6.70-7.23 (d, 12H), 7.90-8.12 (s, 3H). $^{13}$C NMR (400 MHz, methanol-$D_4$, ppm) δ 55.1, 58.5, 126.8, 127.1, 128.0, 133.6, 164.2.

Example 1-2

Synthesis of tris{2-[(3,4-dihydroxybenzylidene)imino]ethyl}amine (2)

The preparation of 2 is similar to that of 1 with a slight modification. 3,4-Dihydroxybenzaldehyde (0.414 g, 3 mmol) was dissolved in methanol (5 mL) and DCM (10 mL). Then 0.146 g (1 mmol) of tris(2-aminoethyl)amine in 5 mL DCM was added dropwise into the formal solution of 3,4-dihydroxybenzaldehyde. After reacting overnight at ambient temperature, a brown precipitate was formed. The precipitate was collected by filtration, and washed three times using a 1:2 methanol:DCM mixture. The final product was obtained after drying under vacuum at room temperature (yield: 87%). $^1$H NMR (400 MHz, methanol-$D_4$, ppm) δ 2.82 (t, 6H), 3.66-3.74 (t, 6H), 6.74-7.25 (d, 9H), 7.88-8.15 (s, 3H). $^{13}$C NMR (400 MHz, methanol-$D_4$, ppm) δ 55.4, 56.6, 112.02, 112.6, 115.5, 123.9, 125.9, 147.0, 163.61.

Figure 1A:
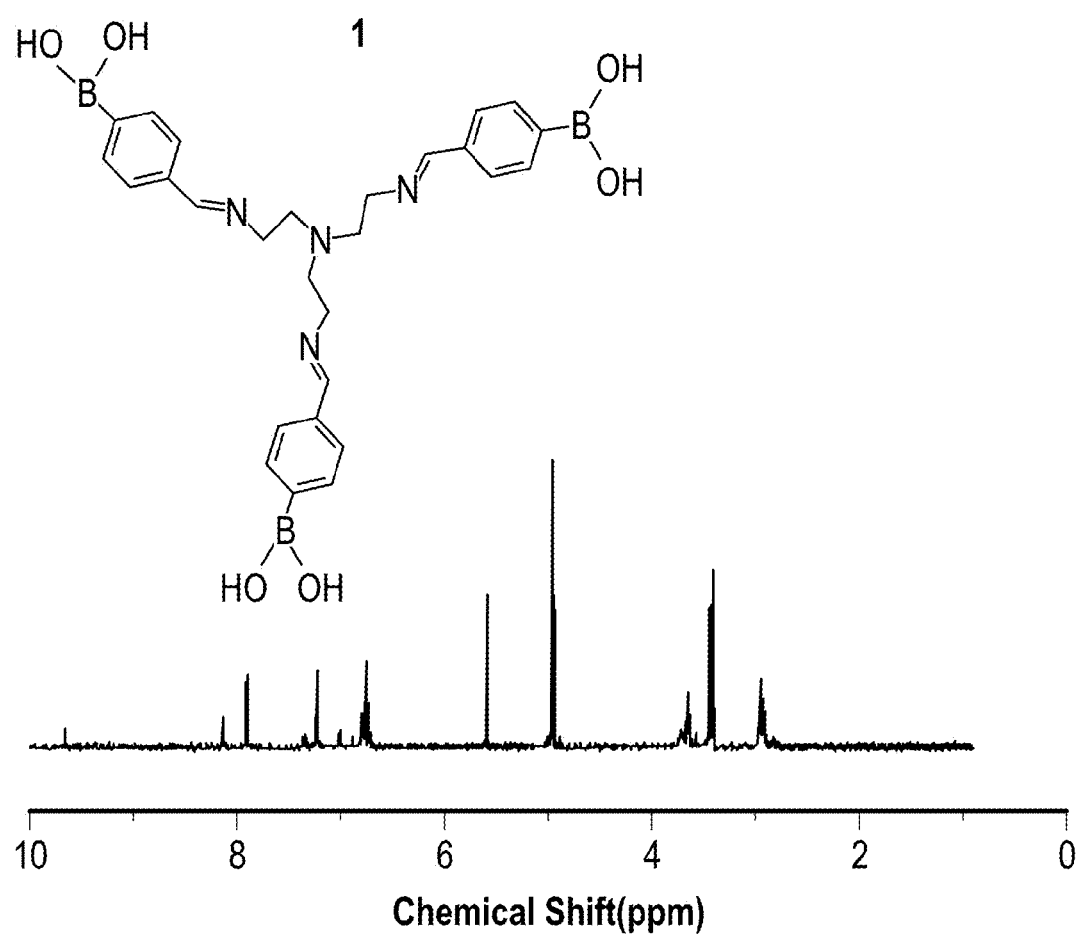
FIG. 1 illustrates $^1$H NMR spectra of tris{2-[(4-boronicacidbenzylidene)imino]ethyl}amine (A) and tris{2-[(3,4-dihydroxybenzylidene)imino]ethyl}amine (B) in methanol-$D_4$, in accordance with various embodiments.
Figure 1B:
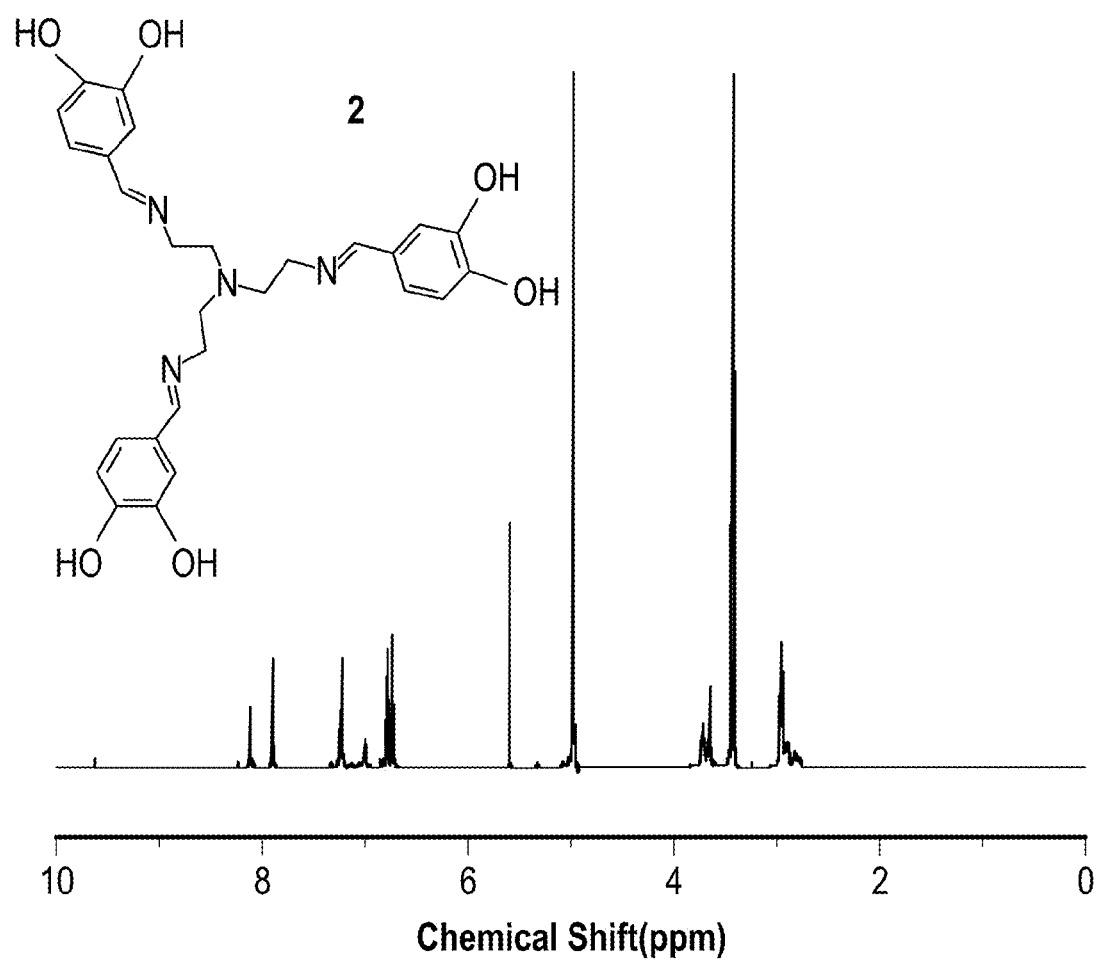
Figure 2A:
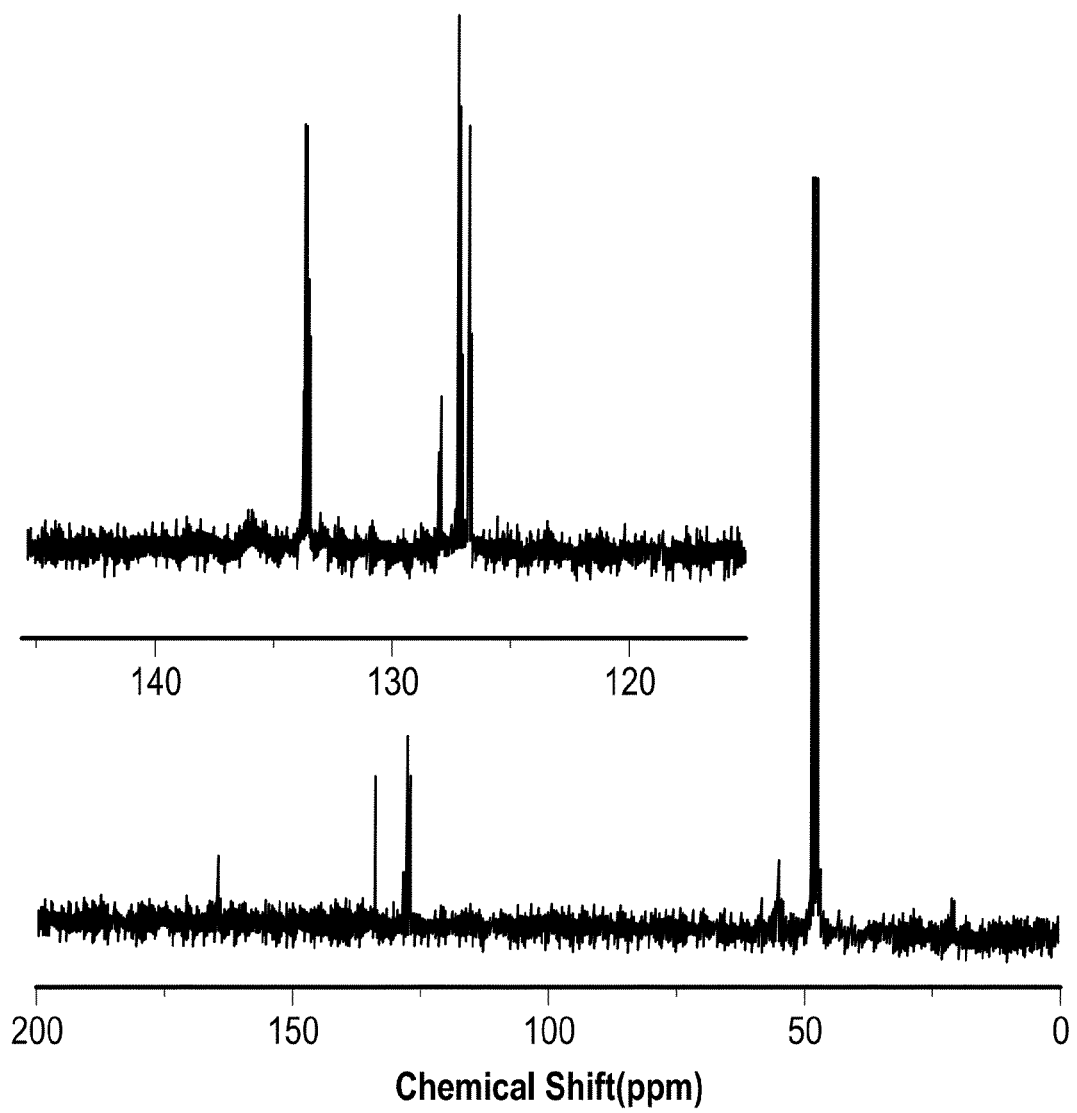
FIG. 2 shows $^{13}$C NMR of tris{2-[(4-boronicacidbenzylidene)imino]ethyl}amine (A) and tris{2-[(3,4-dihydroxybenzylidene)imino]ethyl}amine (B) in methanol-$D_4$, in accordance with various embodiments.
Figure 2B:
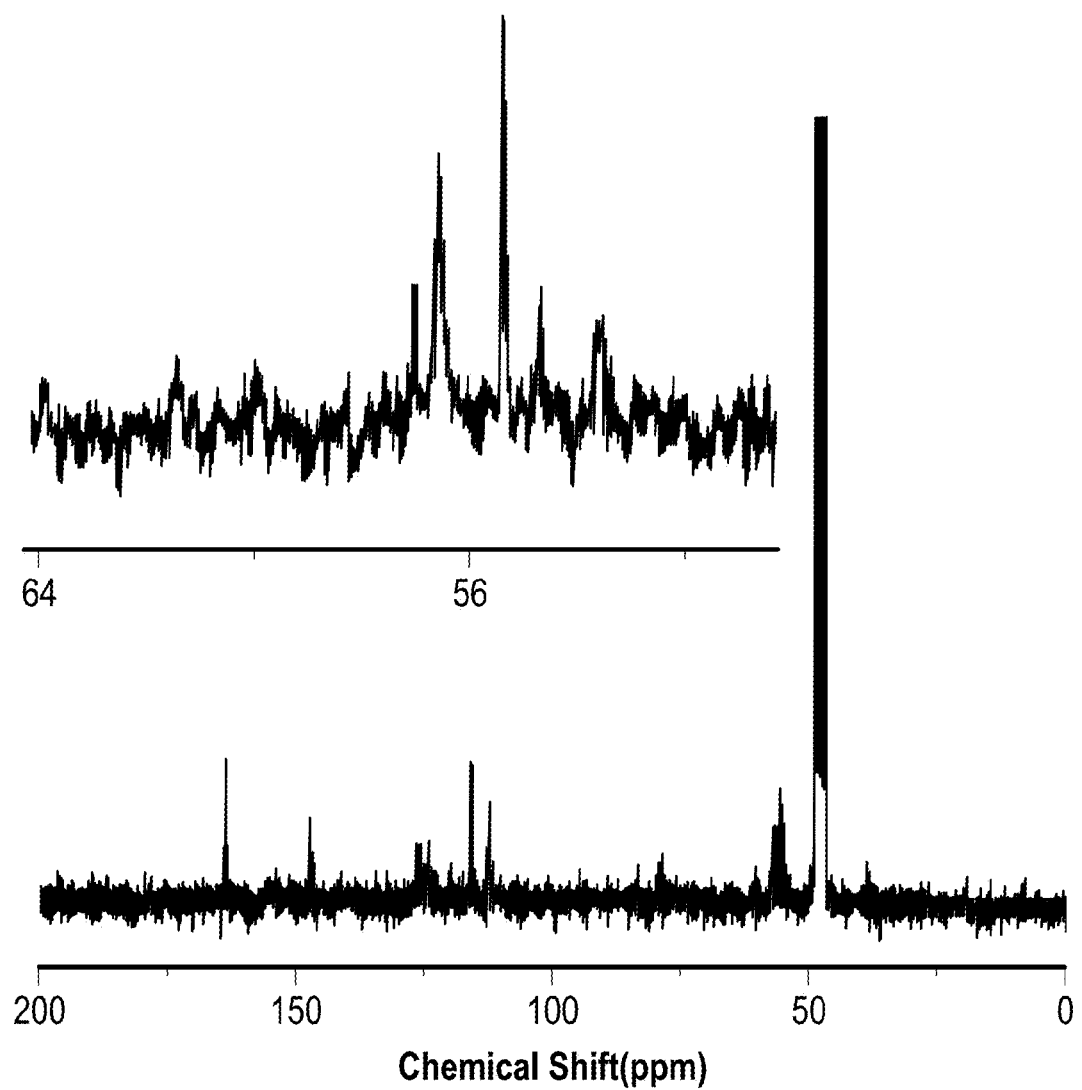

FIG. 1 shows $^1$H NMR spectra of tris{2-[(4-boronicacidbenzylidene)imino]ethyl}amine (A) and tris{2-[(3,4-dihydroxybenzylidene)imino]ethyl}amine (B) in methanol-$D_4$. FIG. 2 shows $^{13}$C NMR of tris{2-[(4-boronicacidbenzylidene)imino]ethyl}amine (A) and tris{2-[(3,4-dihydroxybenzylidene)imino]ethyl}amine (B) in methanol-$D_4$.

Example 1-3

Preparation of BON 5.42 mg (0.01 mmol) of 1 and 5.06 mg (0.01 mmol) of 2 were firstly dissolved in 0.5 mL of methanol to obtain 20.0 mM concentration, separately. Then, the solution made using 2 was injected into a 1 mL aqueous CTAB solution (5 mg/mL). Under stirring, the solution made using 1 was added dropwise into the former mixture. After stirring at ambient temperature for 2 h, BON was obtained. To get purified product, CTAB and unreacted starting molecules were removed by ultrafiltration using a membrane with a molecular weight cutoff of 3,500 g mol$^{-1}$.

Example 1-4

Discussion

Figure 3:
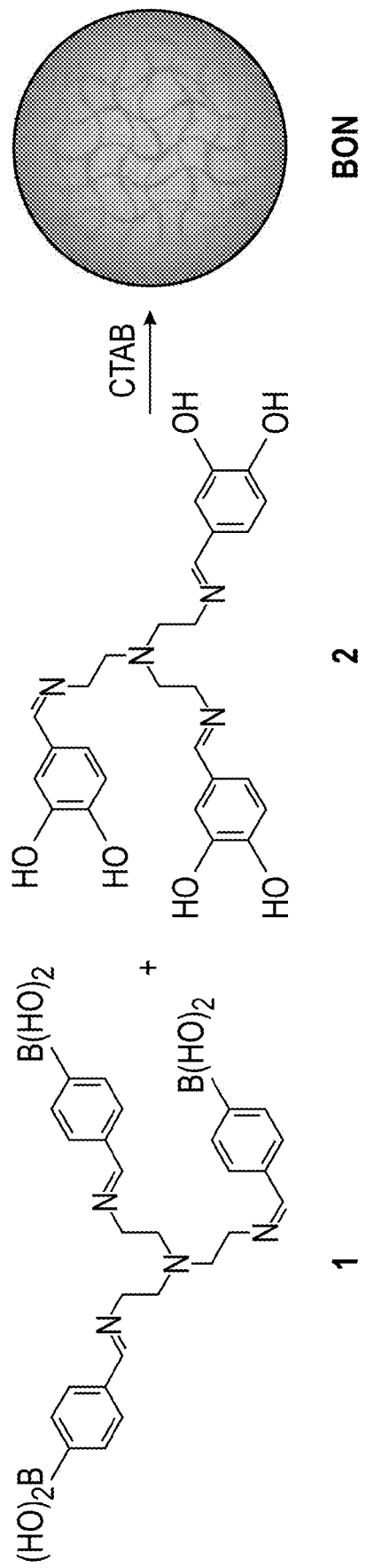
FIG. 3 illustrates the formation of boronate organic nanoparticles (BON), in accordance with various embodiments.
Figure 4:
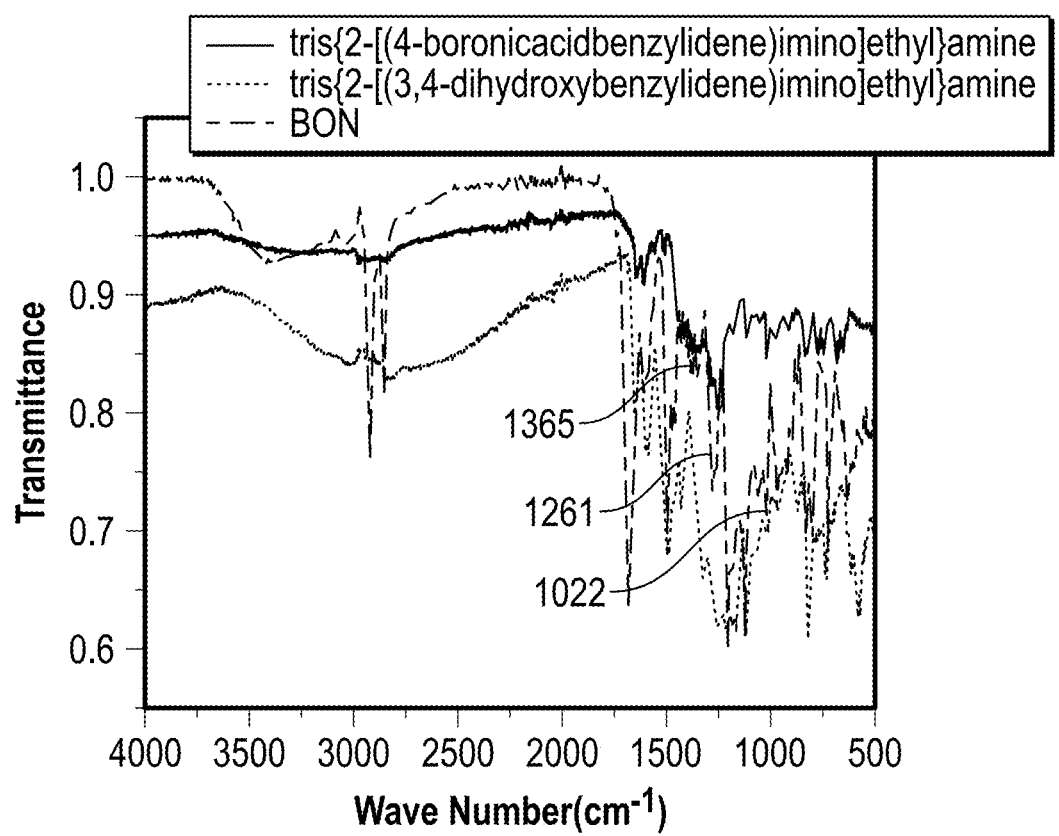
FIG. 4 illustrates FT-IR spectra of tris{2-[(4-boronicacidbenzylidene)imino]ethyl}amine, tris{2-[(3,4-dihydroxybenzylidene)imino]ethyl}amine, and BON, in accordance with various embodiments.

Boronic acid and the catechol molecules at least trimeric in their boronic acid or dihyxroxylphenyl functionality were used. The starting materials can be achieved in one step from commercially available starting materials using a simple synthetic method. Tris{2-[(4-boronicacid benzylidene)imino]ethyl}amine (1) and tris{2-[(3,4-dihydroxy benzylidene)imino]ethyl}amine (2) were chosen as the starting materials. These molecules can be obtained through a condensation reaction between tris(2-aminoethyl)amine and a benzaldehyde. 4-Formylphenylboronic acid and 3,4-dihydroxybenzaldehyde were used as the aldehydes in the syntheses of 1 and 2, respectively. A modified Stöber method was used to carry out a controlled condensation polymerization between 1 and 2 in the presence of cetyltrimethylammonium bromide (CTAB) to obtain the targeted three-dimensional borate network of the nanoparticles, BON (FIG. 3). FIG. 3 illustrates the formation of boronate organic nanoparticles (BON). The formation of the nanoparticles was characterized by the emergence of the boronate ester bonds in IR. Concurrent emergence of the absorption bands at 1365 cm$^{-1}$ (B—O), 1261 cm$^{-1}$ (C—O) and 1022 cm$^{-1}$ (B—C) provided strong evidence for the formation of the BON (FIG. 4). FIG. 4 illustrates FT-IR spectra of tris{2-[(4-boronicacidbenzylidene)imino]ethyl}amine, tris{2-[(3,4-dihydroxybenzylidene)imino]ethyl}amine, and BON.

Example 2

Boronate Organic Nanoparticles Synthesized with Control of Size

Example 2-1

To control particle size and the surface functionality of the BON, the concentration of starting materials were changed. For example, 10.0, 4.0 and 1.0 mg/mL of CTAB were used to measure the influence of CTAB concentration on the particle size of BON, while fixing the concentration of 1 and 2 in methanol at 20.0 mM. To prepare boronic acid terminated BON, 20.4 mM 1 was used to react with 20.0 mM 2 in 5 mg/mL of CTAB aqueous solution. In order to make catechol terminated BON, 20.4 mM 2 was used to react with 20.0 mM 1 in 5 mg/mL of CTAB aqueous solution.

Figure 6A:
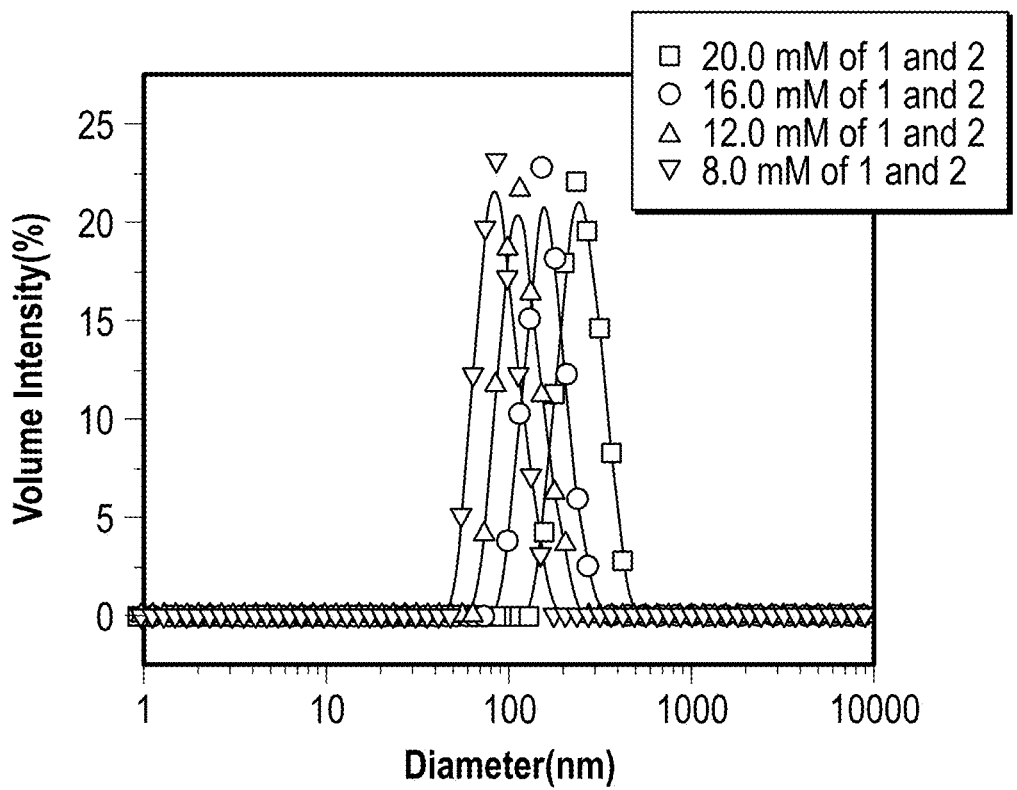
FIGS. 6a-b illustrate full plots of (A) DLS results of BON constructed from various concentrations of 1 (tris{2-[(4-boronicacidbenzylidene)imino]ethyl}amine) and 2 (tris{2-[(3, 4-dihydroxybenzylidene)imino]ethyl}amine); (B) DLS diameter of BON prepared from various concentrations of CTAB, while keeping the concentration of 1 and 2 constant, in accordance with various embodiments.
Figure 6B:
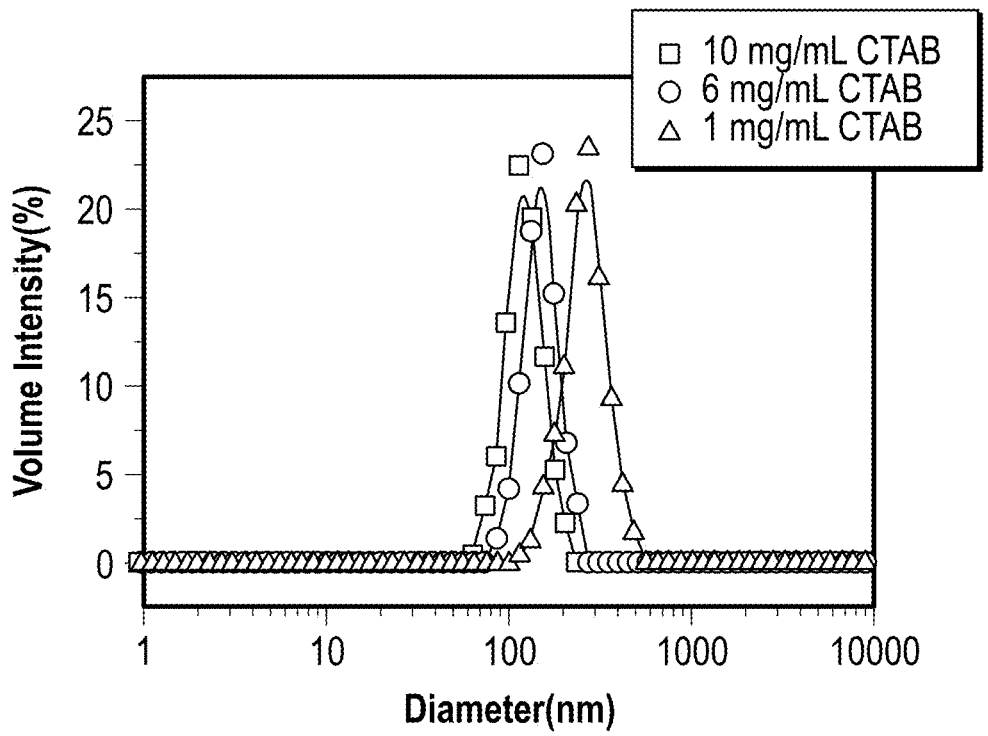

FIGS. 5a-c illustrate TEM images of BON synthesized from different concentrations of CTAB, (A) 10.0, (B) 6.0 and (C) 1.0 mg/mL. The concentrations of 1 and 2 were both kept at 20.0 mM. The scale bars in the TEM images are 400 nm. FIGS. 6a-b illustrate full plots of (A) DLS results of BON constructed from (■) 20.0, (●) 16.0, (▲) 12.0 and 8.0 mM (▼) of 1 and 2; (B) DLS diameter of BON prepared from (■) 10, (●) 6, and (▲) 1 mg/mL of CTAB, while keeping the concentration of 1 and 2 at 20 mM.

Example 2-2

Discussion

Size can be controlled by variations in the: (i) concentrations of the substrate molecules 1 and 2 at constant CTAB concentration; and (ii) CTAB concentration at constant substrate concentrations.

Figure 7A:
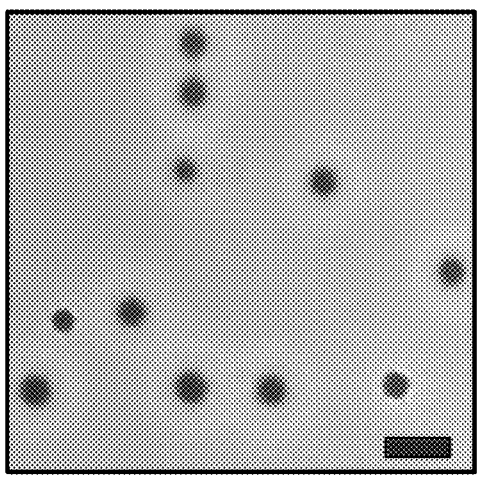
FIGS. 7a-g illustrate (A) TEM image of BON synthesized from 20.0 mM of 1 (tris{2-[(4-boronicacidbenzylidene) imino]ethyl}amine) and 2 (tris{2-[(3,4-dihydroxybenzylidene)imino]ethyl}amine); (B) magnified image of (A); TEM images of BON prepared from (C) 16.0 mM, (D) 12.0 mM and (E) 8.0 mM of 1 and 2, respectively; (F) DLS results of BON from various concentrations of 1 and 2 at 5 mg/mL of CTAB; and (G) DLS of BON at various concentrations of CTAB, at 20 mM of 1 and 2, in accordance with various embodiments.
Figure 7B:
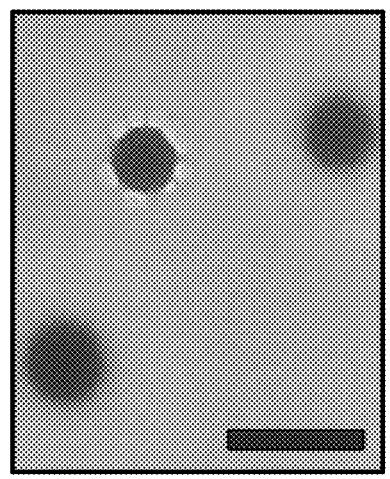
Figure 7C:
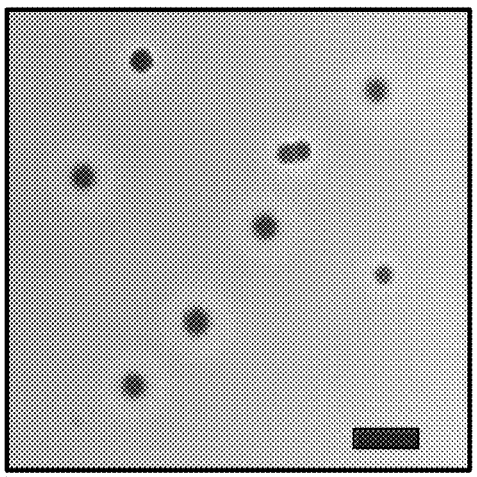
Figure 7D:
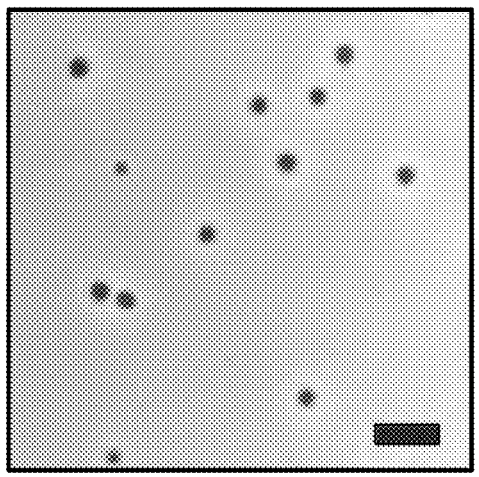
Figure 7E:
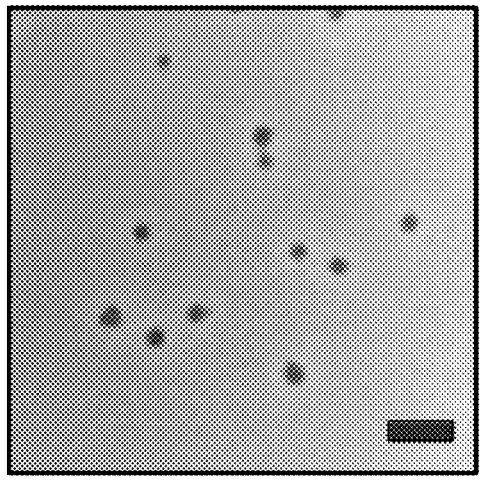
Figure 7F:
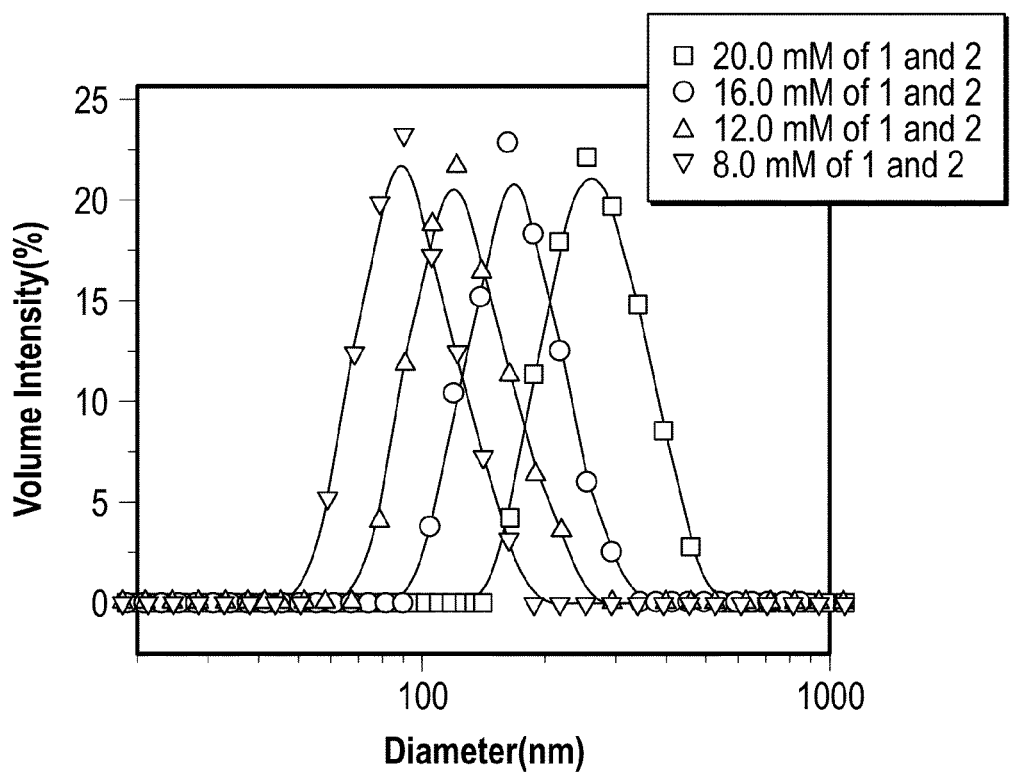
Figure 7G:
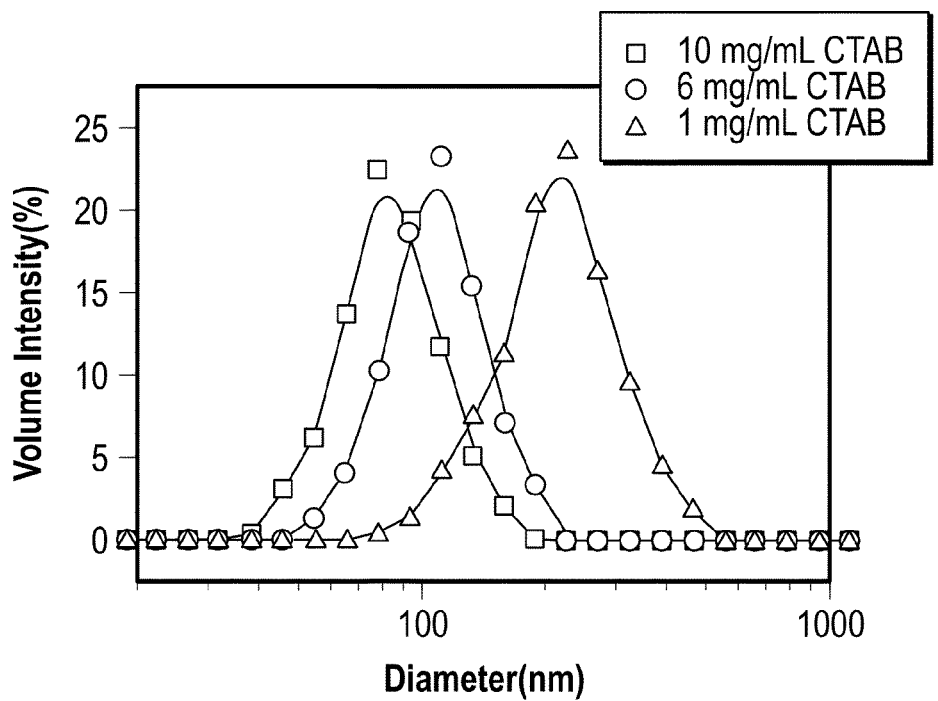

First, the possibility of size control by varying the concentrations of 1 and 2 at constant CTAB concentration was tested. In this case, a 1:1 ratio of the two molecules was maintained at a CTAB concentration of 5 mg/mL. At 20 mM concentrations of 1 and 2, BON of about 210 nm were obtained with a reasonably uniform size distribution (210±10 nm, calculated from 100 particles), as shown in FIGS. 7a and b. Holding CTAB concentration constant, when the BON were prepared using 16, 12 and 8 mM concentrations of 1 and 2, the nanoparticle sizes were observed to be about 160±10, 120±8 and 80±5 nm, respectively (FIGS. 7c, d and e). When the sizes were measured in solution using dynamic light scattering (DLS), the trend in sizes was similar. The nanoparticle sizes were slightly bigger with DLS, since DLS indicates the hydrated diameter of the nanoparticles.

Next, the effect of CTAB concentration on the nanoparticle size was studied. At 20 mM concentration of each of the components 1 and 2, the concentration of CTAB was varied to be 10, 6, and 1 mg/mL. The BON obtained from these combinations were from 90±10 nm, 140±10 nm, and 240±32 nm respectively (FIG. 5; corresponding DLS are shown in FIG. 7i). These results suggest that this synthetic method provides a simple route to organic NPs with uniform morphology and size.

FIGS. 7a-g illustrate (A) TEM image of BON synthesized from 20.0 mM of 1 and 2; (B) magnified image of (A); TEM images of BON prepared from (C) 16.0 mM, (D) 12.0 mM and (E) 8.0 mM of 1 and 2, respectively; (F) DLS results of BON from (■) 20.0, (●) 16.0, (▲) 12.0 and 8.0 mM (▼) of 1 and 2 at 5 mg/mL of CTAB; and (G) DLS of BON from (■) 10, (●) 6, and (▲) 1 mg/mL of CTAB, at 20 mM of 1 and 2. All TEM scale bars are 400 nm.

Example 3

Boronate Organic Nanoparticles as Hosts for Hydrophobic Organic Molecules, and Stimuli-Responsive Behavior of Boronate Organic Nanoparticles Example 3-1

Encapsulation of Dyes (1,1'-dioctadecyl-3,3,3',3'-tetramethylindocarbocyanine perchlorate or 3,3'-dioctadecyloxacarbocyanine perchlorate) in the BON An in situ method was used to encapsulate DiI (1,1'-dioctadecyl-3,3,3',3'-tetramethylindocarbocyanine perchlorate) or DiO (3,3'-dioctadecyloxacarbocyanine perchlorate) in the BON. 0.05 mL of a DiI or DiO solution in acetone (5 mg/mL) was added to an aqueous solution of CTAB, along with the injection of 5.06 mg (0.01 mmol) 2. Then 5.42 mg (0.01 mmol) 1 in methanol solution was added dropwise into the former mixture under stirring. After 2 h reaction, BON encapsulated with DiI or DiO were obtained. To get the purified product, CTAB, unencapsulated dyes and unreacted starting molecules were removed from the solution by ultrafiltration using a membrane with a molecular weight cutoff of 3,500 g mol$^{-1}$.

Example 3-2

Triggered Release of Dye from the BON Via pH Change or Glucose

To investigate the release of dye under the stimulus of pH change, the pH of an aqueous solution of BON loaded with DiI was adjusted from 7.4 to 5.0 using an HCl aqueous solution (0.01 M). The fluorescence spectra of the mixture were recorded at regular intervals to monitor the dye release progress. UV/Vis spectra were also recorded to trace this release progress. For the study of glucose triggered release of dye form BON, D-glucose was added to a solution of BON incorporated with DiI (the solution pH was adjusted to 6.5 using 0.0001 M HCl aqueous solution) to reach a concentration of 0.5 mM. The fluorescence spectra of the mixture were also recorded at regular intervals to monitor the dye release progress.

FIGS. 8a-c illustrate TEM images showing the morphologies of the BON after immersing in pH=5.0 aqueous solution for (A) 1 h, (B) 2 h and (C) 4 h. FIGS. 9a-f illustrate (A) FRET behavior of DiI/DiO encapsulated in BON in neutral solution, the excitation wavelength of this system was 450 nm; fluorescence spectra to trace the release of DiI from BON in aqueous solution with (B) pH=5.0 and in (C) 0.5 mM glucose aqueous solution with pH=6.5; FRET evolution of DiI/DiO encapsulated in BON in solution at pH=5.0 (D), pH=6.0 (E) and pH=6.5 with D-glucose (F). FIGS. 10a-c illustrate TEM images indicating the morphologies of BON after immersing in 0.5 mM of D-glucose aqueous solution with pH=6.5 for 1 (A), 2 (B) and 4 h (C). The scale bars in the TEM images are 400 nm. FIG. 11 illustrates absorption spectra evidencing the release of DiI from the BON at pH=5.0.

Example 3-3

Discussion

The incorporation of guest molecules 1,1'-dioctadecyl-3, 3,3',3'-tetramethylindocarbocyanine perchlorate (DiI) or 3,3'-dioctadecyloxacarbocyanine perchlorate (DiO) in the BON via an in situ method was attempted.

Figure 12A:
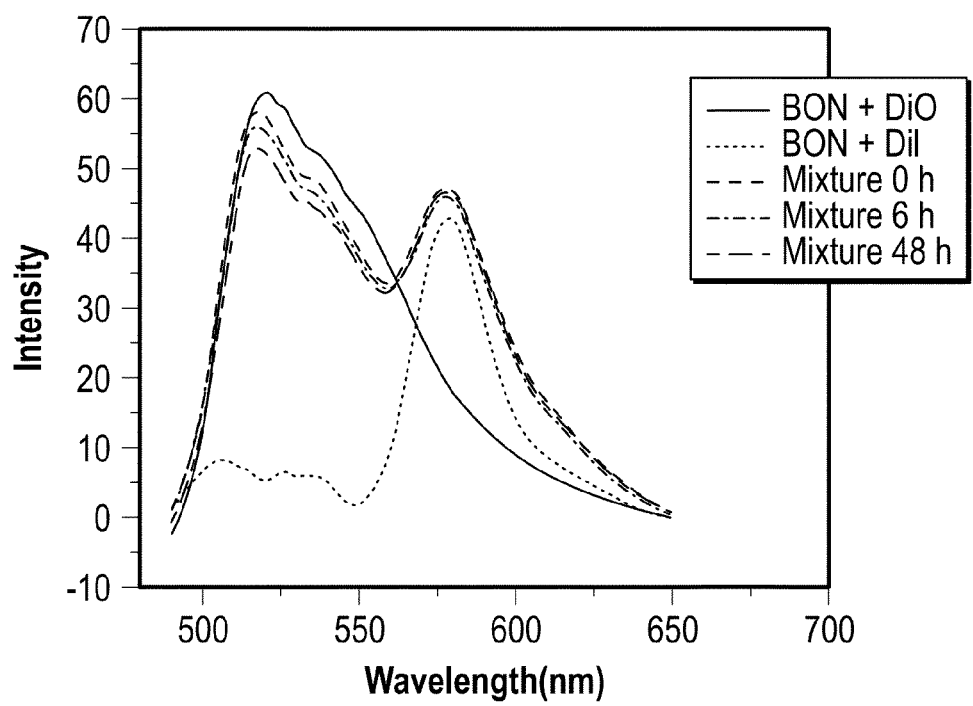

The encapsulation stability of these guest molecules was then estimated using a recently reported fluorescence resonance energy transfer (FRET)-based method. In this experiment, when mixing DiO-loaded BON solution with DiI-loaded BON, if the encapsulation was not stable, then a rapid evolution of FRET would occur. If the encapsulation is stable, then no time-dependent FRET evolution occurs. In this experiment, FRET evolution was very slow, even over a 48 h time period (FIG. 12A). These results suggest that the BON are not only capable of encapsulating guest molecules, but also that the encapsulation is stable.

Figure 12B:
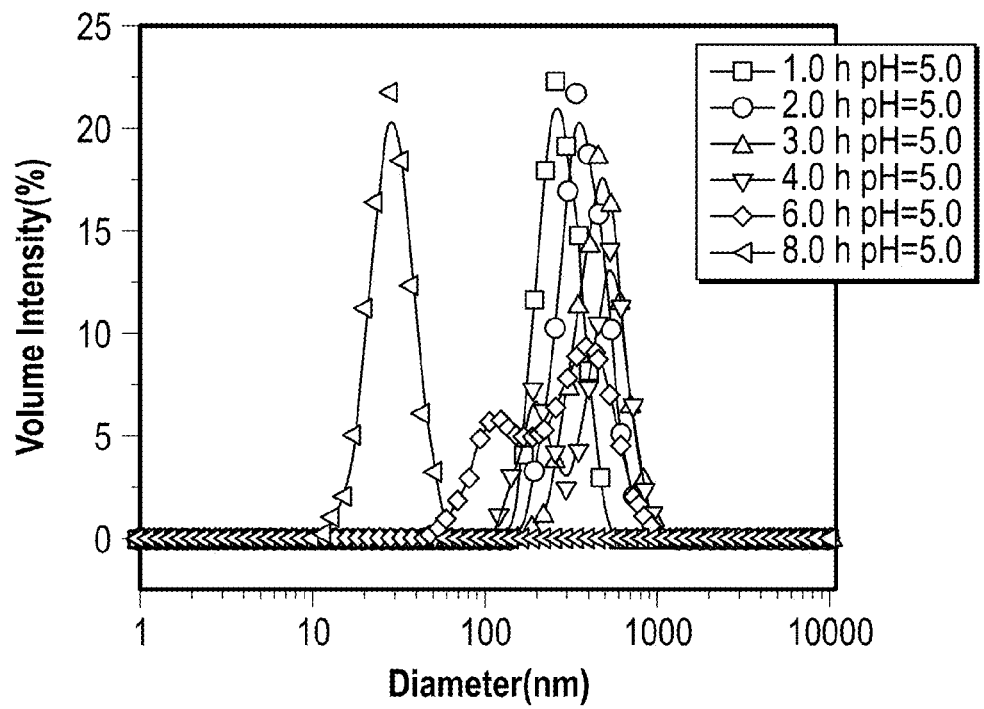

Disassembly of the BON at reduced pH was tested using a 210 nm BON. During the evolution of particle size by DLS, the particle size increased at first and then rapidly decreased (FIG. 12B). The initial increase could be due to the nanoparticle swelling initially in response to the decreased pH, followed by disassembly. To further test this, the evolution of these nanoparticles by TEM was studied (FIG. 8). After 1 h at pH 5.0, the BON exhibited thick translucent shells and dark cores with concurrent increase in particle size. This can be evidence of the swelling of the nanoparticle shell. After another hour at this pH, the darker cores increased in size, which can be evidence of core swelling. Finally, the entire nanoparticle became translucent after 4 h, where the BON seemed to be amorphous; e.g. disassembly.

Figure 12C:
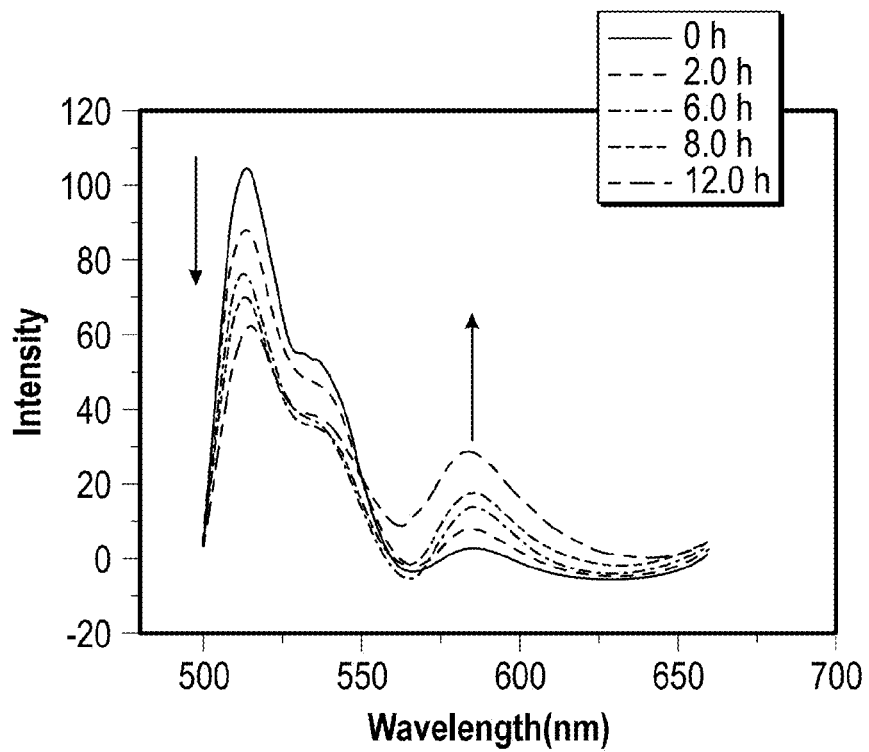
Figure 12D:
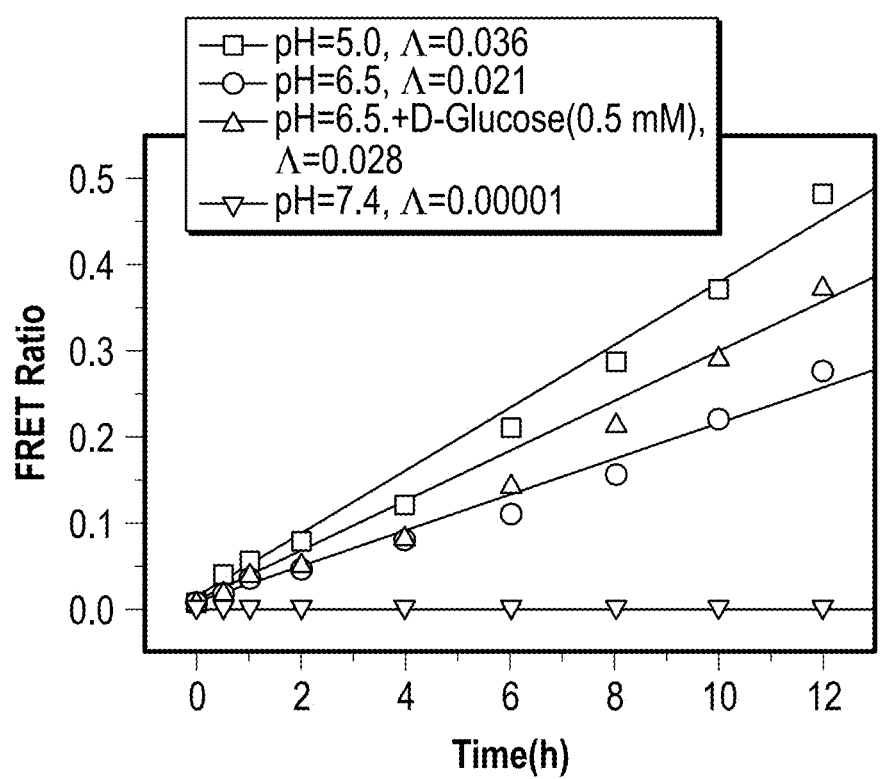

The decreasing fidelity of the BON to act as hosts as disassembly occurs was tested using evaluation of FRET evolution by mixing the DiO- and the DiI-loaded BON. Note that there was no change in FRET at pH 7.4 (FIG. 12A). However, when the same experiment was carried out at pH 5.0, there was a significant decrease in the DiO fluorescence and increase in DiI fluorescence with time (FIG. 12C). The extent of this change can be plotted as a function of time, the slope of which is defined as the leakage coefficient (Λ) (FIG. 12D). At pH 5.0, this coefficient was found to be 0.036, whereas the Λ was only 0.021 at pH 6.5. This is evidence that the dynamics of guest exchange was much faster at pH 5.0 than at pH 6.5, which was faster than at pH 7.4.

The FRET experiments assess the dynamics of guest exchange at various conditions. Releasing (precipitating) the hydrophobic guest molecules from the BON in response to change in pH can also be tested. The guest molecules were stably encapsulated at pH 7.4, and a significant percentage of the guest molecules were released from solution upon reducing the pH (FIG. 9).

FIGS. 12a-d illustrate FRET behavior of BON having DiI/DiO encapsulated therein at (A) pH 7.4; (B) pH 5.0; (C) evolution of DiO and DiI emission at pH 5.0; and (D) plot of FRET ratio vs. time at pH 7.4, 6.5, 5.0 and in the presence of glucose at pH 6.5.

To assess whether the BON can be disassembled in response to an independent stimulus, where the labile nature of the boronate ester is specifically exploited, the effect of D-glucose upon the disassembly of the BON was investigated, since carbohydrates are boronic acid binders. Analysis was conducted using TEM and fluorescent guest release. All these results indicate that the BON are sensitive to D-glucose (see FIG. 9 and S10). For example, as shown in FIG. 12D, the FRET evolution at pH 6.5 in the presence of D-glucose (Λ=0.028) was faster than without D-glucose (Λ=0.021).

Example 4

Functionalization of the Surface of Boronate Organic Nanoparticles

Example 4-1

Synthesis of Iodine Containing (3) and (6)

4-Iodoaniline (1 mmol, 0.219 g) in 5 mL of DCM was slowly added into a solution containing 3,4-dihydroxybenzaldehyde (1 mmol, 0.138 g) in DCM (10 mL) and methanol (5 mL) to synthesize 3.

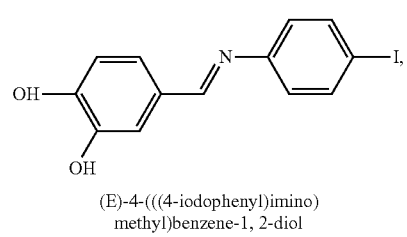

(E)-4-(((4-iodophenyl)imino)methyl)benzene-1, 2-diol

After stirring at room temperature for 6 h, 80% of the solvent was evaporated. Then the mixture was stored at −4° C. overnight. Crystalline precipitate was filtered and vacuum dried to obtain a yellowish solid product (yield: 88%). By using the same synthetic route, 6 was prepared from 0.219 g of 4-iodoaniline (1 mmol) and 0.15 g (1 mmol) of 4-formylphenylboronic acid (yield: 83%).

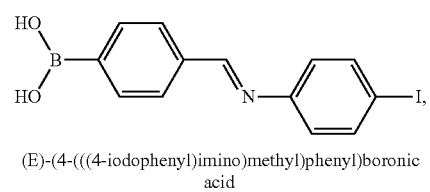

(E)-(4-(((4-iodophenyl)imino)methyl)phenyl)boronic acid $^1$H NMR of 3 (400 MHz, methanol-$D_4$, ppm) δ 7.10, 7.78 (d, 4H), 6.95, 7.30, 7.50 (d, 3H), 8.42 (s, 1H). $^1$H NMR of 6 (400 MHz, methanol-$D_4$, ppm) δ 7.15, 7.83 (d, 4H), 7.85, 7.92 (d, 3H), 8.64 (s, 1H). FIGS. 13a-b illustrate $^1$H NMR spectra of (A) 6 and (B) 3 in methanol-$D_4$.

Example 4-2

Synthesis of PEG Chain Bearing 4

To 60 mL of toluene, 3,4-dihydroxybenzoic acid (1.54 g, 10 mmol), PEG (3.5 g, 10 mmol) and p-toluenesulfonic acid monohydrate (0.019 g, 0.1 mmol) were added. The mixture was refluxed for 6 h in a flask fitted with a Dean-Stark water separator. The reaction had a high conversion rate, as discerned by $^1$H NMR spectra. Therefore, after the removal of solvent, molecule 4 was used directly for the surface functionalization of BON without further purification.

4

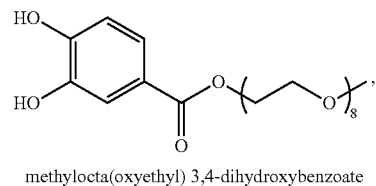

methylocta(oxyethyl) 3,4-dihydroxybenzoate $^1$H NMR of 4 (400 MHz, acetone-$D_6$, ppm) δ 3.38 (s, 3H), 3.62 (t, 2H), 3.72 (t, 2H), 3.68 (t, 28H), 7.00, 7.56, 7.63 (d, 3H). FIG. 14 illustrates a $^1$H NMR spectrum of 4 in acetone-$D_6$.

Example 4-3

Preparation of Long Alkyl Chain Bearing 5 and 7

For the synthesis of 5, decylamine (0.157 g, 1 mmol) was dissolved in 5 mL of DCM. This solution was slowly added into a mixture containing 3,4-dihydroxybenzaldehyde (0.138 g, 1 mmol) in 10 mL DCM and 5 mL methanol. After stirring at room temperature for 8 h, 80% of the solvent was evaporated. Then the mixture was stored at −4° C. overnight. The crystalline precipitate was filtered and vacuum dried to obtain solid product (yield: 78%).

5

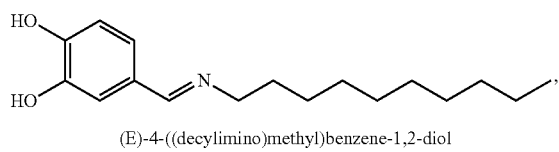

(E)-4-((decylimino)methyl)benzene-1,2-diol

By using this synthetic route, 7 was prepared from 0.219 g of decylamine (1 mmol) and 0.15 g of 4-formylphenylboronic acid (1 mmol) (yield: 74%).

7

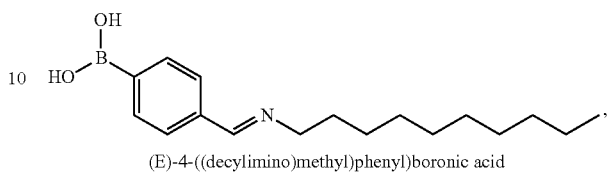

(E)-4-((decylimino)methyl)phenyl)boronic acid $^1$H NMR of 5 (400 MHz, methanol-$D_4$, ppm) δ 0.98 (t, 3H), 1.40 (t, 14H), 1.78 (t, 2H), 3.62 (t, 2H), 6.81, 7.20, 7.29 (d, 3H), 8.14 (s, 1H). $^1$H NMR of 7 (400 MHz, methanol-$D_4$, ppm) δ 0.98 (t, 3H), 1.40 (t, 14H), 1.80 (t, 2H), 3.71 (t, 2H), 7.76-7.90 (d, 4H), 8.41 (s, 1H). FIGS. 15a-b illustrate $^1$H NMR spectra of (A) 7 and (B) 5 in methanol-$D_4$.

Example 4-4

Surface Functionalization of BON

For the surface functionalization of boronic acid terminated BON, molecules 3, 4 and 5 based on a catechol group were used. For example, 0.34 mg (0.001 mmol) of 3 dissolved in 0.2 mL of methanol was slowly added into a 1 mL aqueous solution of boronic acid terminated BON (5 mg/mL). The mixture was allowed to stir at room temperature for 2 h. Then unreacted starting molecules were removed from the solution by ultrafiltration using a membrane with a molecular weight cutoff of 3,500 g mol$^{-1}$. Similarly, the functionalization of boronic acid-terminated BON by the PEG chain-containing molecule and the long alkyl chain-containing molecule were achieved using 0.49 mg (0.001 mmol) of 4 and 0.28 mg (0.001 mmol) of 5, respectively. The modifications of catechol terminated BON were also realized by using the same route from 0.35 mg (0.001 mmol) of 6 and 0.29 mg (0.001 mmol) of 7.

FIGS. 16a-i illustrate (A) schematic illustration of the surface functionalization of BON; (B) Chemical structures of 3-5; (C) TEM image of BON functionalized with 3 (scale bar=400 nm); (D) and (E) ImageJ analysis of TEM images of functionalized BON (with 3) and unfunctionalized BON; (F) XPS spectra of BON terminated with boronic acid groups and BON modified with 3; (G-I) water droplet profiles and contact angles of BON (unfunctionalized (G), functionalized with 4 (H), and with 5 (I)). FIG. 17 illustrates the radial direction gray value evolution of the 4 modified BON. The relatively lighter shell can be evidence of the presence of the PEG functional group on the nanoparticle surface. FIGS. 18a-e illustrate XPS of BON (A) terminated with catechol groups, (B) terminated with boronic acid groups, (C) BON modified with 3, (D) 4 and (E). FIGS. 19a-b illustrate TEM images of the BON after the surface modification with 4 and 5. FIG. 20 illustrates water droplets on the surface of substrates made from BON modified with 3. $θ_a$ represents the advancing angle, while the $θ_r$ represents the receding angle. FIG. 21 illustrates XPS results of the BON terminated with boronic acid groups further modified by (A) 7 and (B) 6. FIGS. 22a-c illustrate water droplet profiles on the surface of substrates made from (A) catechol group terminated BON, (B) BON modified by 6, (C) BON modified by 7. The variable $θ_a$ represents the advancing angle, while the $θ_r$ represents the receding angle. Catechol group-terminated BON were synthesized from 20.0 mM of 1 and 20.4 mM of 2 in 5 mg/mL CTAB aqueous solution.

TABLE 1

Relative percentage of atoms on the surface of catechol terminated BON, boronic acid terminated BON, and boronic acid terminated BON after further modifications based on XPS, wherein catechol terminated BON are synthesized from 20.0 mM 1 and 20.4 mM of 2, while boronic acid terminated BON are prepared from 20.4 mM 1 and 20.0 mM of 2.

| Number | Sample | C1s | N1s | O1s | Na1s | Si2p | S2p | Cl2p | Ca2p | I3d3 | B1s |
|---|---|---|---|---|---|---|---|---|---|---|---|
| (1) | Catechol-terminated BON | 75.02 | 3.78 | 15.28 | 0.44 | 3.91 | — | — | — | — | 1.58 |
| (2) | Boronic acid-terminated BON | 75.12 | 3.60 | 14.30 | 0.78 | 3.54 | — | — | — | — | 2.65 |
| (3) | 3-modified BON | 75.66 | 3.10 | 15.03 | 0.15 | 3.63 | — | — | — | 1.02 | 1.41 |
| (4) | 4-modified BON | 69.24 | 3.07 | 19.78 | 2.71 | 3.81 | 1.02 | 0.36 | — | — | — |
| (5) | 5-modified BON | 81.6 | 3.02 | 12.85 | 0.33 | 1.64 | 0.46 | — | 0.11 | — | — |

TABLE 2

Relative percentages of atoms on the surface of catechol terminated BON after further modifications.

| Number | Sample | C1s | N1s | O1s | Na1s | Si2p | S2p | Cl2p | Ca2p | I3d3 | B1s |
|---|---|---|---|---|---|---|---|---|---|---|---|
| (1) | 6-modified BON | 74.72 | 3.48 | 15.16 | 1.47 | 3.42 | 0.97 | — | — | 1.05 | 1.32 |
| (2) | 7-modified BON | 79.99 | 3.54 | 11.29 | 0.27 | 4.85 | 0.06 | — | — | — | — |

Example 4-5

Discussion

Figure 16A:
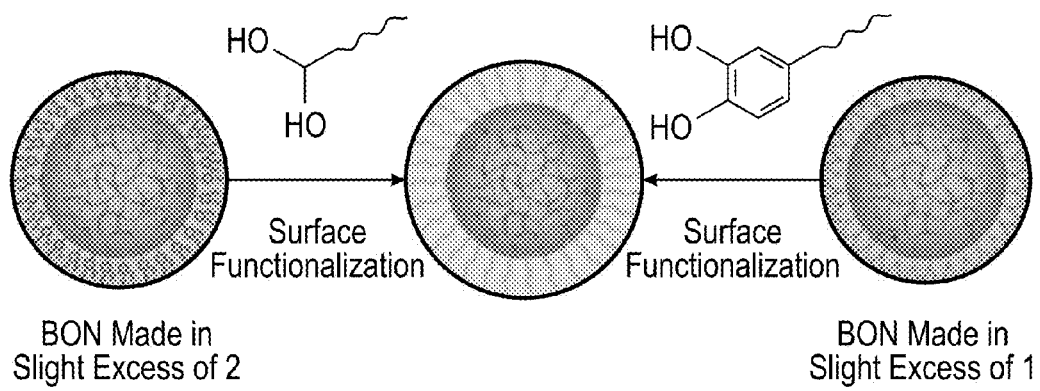
Figure 16B:
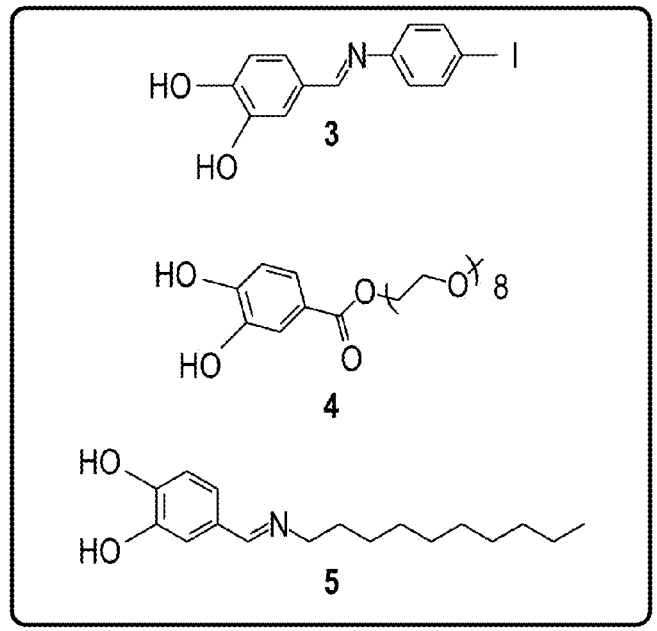
Figure 16C:
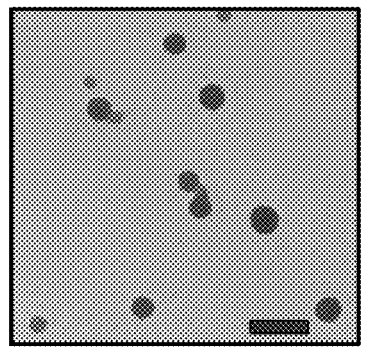
Figure 16D:
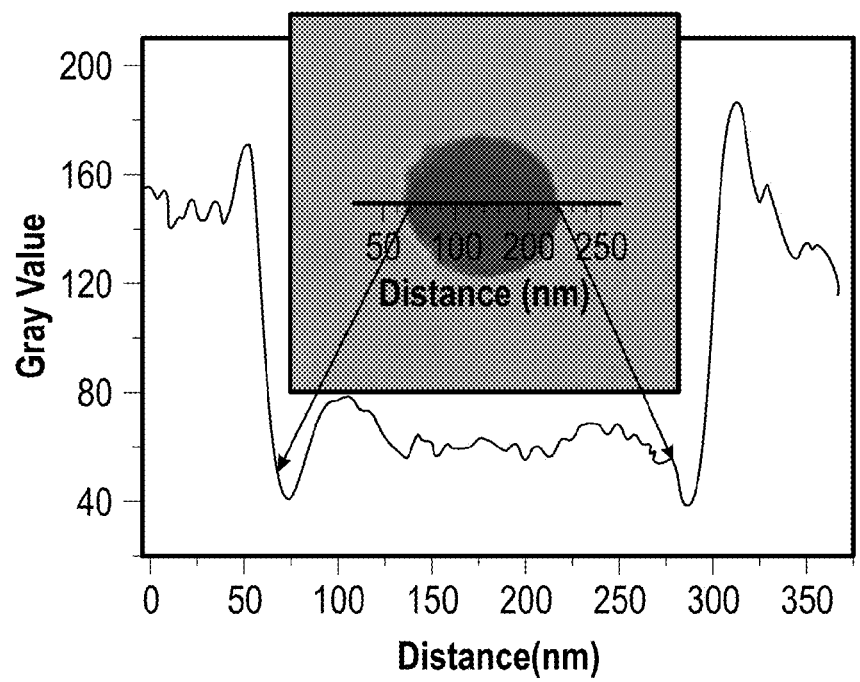
Figure 16E:
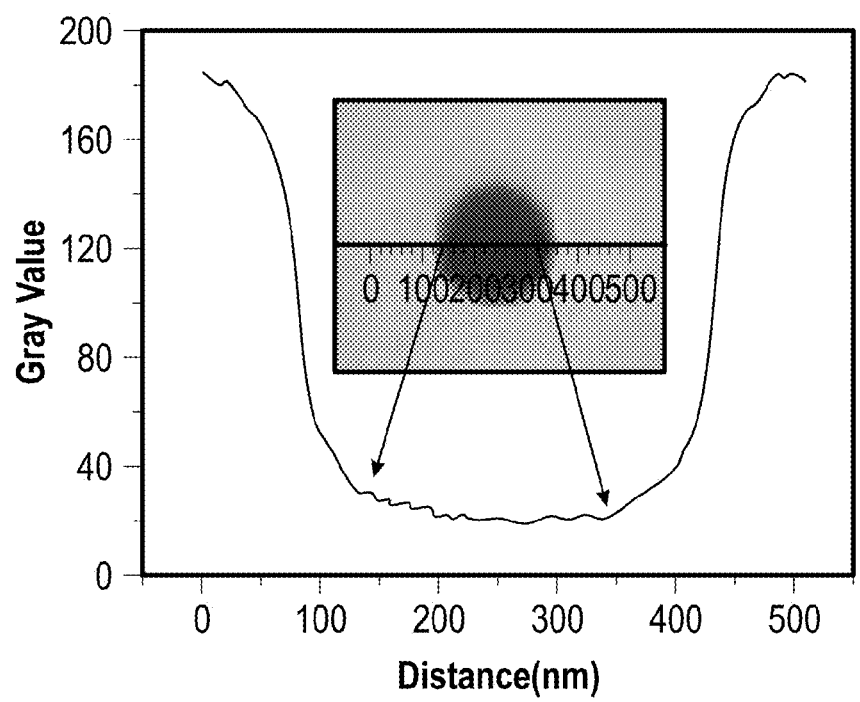
Figure 16F:
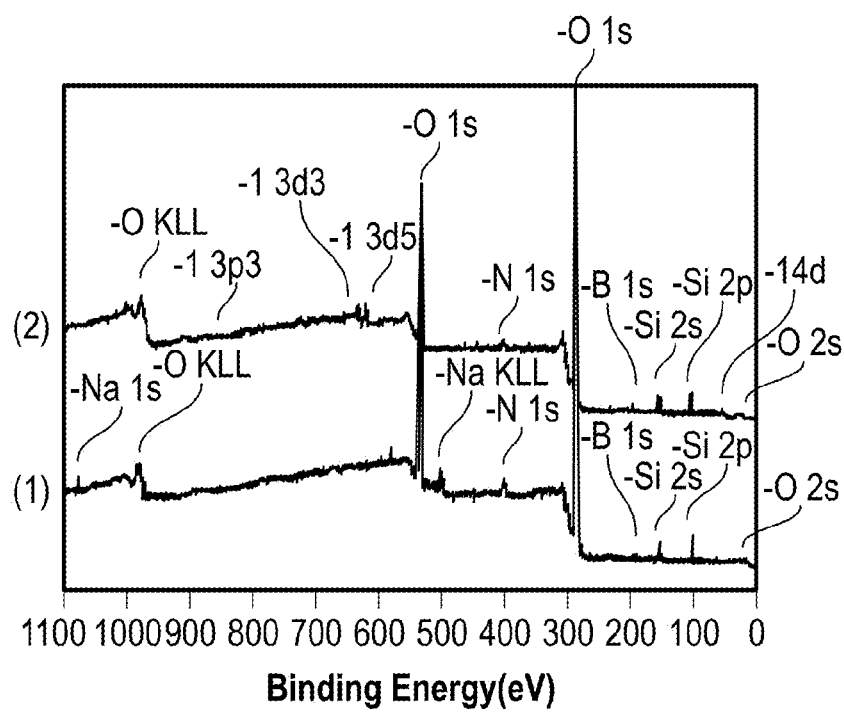
Figure 16G:
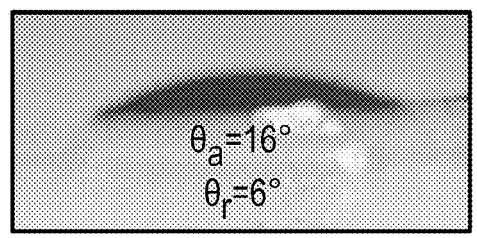

By using a slight excess of 1 or 2 during the formation of BON, the surface functionalities can be designed to be dominated by boronic acid moieties or catechol moieties respectively, taking advantage of the high surface area of the BON. The BON can then be exposed to molecules containing complementary functionalities to achieve facile surface functionalization (schematically represented in FIG. 16A). Accordingly, the BON synthesized using a slight excess of 1 were treated with mono-catechol molecules 3-5 (FIG. 16B). The iodine atom in molecule 3 was used as the heavy atom label for TEM characterization. Since in this particular experiment the monolayer of this moiety on the surface did not provide large amounts of visual contrast (as shown in FIG. 16C), ImageJ software was used to analyze the contrast. There is a difference in the contrast with the surface of the iodo-functionalized BON, whereas this is not the case with the bare BON (FIGS. 16D and 16E). The BON were also examined using X-ray photoelectron spectroscopy (XPS) at a low takeoff angle; the surface of the BON contained 1.0% iodine when functionalized with 3 and no discernible iodine was found in the unfunctionalized BON (FIG. 16F and Table 1).

Figure 16H:
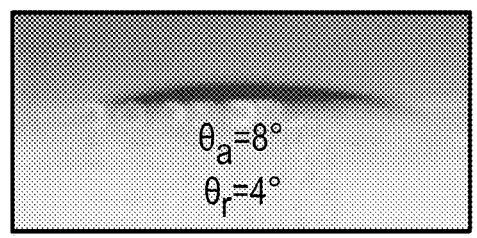
Figure 16I:
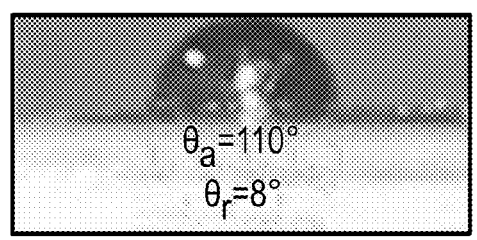

Similarly, when the BON were functionalized with 4 and 5, the surface of these nanoparticles became hydrophilic and hydrophobic, respectively. A film of the functionalized BON was cast on a silica surface and the contact angle of the surface was measured. The advancing contact angle ($\theta_a$) changed from 16° for the unfunctionalized BON (FIG. 16G), to 8° and 110° for BON functionalized with 4 and 5 respectively (FIGS. 16H and 16I). When these particles were examined by XPS, higher surface concentration of oxygen (19.8%) for 4 and carbon concentration (81.6%) for 5 were observed (FIG. 21 and Table 1). TEM characterization of these BON was also consistent with the surface functionalization (Figure S14).

BON were generated using an excess of 2, where mono-functionalized boronic acids were used for surface functionalization. The results show the versatility and ease of surface functionalization with either boronic acid or catechol moieties on the shell of the nanoparticle (FIGS. 21, 22, and Table 2).

Example 5

Seeded Growth of the Boronate Organic Nanoparticles

Example 5-1

Experimental

Example 5-1a

Encapsulation of Silver Nanoparticles (Ag NPs) in Boronate NPs (BON)

To a solution of cetyl trimethyl ammonium bromide (CTAB, 5.0 mg) in 1.0 mL of water, was added silver nitrate (AgNO$_3$, 1.69 mg, 10$^{-5}$ mol). Sodium borohydride (NaBH$_4$, 0.038 mg, 10$^{-4}$ mol) in 0.1 mL of water was injected into the mixture. The reaction mixture was stirred at ambient temperature for 4 h, and a solution of Ag NPs was obtained. On the other hand, 5.42 mg (0.01 mmol) of 1 (tris{2-[(4-boronicacidbenzylidene)imino]ethyl}amine) and 5.06 mg (0.01 mmol) of 2 (tris{2-[(3,4-dihydroxybenzylidene)imino]ethyl}amine) were dissolved in 0.5 mL of methanol to obtain 20.0 mM concentration, separately. Then, the solution made using 2 was injected into the Ag NP solution. Under stirring, the solution made using 1 was added dropwise into the former mixture. After stirring at ambient temperature for 2 h, Ag NPs encapsulated BON was obtained. To get purified product, CTAB and unreacted starting molecules were removed by ultrafiltration using a membrane with a molecular weight cutoff of 3,500 g mol$^{-1}$.

To check how Ag NPs were encapsulated in the BON, various concentrations of 1 and 2 (ratio 1:1) at constant CTAB and AgNO$_3$ concentrations were used to prepare Ag NPs encapsulated BON.

Example 5-1b

Marking the of BON 5.42 mg (0.01 mmol) of 1 and 5.06 mg (0.01 mmol) of 2 were firstly dissolved in 0.5 mL of methanol to obtain 20.0 mM concentration, separately. Then, 0.25 mL of the solution made using 2 was injected into a 1 mL aqueous CTAB solution (5 mg/mL). Under stirring, 0.25 mL of the solution made using 1 was added dropwise into the former mixture. After stirring at ambient temperature for 2 h, BON solution was obtained. To this solution, was added AgNO$_3$ (0.85 mg, 0.5×10$^{-5}$ mol). NaBH$_4$ (0.019 mg, 0.5×10$^{-4}$ mol) in 0.1 mL of water was injected into the mixture. The reaction mixture was stirred at ambient temperature for 4 h, and BON with Ag NPs on the surface was obtained. Then the rest 0.25 mL of solution made using 2 as well as 0.25 mL of the solution made using 1 were added into the reaction mixture by the same procedure which was used to make BON solution. As a result, the Ag NPs on the surface of BON were coated by BON. To get purified product, CTAB and unreacted starting molecules were removed by ultrafiltration using a membrane with a molecular weight cutoff of 3,500 g Example 5-1c Linear Polymer Syntheses. Preparation of L-BON 3.71 mg (0.01 mmol) of 8 (see the structure in scheme 1) and 3.48 mg (0.01 mmol) of 9 (see the structure in scheme 2) were firstly dissolved in 1.0 mL of methanol to obtain 10.0 mM concentration, separately. To the solution of 8, was slowly injected the solution of 9, and L-BON was obtained. To purify the product, the mixture was centrifuged and washed with methanol three times.

Scheme 1. Synthetic route and chemical structure of 8.

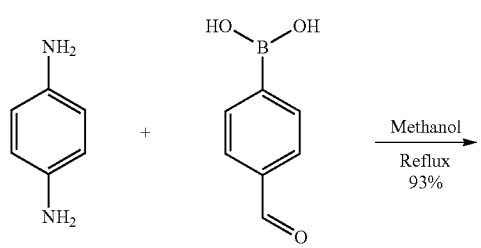

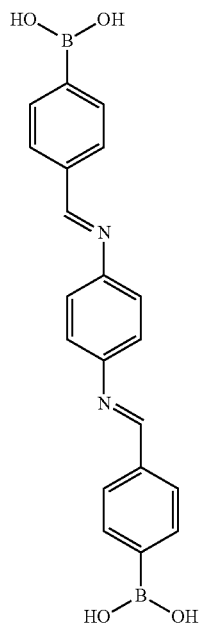

8

Scheme 2. Synthetic route and chemical structure of 9.

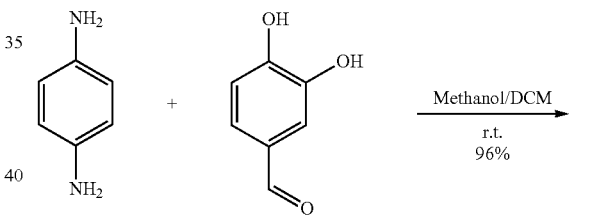

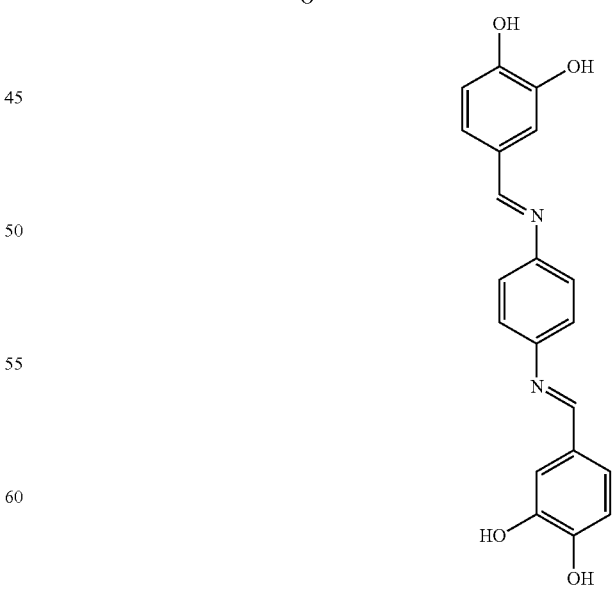

9

Example 5-1d

Encapsulation of Ag NPs in L-BON

Two Step Method (1) preparation of Ag NPs. AgNO$_3$ (1.69 mg, 10$^{-5}$ mol) was dissolved in 0.1 mL of methanol. This solution was injected into 5.0 mL of toluene. NaBH$_4$ (0.038 mg, 10$^{-4}$ mol) in 0.1 mL of methanol was injected into the mixture. After stirring at room temperature for 4.0 h, Ag NPs in toluene was obtained. (2) Encapsulation of Ag NPs in L-BON. 3.71 mg (0.01 mmol) of 8 and 3.48 mg (0.01 mmol) of 9 were firstly dissolved in 1.0 mL of methanol to obtain 10.0 mM concentration, separately. To the solution of 8, was added 0.1 mL of Ag NP toluene solution and slowly injected the solution of 9, and Ag NPs encapsulated L-BON was obtained. To purify the product, the mixture was centrifuged and washed with methanol three times.

In-Situ Method:

3.71 mg (0.01 mmol) of 8 and 3.48 mg (0.01 mmol) of 9 were firstly dissolved in 1.0 mL of methanol to obtain 10.0 mM concentration, separately. To the solution of 8, was added 0.85 mg (0.5×10$^{-5}$ mol) of AgNO$_3$ and slowly injected the solution of 9, and Ag NPs encapsulated L-BON was obtained. To purify the product, the mixture was centrifuged and washed with methanol three times.

Upon addition of additional monomers, the nanoparticle grows around the existing nanoparticle.

FIGS. 23*a-c* illustrate boronate polymers encapsulated with one (A) and several (B) Ag nanoparticles, and Larger Ag nanoparticles encapsulated in the boronate polymer shells (C). FIGS. 24*a-c* illustrate growth of the boronate polymer shell on the Ag nanoparticles, From (A), (B) to (C), the amount of the tris{2-[(4-boronicacidbenzylidene)imino] ethyl}amine and tris{2-[(3,4-dihydroxy benzylidene)imino] ethyl}amine increasing. FIG. 25 illustrates diameter growth of the boronate nanoparticle. The concentration of molecule 1 and molecule 2 was 5 mg/mL. FIG. 26 illustrates diameter growth of the boronate nanoparticle. The concentration of molecule 1 and molecule 2 was 5 mg/mL, where molecule 1=tris{2-[(4-boronicacidbenzylidene)imino]ethyl}amine and molecule 2=tris{2-[(3,4-dihydroxy benzylidene)imino] ethyl}amine.

In additional studies, the metallic nanoparticle was added after the initial growth of the small nanoparticle. Upon further growth of the BON, the metallic nanoparticles appeared in the intermediate layers of the growing BON, as shown by FIGS. 27-28. FIGS. 27*a-c* illustrate (A) boronate nanoparticle, (B) boronate nanoparticle with Ag nanoparticles on the surface, Scheme 3. Structure of Ligand 1-2.

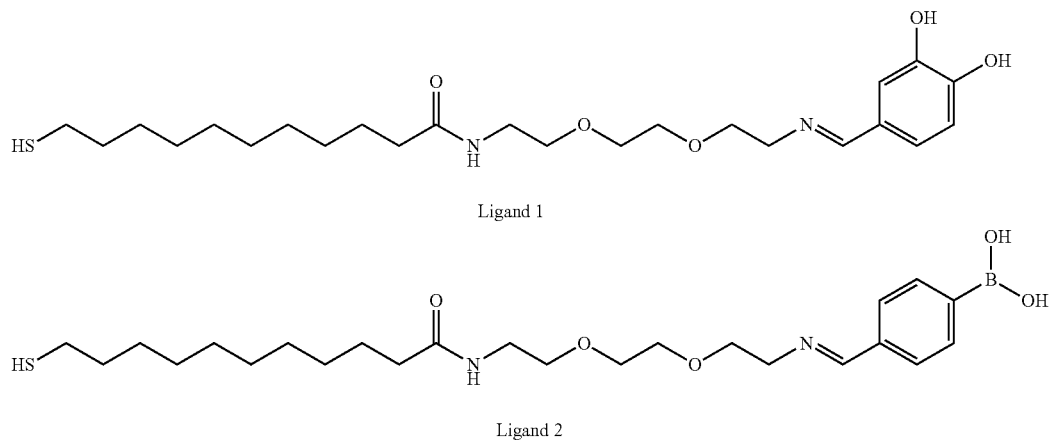

Ligand 1

Ligand 2

Example 5-2

Discussion

This example provides evidence that (i) the BON can grow from an initial seedling of the nanoparticle; and, (ii) linear starting materials can provide the BON boronate.

The TEMs and the DLS show that when one of the two components used to make the nanoparticle is present in deficient amounts, the nanoparticle size is small. But, upon addition of more of that component, the nanoparticle size grows. This behavior can provide evidence that no new nanoparticles are being formed; rather, the particle is growing from an existing nanoparticle (e.g., 'seed'). A metallic nanoparticle was used to label the starting point, where the initially small nanoparticle is formed around the metallic nanoparticle.

(C) growth of boronate shell on the boronate nanoparticle marked with Ag nanoparticles. FIG. 28 illustrates DLS results for the growth of boronate nanoparticle marked by the Ag nanoparticles. FIGS. 29-31 show evidence that BON can be obtained from linear difunctionalized boronic acids and difunctionalized catechols (shown by structures 8 and 9).

8

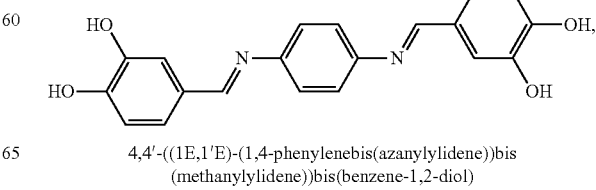

4,4'-((1E,1'E)-(1,4-phenylenebis(azanylylidene))bis (methanylylidene))bis(benzene-1,2-diol)

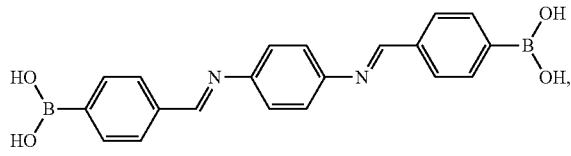

(((1E,1'E)-(1,4-phenylenebis(azanylylidene))bis(methanylylidene))bis(4,1-phenylene))diboronic acid FIGS. 29a-c illustrate TEM images of boronate nanoparticles synthesized from 2 mg/mL (A), 3 mg/mL (B) and 5 mg/mL (C) of 8 and 9. FIGS. 30a-c illustrate TEM images of (A) Ag nanoparticles, (B) Ag nanoparticles encapsulated in the boronate nanoparticles from 8 and 9, (C) Ag nanoparticles encapsulated in the boronate nanoparticles, made from low concentration of Ag nanoparticles. FIGS. 31a-d illustrate in situ growth of Ag nanoparticles in the boronate nanoparticles from 8 and 9, where (A) is with higher AgNO$_3$ concentration, (B) is the magnified TEM image of (A), (C) is with lower AgNO$_3$ concentration, (D) is derived from (A) after two days ageing.

Example 6

Hypothetical Example. Coating of BON on Various Objects

A method of initiating the coating of the BON on any nanoscale object (e.g., rod or a sphere) is illustrated in FIGS. 32-36 below.

FIG. 32 illustrates a chemical structure of dihydroxyphenyl ligand (top) and a boronic acid ligand (bottom). FIG. 33 illustrates a structure of ligand coated metal nanopheres and the growth of polymer shell. FIG. 34 illustrates a structure of ligand coated metal nanorods and the growth of polymer shell. FIG. 35 illustrates a structure of ligand coated metal nanopheres and the growth of polymer shell from linear molecules 8 and 9. FIG. 36 illustrates a structure of ligand coated metal nanorods and the growth of polymer shell from linear molecules 8 and 9.

The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those of ordinary skill in the art, and that such modifications and variations are considered to be within the scope of this invention as defined by the appended claims.

ADDITIONAL EMBODIMENTS

The present invention provides for the following exemplary embodiments, the numbering of which is not to be construed as designating levels of importance:

Embodiment 1 provides a nanoparticle comprising: a polymer comprising a repeating unit comprising at least one organoboronate functional group.

Embodiment 2 provides the nanoparticle of Embodiment 1, wherein the polymer is a reaction product of a composition comprising a phenylboronic acid-functional compound and a hydroxyphenyl-functional compound.

Embodiment 3 provides the nanoparticle of any one of Embodiments 1-2, wherein the polymer is a reaction product of a composition comprising a compound having the structure:

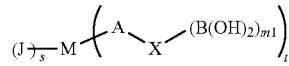

and a compound having the structure:

wherein M is independently at each occurrence selected from the group consisting of N, P, and C, wherein at each occurrence s is independently chosen from 0, 1, 2, and 3, at each occurrence t is independently chosen from 1, 2, 3, and 4, and wherein if M=N or P then s+t=3 and if M=C then s+t=4, wherein each of A, X, and Y, independently at each occurrence, is a ($C_{1-15}$)hydrocarbyl group, unsubstituted or optionally substituted with at least one J, and optionally interrupted or terminated by one to three amine groups, wherein A is divalent, X has valency of 1+m1, and Y has valency of 1+m2, wherein J independently at each occurrence is selected from the group consisting of F, Cl, Br, I, OR, CN, CF$_3$, OCF$_3$, R, O, S, C(O), S(O), methylenedioxy, ethylenedioxy, N(R)$_2$, SR, S(O)R, SO$_2$R, SO$_2$N(R)$_2$, SO$_3$R, C(O)R, C(O)C(O)R, C(O)CH$_2$C(O)R, C(S)R, C(O)OR, OC(O)R, OC(O)OR, C(O)N(R)$_2$, OC(O)N(R)$_2$, C(S)N(R)$_2$, (CH$_2$)$_{0-2}$NHC(O)R, N(R)N(R)C(O)R, N(R)N(R)C(O)OR, N(R)N(R)C(O)N(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(C(O)R)C(O)R, N(OR)R, C(=NH)N(R)$_2$, C(O)N(OR)R, and C(=NOR)R, wherein R is independently at each occurrence selected from the group consisting of hydrogen, (C$_1$-C$_{20}$)alkyl, (C$_1$-C$_{10}$)cycloalkyl, (C$_1$-C$_{10}$)cycloalkyl(C$_1$-C$_{10}$)alkyl, (C$_1$-C$_{10}$)aryl, (C$_1$-C$_{10}$)aralkyl, (C$_1$-C$_{10}$)heterocyclyl, (C$_1$-C$_{10}$)heterocyclyl(C$_1$-C$_{10}$)alkyl, (C$_1$-C$_{10}$)heteroaryl, and (C$_1$-C$_{10}$)heteroaryl(C$_1$-C$_{10}$)alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J, and wherein each m1 is independently at each occurrence 1 to 5 and each m2 is independently at each occurrence 1 to 5.

Embodiment 4 provides the nanoparticle of any one of Embodiments 1-3, wherein the polymer is a reaction product of a composition comprising a compound having the structure:

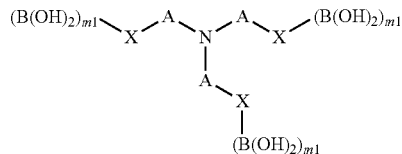

and a compound having the structure:

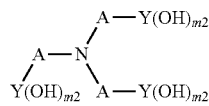

wherein each of A, X, and Y, independently at each occurrence, is a $(C_{1-15})$hydrocarbyl group, unsubstituted or optionally substituted with at least one J, and optionally interrupted or terminated by one to three amine groups, wherein A is divalent, X has valency of 1+m1, and Y has valency of 1+m2, wherein J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, C(O)$CH_2$C(O)R, C(S)R, C(O)OR, OC(O)R, OC(O)OR, C(O)N$(R)_2$, OC(O)N$(R)_2$, C(S)N$(R)_2$, $(CH_2)_{0-2}$NHC(O)R, N(R)N(R)C(O)R, N(R)N(R)C(O)OR, N(R)N(R)C(O)N$(R)_2$, N(R)$SO_2R$, N(R)$SO_2$N$(R)_2$, N(R)C(O)OR, N(R)C(O)R, N(R)C(S)R, N(R)C(O)N$(R)_2$, N(R)C(S)N$(R)_2$, N(C(O)R)C(O)R, N(OR)R, C($=$NH)N$(R)_2$, C(O)N(OR)R, and C($=$NOR)R, wherein R is independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J, and wherein each m1 is independently at each occurrence 1 to 5 and each m2 is independently at each occurrence 1 to 5.

Embodiment 5 provides the nanoparticle of any one of Embodiments 1-4, wherein the polymer is a reaction product of a composition comprising a compound having the structure:

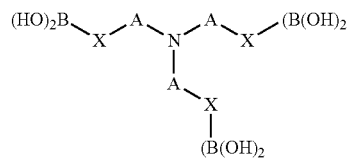

and a compound having the structure:

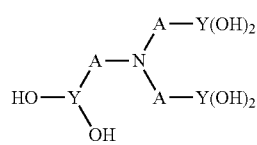

wherein each of A, X, and Y, independently at each occurrence, is a $(C_{1-5})$hydrocarbyl group, unsubstituted or optionally substituted with at least one J, and optionally interrupted or terminated by one to three amine groups, wherein A and X are divalent, and Y is trivalent, wherein J independently at each occurrence is selected from the group consisting of F, Cl, Br, I, OR, CN, $CF_3$, $OCF_3$, R, O, S, C(O), S(O), methylenedioxy, ethylenedioxy, N(R), SR, S(O)R, $SO_2R$, $SO_2N(R)_2$, $SO_3R$, C(O)R, C(O)C(O)R, C(O)$CH_2$C(O)R, C(S)R, C(O)OR, OC(O)R, OC(O)OR, C(O)N$(R)_2$, OC(O)N$(R)_2$, C(S)N$(R)_2$, $(CH_2)_{0-2}$NHC(O)R, N(R)N(R)C(O)R, N(R)N(R)C(O)OR, N(R)N(R)C(O)N$(R)_2$, N(R)$SO_2R$, N(R)$SO_2$N$(R)_2$, N(R)C(O)OR, N(R)C(O)R, N(R)C(S)R, N(R)C(O)N$(R)_2$, N(R)C(S)N$(R)_2$, N(C(O)R)C(O)R, N(OR)R, C($=$NH)N$(R)_2$, C(O)N(OR)R, and C($=$NOR)R, wherein R is independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, and wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J.

Embodiment 6 provides the nanoparticle of Embodiment 5 wherein each A independently at each occurrence is a divalent N—$((C_{0-10})$alkyl)amino$(C_{1-10})$alkenyl group.

Embodiment 7 provides the nanoparticle of any one of Embodiments 3-6, wherein each A independently at each occurrence is a divalent N—$((C_{0-10})$alkyl)formimidoyl group.

Embodiment 8 provides the nanoparticle of any one of Embodiments 3-7, wherein each A is a divalent N-ethylformimidoyl group

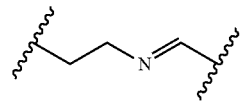 [SMILES: */C=N/CC*]

wherein the carbon atom of the formimidoyl group that is doubly bonded to the nitrogen is bonded to the Y or X.

Embodiment 9 provides the nanoparticle of any one of Embodiments 3-8, wherein each Y independently at each occurrence is a 1-$(C_{0-7})$alkylphenyl group, wherein the phenyl group is hydroxy-bound.

Embodiment 10 provides the nanoparticle of any one of Embodiments 3-9, wherein Y is a trivalent 1,4,5-substituted phenyl group.

Embodiment 11 provides the nanoparticle of any one of Embodiments 3-10, wherein Y is a trivalent 1,4,5-substituted phenyl group, wherein the 1-position is bound to A and the 4- and 5-positions are hydroxy-bound.

Embodiment 12 provides the nanoparticle of any one of Embodiments 3-11, wherein each X independently at each occurrence is a divalent 1-$(C_{0-7})$alkylphenyl group, wherein the phenyl group is boron-bound.

Embodiment 13 provides the nanoparticle of any one of Embodiments 3-12, wherein X is a divalent 1,4-substituted phenyl group.

Embodiment 14 provides the nanoparticle of any one of Embodiments 1-13, wherein the polymer is a reaction product of a composition comprising a compound having the structure:

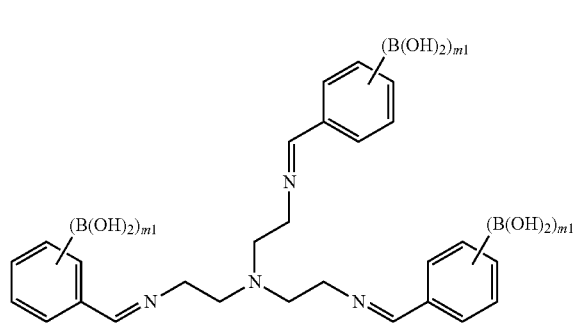

and a compound having the structure:

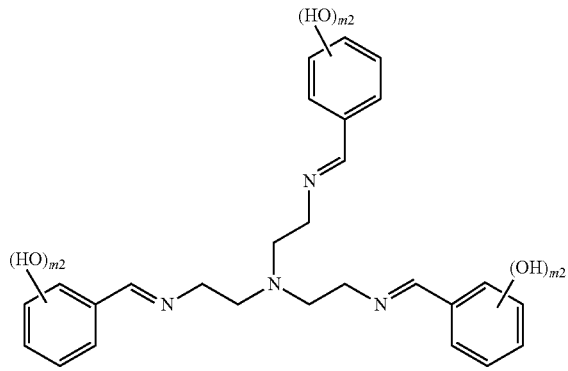

wherein each m1 is independently at each occurrence 1 to 5 and each m2 is independently at each occurrence 1 to 5.

Embodiment 15 provides the nanoparticle of any one of Embodiments 1-14, wherein the polymer is a reaction product of a composition comprising a compound having the structure:

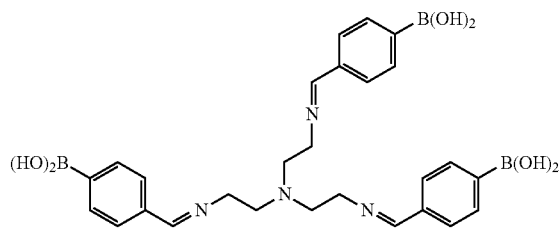 [SMILES: OB(O)c1ccc(C=NCCN(CCN=Cc2ccc(B(O)O)cc2)CCN=Cc2ccc(B(O)O)cc2)cc1]

and a compound having the structure:

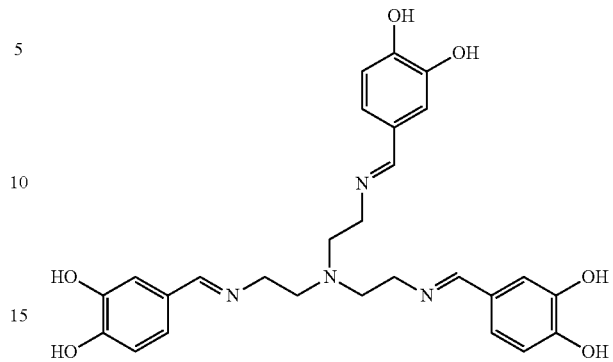

Embodiment 16 provides the nanoparticle of any one of Embodiments 1-15, wherein the polymer is a reaction product of a composition comprising a compound having the structure:

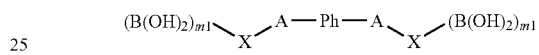

and a compound having the structure:

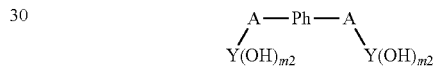

wherein each of A, X, and Y, independently at each occurrence, is a $(C_{1-15})$hydrocarbyl group, unsubstituted or optionally substituted with at least one J, and optionally interrupted or terminated by one to three amine groups, wherein A is divalent, X has valency of 1+m1, and Y has valency of 1+m2, wherein J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, C(O)$CH_2$C(O)R, C(S)R, C(O)OR, OC(O)R, OC(O)OR, C(O)N$(R)_2$, OC(O)N$(R)_2$, C(S)N$(R)_2$, $(CH_2)_{0-2}$NHC(O)R, N(R)N(R)C(O)R, N(R)N(R)C(O)OR, N(R)N(R)C(O)N$(R)_2$, N(R)$SO_2R$, N(R)$SO_2N(R)_2$, N(R)C(O)OR, N(R)C(O)R, N(R)C(S)R, N(R)C(O)N$(R)_2$, N(R)C(S)N$(R)_2$, N(C(O)R)C(O)R, N(OR)R, C(=NH)N$(R)_2$, C(O)N(OR)R, and C(=NOR)R, wherein R is independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J, and wherein each m1 is independently at each occurrence 1 to 5 and each m2 is independently at each occurrence 1 to 5.

Embodiment 17 provides the nanoparticle of any one of Embodiments 1-16, wherein the polymer has the structure:

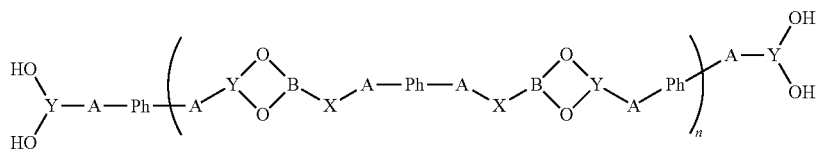

wherein n is about 2 to 10,000,000, wherein each of A, X, and Y, independently at each occurrence, is a $(C_{1-15})$hydrocarbyl group, unsubstituted or optionally substituted with at least one J, and optionally interrupted or terminated by one to three amine groups, wherein A and X are divalent, and Y is trivalent, wherein J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, C(O)CH$_2$C(O)R, C(S)R, C(O)OR, OC(O)R, OC(O)OR, C(O)N(R)$_2$, OC(O)N(R)$_2$, C(S)N(R)$_2$, (CH$_2$)$_{0-2}$NHC(O)R, N(R)N(R)C(O)R, N(R)N(R)C(O)OR, N(R)N(R)C(O)N(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(C(O))R)C(O)R, N(OR)R, C(=NH)N(R)$_2$, C(O)N(OR)R, and C(=NOR)R, wherein R is independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, and wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J.

Embodiment 18 provides the nanoparticle of any one of Embodiments 1-17, wherein the repeating unit has the structure:

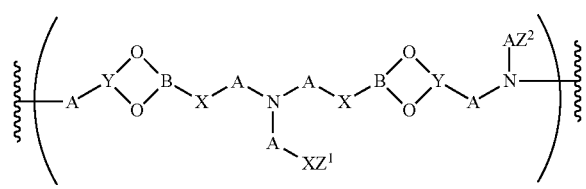

wherein $Z^1$ at each occurrence is independently selected from

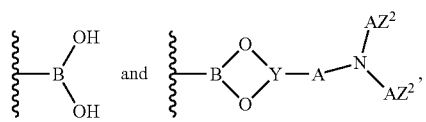

wherein $Z^2$ at each occurrence is independently selected from

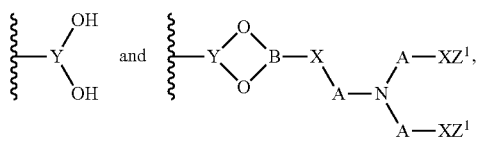

wherein n is about 2 to 10,000,000, wherein each of A, X, and Y, independently at each occurrence, is a $(C_{1-15})$hydrocarbyl group, unsubstituted or optionally substituted with at least one J, and optionally interrupted or terminated by one to three amine groups, wherein A and X are divalent, and Y is trivalent, wherein J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, C(O)CH$_2$C(O)R, C(S)R, C(O)OR, OC(O)R, OC(O)OR, C(O)N(R)$_2$, OC(O)N(R)$_2$, C(S)N(R)$_2$, (CH$_2$)$_{0-2}$NHC(O)R, N(R)N(R)C(O)R, N(R)N(R)C(O)OR, N(R)N(R)C(O)N(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(C(O))R)C(O)R, N(OR)R, C(=NH)N(R)$_2$, C(O)N(OR)R, and C(=NOR)R, wherein R is independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, and wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J.

Embodiment 19 provides the nanoparticle of Embodiment 18, wherein each A independently at each occurrence is a N—(($C_{1-10}$)alkyl)amino($C_{1-10}$)alkyl group.

Embodiment 20 provides the nanoparticle of any one of Embodiments 18-19, wherein each A independently at each occurrence is a divalent N—(($C_{0-10}$)alkyl)formimidoyl group.

Embodiment 21 provides the nanoparticle of any one of Embodiments 18-20, wherein A is a divalent N-ethylformimidoyl group

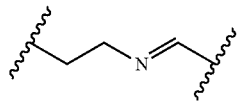

wherein the carbon atom of the formimidoyl group that is doubly bonded to the nitrogen is bonded to the Y or X.

Embodiment 22 provides the nanoparticle of any one of Embodiments 18-21, wherein each Y independently at each occurrence is a trivalent 1-($C_{0-7}$)alkylphenyl group, wherein the phenyl group is hydroxy-bound.

Embodiment 23 provides the nanoparticle of any one of Embodiments 18-22, wherein Y is a trivalent 1,4,5-substituted phenyl group.

Embodiment 24 provides the nanoparticle of any one of Embodiments 18-23, wherein Y is a trivalent 1,4,5-substituted phenyl group, wherein the 1-position is bound to A and the 4- and 5-positions are hydroxy-bound.

Embodiment 25 provides the nanoparticle of any one of Embodiments 18-24, wherein each X independently at each occurrence is a divalent 1-($C_{0-7}$)alkylphenyl group, wherein the phenyl group is boron-bound.

Embodiment 26 provides the nanoparticle of any one of Embodiments 18-25, wherein X is a divalent 1,4-substituted phenyl group.

Embodiment 27 provides the nanoparticle of any one of Embodiments 18-26, wherein A is a divalent N-ethylformimidoyl group wherein the carbon atom of the formimidoyl group that is doubly bonded to the nitrogen is bonded to the Y or X, wherein Y is a trivalent 1,4,5-substituted phenyl group, wherein the 1-position is bound to A and the 4- and 5-positions are hydroxy-bound.

Embodiment 28 provides the nanoparticle of any one of Embodiments 1-27, wherein the polymer has the structure:

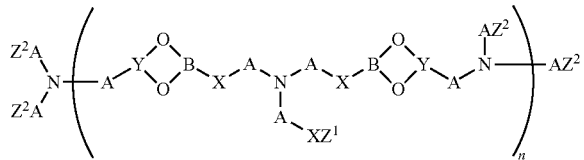

wherein $Z^1$ at each occurrence is independently selected from

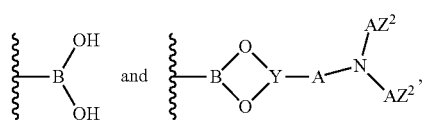

wherein $Z^2$ at each occurrence is independently selected from

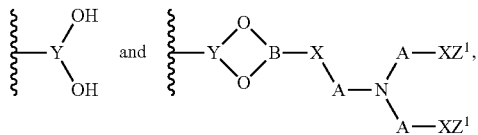

wherein A is a divalent N-ethylformimidoyl group

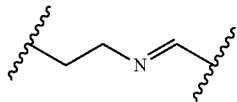 [SMILES: */C=N/CC*]

wherein the carbon atom of the formimidoyl group that is doubly bonded to the nitrogen is bonded to the Y or X, wherein X is a 1,4-divalent phenyl group, and Y is a 1,3,4-trivalent phenyl group, wherein n is about 2 to 10,000,000.

Embodiment 29 provides the nanoparticle of any one of Embodiments 1-28, wherein the nanoparticle is approximately spherical.

Embodiment 30 provides the nanoparticle of any one of Embodiments 1-29, wherein the nanoparticle has a size of about 1 nm to 1000 nm.

Embodiment 31 provides the nanoparticle of any one of Embodiments 1-30, wherein the nanoparticle has a size of about 10 to 300 nm.

Embodiment 32 provides the nanoparticle of any one of Embodiments 1-31, wherein the nanoparticle further comprises at least one encapsulant.

Embodiment 33 provides the nanoparticle of any one of Embodiments 32, wherein the encapsulant comprises a hydrophobic compound.

Embodiment 34 provides the nanoparticle of any one of Embodiments 32-33, wherein the nanoparticle comprises about 0.1 wt % to about 70 wt % of the at least one encapsulant.

Embodiment 35 provides the nanoparticle of any one of Embodiments 32-34, wherein the nanoparticle comprises about 1 wt % to about 40 wt % of the at least one encapsulant.

Embodiment 36 provides the nanoparticle of any one of Embodiments 32-35, wherein at approximately neutral pH conditions, substantially none of the encapsulant is released from the nanoparticle over a time period of at least about 48 hours.

Embodiment 37 provides the nanoparticle of any one of Embodiments 32-36, wherein at pH of about 5 to 6.5 or below, at least some of the encapsulant is released from the nanoparticle.

Embodiment 38 provides the nanoparticle of any one of Embodiments 32-37, wherein in the presence of at least one boronic acid binder, at least some of the encapsulant is released from the nanoparticle.

Embodiment 39 provides the nanoparticle of Embodiment 38, wherein the boronic acid binder comprises a carbohydrate.

Embodiment 40 provides the nanoparticle of any one of Embodiments 38-39, wherein the boronic acid binder comprises glucose.

Embodiment 41 provides the nanoparticle of any one of Embodiments 1-40, wherein the surface of the nanoparticle has a higher proportion of $B(OH)_2$ groups than $Y(OH)_2$ groups.

Embodiment 42 provides the nanoparticle of any one of Embodiments 1-40, wherein the surface of the nanoparticle has a higher proportion of $Y(OH)_2$ functional groups than $B(OH)_2$ groups.

Embodiment 43 provides a surface-functionalized organoboronate nanoparticle, comprising a reaction product of the nanoparticle of Embodiment 41 and a surface-functionalization agent, wherein in the reaction product the surface functionalization agent has reacted with at least one of the —BOH groups on the surface of the nanoparticle to form at least one covalent bond via an oxygen atom to the boron of the —BOH group.

Embodiment 44 provides the surface-functionalized nanoparticle of Embodiment 43, wherein the surface functionalization agent comprises an organic compound comprising at least one hydroxy group.

Embodiment 45 provides the surface-functionalized nanoparticle of any one of Embodiments 43-44, wherein the surface functionalization agent is $(HO)_2Y$-J or $(HO)_2Y$—$R^1$—$R^2$, wherein Y is a divalent or trivalent $(C_{2-15})$hydrocarbyl group, unsubstituted or optionally substituted with at least one J, and optionally interrupted or terminated by one to three amine groups, wherein $R^1$ is $(C_1-C_{10})$hydrocarbyl, optionally interrupted or terminated by one or more amino-groups, optionally unsubstituted or substituted with at least one J, wherein $R^2$ is H, $(C_3-C_{10})$cycloalkyl$(C_0-C_{10})$alkyl, $(C_1-C_{10})$heterocyclyl$(C_0-C_{10})$alkyl, $(C_4-C_{10})$aryl$(C_0-C_{10})$alkyl, or $(C_1-C_{10})$heteroaryl$(C_0-C_{10})$alkyl; wherein each alkyl, cycloalkyl, aryl, heterocyclyl, and heteroaryl is independently unsubstituted or further substituted with at least one J, and wherein J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, $OC(O)N(R)_2$, $C(S)N(R)_2$, $(CH_2)_{0-2}NHC(O)R$, N(R)N(R)C(O)R, N(R)N(R)C(O)OR, N(R)N(R)C(O)N$(R)_2$, $N(R)SO_2R$, $N(R)SO_2N(R)_2$, N(R)C(O)OR, N(R)C(O)R, N(R)C(S)R, $N(R)C(O)N(R)_2$, $N(R)C(S)N(R)_2$, N(C(O)R)C(O)R, N(OR)R, C(=NH)N$(R)_2$, C(O)N(OR)R, and C(=NOR)R, wherein R is independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J.

Embodiment 46 provides the surface-functionalized nanoparticle of Embodiment 41, wherein the surface functionalization agent is

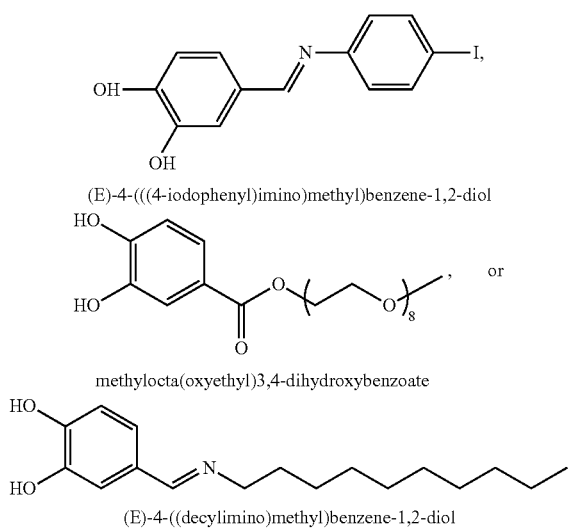

(E)-4-(((4-iodophenyl)imino)methyl)benzene-1,2-diol methylocta(oxyethyl)3,4-dihydroxybenzoate (E)-4-((decylimino)methyl)benzene-1,2-diol Embodiment 47 provides a surface-functionalized organoboronate nanoparticle, comprising a reaction product of the nanoparticle of Embodiment 42 and a surface-functionalization agent, wherein in the reaction product the surface functionalization agent has reacted with at least one of the Y—OH groups on the surface of the nanoparticle to at least one covalent bond via an oxygen atom to the Y of the Y—OH group.

Embodiment 48 provides the surface-functionalized nanoparticle of Embodiment 47, wherein the surface functionalization agent comprises an organic compound comprising at least one B—OH group.

Embodiment 49 provides the surface-functionalized nanoparticle of any one of Embodiments 47-48, wherein the surface functionalization agent is $(HO)_2B-X-R^1-R^2$, wherein X is a divalent $(C_{2-15})$hydrocarbyl group, unsubstituted or optionally substituted with at least one J, and optionally interrupted or terminated by one to three amine groups, wherein $R^1$ is $(C_1-C_{10})$hydrocarbyl, optionally interrupted or terminated by one or more amino-groups, optionally unsubstituted or substituted with at least one J, wherein $R^2$ is H, $(C_3-C_{10})$cycloalkyl$(C_0-C_{10})$alkyl, $(C_1-C_{10})$heterocyclyl$(C_0-C_{10})$alkyl, $(C_4-C_{10})$ aryl$(C_0-C_{10})$alkyl, or $(C_1-C_{10})$heteroaryl $(C_0-C_{10})$alkyl; wherein each alkyl, cycloalkyl, aryl, heterocyclyl, and heteroaryl is independently unsubstituted or further substituted with at least one J, and wherein J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, $S(O)R$, $SO_2R$, $SO_2N(R)_2$, $SO_3R$, C(O)R, C(O)C(O)R, $C(O)CH_2C(O)R$, C(S)R, C(O)OR, OC(O)R, OC(O)OR, $C(O)N(R)_2$, OC(O)N $(R)_2$, $C(S)N(R)_2$, $(CH_2)_{0-2}NHC(O)R$, N(R)N(R)C(O)R, N(R)N(R)C(O)OR, $N(R)N(R)C(O)N(R)_2$, $N(R)SO_2R$, $N(R)$ $SO_2N(R)_2$, N(R)C(O)OR, N(R)C(O)R, N(R)C(S)R, N(R)C (O)N(R)$_2$, $N(R)C(S)N(R)_2$, N(C(O)R)C(O)R, N(OR)R, $C(=NH)N(R)_2$, C(O)N(OR)R, and $C(=NOR)R$, wherein R is independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$ aralkyl, $(C_1-C_{10})$heterocyclyl, $(C_1-C_{10})$heterocyclyl$(C_1-C_{10})$ alkyl, $(C_1-C_{10})$heteroaryl, and $(C_1-C_{10})$heteroaryl$(C_1-C_{10})$ alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J.

Embodiment 50 provides the surface-functionalized nanoparticle of any one of Embodiments 47-49, wherein the surface functionalization agent is

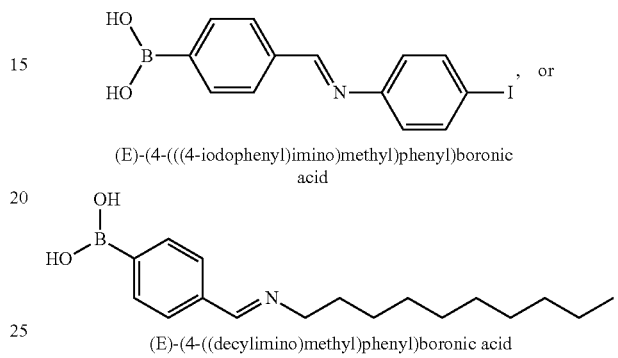

(E)-(4-(((4-iodophenyl)imino)methyl)phenyl)boronic acid (E)-(4-((decylimino)methyl)phenyl)boronic acid Embodiment 51 provides a nanoparticle composition comprising the nanoparticle of any one of Embodiments 1-50.

Embodiment 52 provides a method of making the nanoparticle of any one of Embodiments 1-50, comprising forming a composition comprising a compound having the structure:

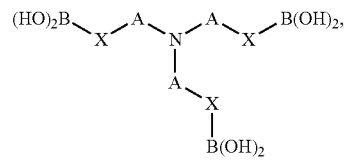

and a compound having the structure:

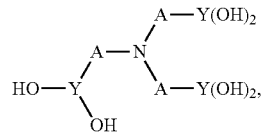

wherein each of A, X, and Y, independently at each occurrence, is a $(C_{1-15})$hydrocarbyl group, unsubstituted or optionally substituted with at least one J, and optionally interrupted or terminated by one to three amine groups, wherein A and X are divalent, and Y is trivalent, wherein J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, $S(O)R$, $SO_2R$, $SO_2N(R)_2$, $SO_3R$, C(O)R, C(O)C(O)R, $C(O)CH_2C(O)R$, C(S)R, C(O) OR, OC(O)R, OC(O)OR, $C(O)N(R)_2$, $OC(O)N(R)_2$, C(S)N $(R)_2$, $(CH_2)_{0-2}NHC(O)R$, N(R)N(R)C(O)R, N(R)N(R)C(O) OR, $N(R)N(R)C(O)N(R)_2$, $N(R)SO_2R$, $N(R)SO_2N(R)_2$, N(R)C(O)OR, N(R)C(O)R, N(R)C(S)R, N(R)C(O)N(R)$_2$, $N(R)C(S)N(R)_2$, N(C(O)R)C(O)R, N(OR)R, $C(=NH)N$ $(R)_2$, C(O)N(OR)R, and $C(=NOR)R$, wherein R is independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, and wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J, and reacting the composition to generate a reaction product thereof comprising the nanoparticle of any one of Embodiments 1-50.

Embodiment 53 provides a method of using the nanoparticle of any one of Embodiments 32-40, comprising: obtaining or providing the nanoparticle of any one of Embodiments 32-40; subjecting the nanoparticle to conditions sufficient to cause at least some of the encapsulant to be released from the nanoparticle.

Embodiment 54 provides an object coated with the nanoparticle of any one of Embodiments 1-50.

Embodiment 55 provides a method of using the nanoparticle of any one of Embodiments 1-50, comprising: obtaining or providing a multiplicity of the nanoparticles of any one of Embodiments 1-50; coating an object with the nanoparticles of any one of Embodiments 1-50.

Embodiment 56 provides the apparatus or method of any one or any combination of Embodiments 1-55 optionally configured such that all elements or options recited are available to use or select from.

What is claimed is:

1. A nanoparticle comprising: a polymer comprising a repeating unit comprising at least one organoboronate functional group.

2. The nanoparticle of claim 1, wherein the polymer is a reaction product of a composition comprising
a compound having the structure:

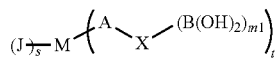

and a compound having the structure:

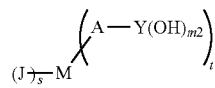

wherein M is independently at each occurrence selected from the group consisting of N, P, and C, wherein at each occurrence s is independently chosen from 0, 1, 2, and 3, at each occurrence t is independently chosen from 1, 2, 3, and 4, and wherein if M=N or P then s+t=3 and if M=C then s+t=4, wherein each of A, X, and Y, independently at each occurrence, is a $(C_{1-5})$hydrocarbyl group, unsubstituted or optionally substituted with at least one J, and optionally interrupted or terminated by one to three amine groups, wherein A is divalent, X has valency of 1+m1, and Y has valency of 1+m2, wherein J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, C(O)$CH_2$C(O)R, C(S)R, C(O)OR, OC(O)R, OC(O)OR, C(O)N(R)_2, OC(O)N(R)_2, C(S)N(R)_2, $(CH_2)_{0-2}$NHC(O)R, N(R)N(R)C(O)R, N(R)N(R)C(O)OR, N(R)N(R)C(O)N(R)_2, N(R)SO_2R, N(R)SO_2N(R)_2, N(R)C(O)OR, N(R)C(O)R, N(R)C(S)R, N(R)C(O)N(R)_2, N(R)C(S)N(R)_2, N(C(O)R)C(O)R, N(OR)R, C(=NH)N(R)_2, C(O)N(OR)R, and C(=NOR)R, wherein R is independently at each occurrence selected from the group consisting of hydrogen, $(C_1-C_{20})$alkyl, $(C_1-C_{10})$cycloalkyl, $(C_1-C_{10})$cycloalkyl$(C_1-C_{10})$alkyl, $(C_1-C_{10})$aryl, $(C_1-C_{10})$aralkyl, $(C_1-C_{10})$heterocyclyl, $(C_1-C_{10})$heterocyclyl$(C_1-C_{10})$alkyl, $(C_1-C_{10})$heteroaryl, and $(C_1-C_{10})$heteroaryl$(C_1-C_{10})$alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J, and wherein each m1 is independently at each occurrence 1 to 5 and each m2 is independently at each occurrence 1 to 5.

3. The nanoparticle of claim 2, wherein each A independently at each occurrence is a N—(($C_{1-10}$)alkyl)amino($C_{1-10}$)alkyl group.

4. The nanoparticle of claim 2, wherein each Y independently at each occurrence is a trivalent 1-($C_{0-7}$)alkylphenyl group, wherein the phenyl group is hydroxy-bound.

5. The nanoparticle of claim 2, wherein each X independently at each occurrence is a divalent 1-($C_{0-7}$)alkylphenyl group, wherein the phenyl group is boron-bound.

6. The nanoparticle of claim 2,
wherein A is a divalent N-ethylformimidoyl group

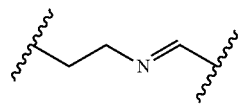 [SMILES: */C=N/CC*]

wherein the carbon atom of the formimidoyl group that is doubly bonded to the nitrogen is bonded to the Y or X,
wherein Y is a trivalent 1,4,5-substituted phenyl group, wherein the 1-position is bound to A and the 4- and 5-positions are hydroxy-bound.

7. The nanoparticle of claim 1, wherein the polymer is a reaction product of a composition comprising
a compound having the structure:

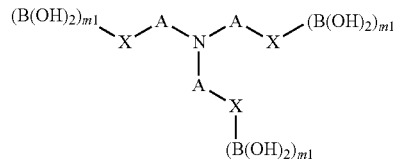

and a compound having the structure:

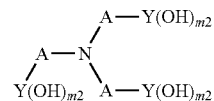

wherein each of A, X, and Y, independently at each occurrence, is a $(C_{1-15})$hydrocarbyl group, unsubstituted or optionally substituted with at least one J, and optionally interrupted or terminated by one to three amine groups, wherein A is divalent, X has valency of 1+m1, and Y has valency of 1+m2, wherein J independently at each occurrence is selected from the group consisting of F, Cl, Br, I, OR, CN, CF$_3$, OCF$_3$, R, O, S, C(O), S(O), methylenedioxy, ethylenedioxy, N(R)$_2$, SR, S(O)R, SO$_2$R, SO$_2$N(R)$_2$, SO$_3$R, C(O)R, C(O)C(O)R, C(O)CH$_2$C(O)R, C(S)R, C(O)OR, OC(O)R, OC(O)OR, C(O)N(R)$_2$, OC(O)N(R)$_2$, C(S)N(R)$_2$, (CH$_2$)$_{0-2}$NHC(O)R, N(R)N(R)C(O)R, N(R)N(R)C(O)OR, N(R)N(R)C(O)N(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(C(O)R)C(O)R, N(OR)R, C(=NH)N(R)$_2$, C(O)N(OR)R, and C(=NOR)R, wherein R is independently at each occurrence selected from the group consisting of hydrogen, (C$_1$-C$_{20}$)alkyl, (C$_1$-C$_{10}$)cycloalkyl, (C$_1$-C$_{10}$)cycloalkyl(C$_1$-C$_{10}$)alkyl, (C$_1$-C$_{10}$)aryl, (C$_1$-C$_{10}$)aralkyl, (C$_1$-C$_{10}$)heterocyclyl, (C$_1$-C$_{10}$)heterocyclyl(C$_1$-C$_{10}$)alkyl, (C$_1$-C$_{10}$)heteroaryl, and (C$_1$-C$_{10}$)heteroaryl(C$_1$-C$_{10}$)alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J, and wherein each m1 is independently at each occurrence 1 to 5 and each m2 is independently at each occurrence 1 to 5.

8. The nanoparticle of claim 1, wherein the polymer is a reaction product of a composition comprising a compound having the structure:

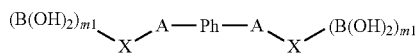

and a compound having the structure:

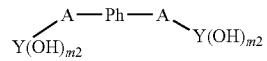

wherein each of A, X, and Y, independently at each occurrence, is a (C$_{1-15}$)hydrocarbyl group, unsubstituted or optionally substituted with at least one J, and optionally interrupted or terminated by one to three amine groups, wherein A is divalent, X has valency of 1+m1, and Y has valency of 1+m2, wherein J independently at each occurrence is selected from the group consisting of F, Cl, Br, I, OR, CN, CF$_3$, OCF$_3$, R, O, S, C(O), S(O), methylenedioxy, ethylenedioxy, N(R)$_2$, SR, S(O)R, SO$_2$R, SO$_2$N(R)$_2$, SO$_3$R, C(O)R, C(O)C(O)R, C(O)CH$_2$C(O)R, C(S)R, C(O)OR, OC(O)R, OC(O)OR, C(O)N(R)$_2$, OC(O)N(R)$_2$, C(S)N(R)$_2$, (CH$_2$)$_{0-2}$NHC(O)R, N(R)N(R)C(O)R, N(R)N(R)C(O)OR, N(R)N(R)C(O)N(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(C(O)R)C(O)R, N(OR)R, C(=NH)N(R)$_2$, C(O)N(OR)R, and C(=NOR)R, wherein R is independently at each occurrence selected from the group consisting of hydrogen, (C$_1$-C$_{20}$)alkyl, (C$_1$-C$_{10}$)cycloalkyl, (C$_1$-C$_{10}$)cycloalkyl(C$_1$-C$_{10}$)alkyl, (C$_1$-C$_{10}$)aryl, (C$_1$-C$_{10}$)aralkyl, (C$_1$-C$_{10}$)heterocyclyl, (C$_1$-C$_{10}$)heterocyclyl(C$_1$-C$_{10}$)alkyl, (C$_1$-C$_{10}$)heteroaryl, and (C$_1$-C$_{10}$)heteroaryl(C$_1$-C$_{10}$)alkyl, wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J, and wherein each m1 is independently at each occurrence 1 to 5 and each m2 is independently at each occurrence 1 to 5.

9. The nanoparticle of claim 8, wherein the repeating unit has the structure:

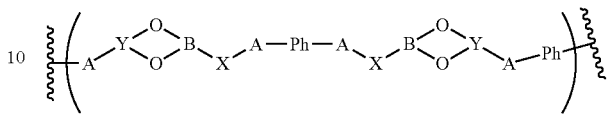

wherein each of A, X, and Y, independently at each occurrence, is a (C$_{1-15}$)hydrocarbyl group, unsubstituted or optionally substituted with at least one J, and optionally interrupted or terminated by one to three amine groups, wherein A and X are divalent, and Y is trivalent, wherein J independently at each occurrence is selected from the group consisting of F, Cl, Br, I, OR, CN, CF$_3$, OCF$_3$, R, O, S, C(O), S(O), methylenedioxy, ethylenedioxy, N(R)$_2$, SR, S(O)R, SO$_2$R, SO$_2$N(R)$_2$, SO$_3$R, C(O)R, C(O)C(O)R, C(O)CH$_2$C(O)R, C(S)R, C(O)OR, OC(O)R, OC(O)OR, C(O)N(R)$_2$, OC(O)N(R)$_2$, C(S)N(R)$_2$, (CH$_2$)$_{0-2}$NHC(O)R, N(R)N(R)C(O)R, N(R)N(R)C(O)OR, N(R)N(R)C(O)N(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(C(O)R)C(O)R, N(OR)R, C(=NH)N(R)$_2$, C(O)N(OR)R, and C(=NOR)R, wherein R is independently at each occurrence selected from the group consisting of hydrogen, (C$_1$-C$_{20}$)alkyl, (C$_1$-C$_{10}$)cycloalkyl, (C$_1$-C$_{10}$)cycloalkyl(C$_1$-C$_{10}$)alkyl, (C$_1$-C$_{10}$)aryl, (C$_1$-C$_{10}$)aralkyl, (C$_1$-C$_{10}$)heterocyclyl, (C$_1$-C$_{10}$)heterocyclyl(C$_1$-C$_{10}$)alkyl, (C$_1$-C$_{10}$)heteroaryl, and (C$_1$-C$_{10}$)heteroaryl(C$_1$-C$_{10}$)alkyl, and wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J.

10. The nanoparticle of claim 1, wherein the repeating unit has the structure:

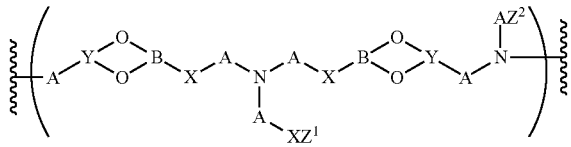

wherein $Z^1$ at each occurrence is independently selected from

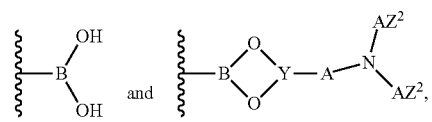

wherein Z² at each occurrence is independently selected from

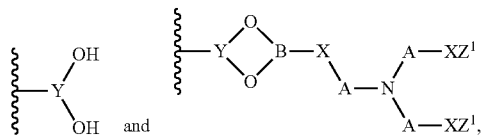

and wherein n is about 2 to 10,000,000,
wherein each of A, X, and Y, independently at each occurrence, is a $(C_{1-15})$hydrocarbyl group, unsubstituted or optionally substituted with at least one J, and optionally interrupted or terminated by one to three amine groups, wherein A and X are divalent, and Y is trivalent,
wherein J independently at each occurrence is selected from the group consisting of F, Cl, Br, I, OR, CN, $CF_3$, $OCF_3$, R, O, S, C(O), S(O), methylenedioxy, ethylenedioxy, $N(R)_2$, SR, S(O)R, $SO_2R$, $SO_2N(R)_2$, $SO_3R$, C(O)R, C(O)C(O)R, C(O)CH$_2$C(O)R, C(S)R, C(O)OR, OC(O)R, OC(O)OR, C(O)N(R)$_2$, OC(O)N(R)$_2$, C(S)N(R)$_2$, $(CH_2)_{0-2}$NHC(O)R, N(R)N(R)C(O)R, N(R)N(R)C(O)OR, N(R)N(R)C(O)N(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(C(O)R)C(O)R, N(OR)R, C(=NH)N(R)$_2$, C(O)N(OR)R, and C(=NOR)R, wherein R is independently at each occurrence selected from the group consisting of hydrogen, $(C_1$-$C_{20})$alkyl, $(C_1$-$C_{10})$cycloalkyl, $(C_1$-$C_{10})$cycloalkyl$(C_1$-$C_{10})$alkyl, $(C_1$-$C_{10})$aryl, $(C_1$-$C_{10})$aralkyl, $(C_1$-$C_{10})$heterocyclyl, $(C_1$-$C_{10})$heterocyclyl$(C_1$-$C_{10})$alkyl, $(C_1$-$C_{10})$heteroaryl, and $(C_1$-$C_{10})$heteroaryl$(C_1$-$C_{10})$alkyl, and wherein each alkyl, cycloalkyl, cycloalkylalkyl, aryl, aralkyl, heterocyclyl, heterocyclylalkyl, heteroaryl, and heteroarylalkyl is independently unsubstituted or substituted with 1-3 J.

11. The nanoparticle of claim 1, wherein the nanoparticle further comprises at least one encapsulant.

12. The nanoparticle of claim 11, wherein at pH of about 5 to 6.5 or below, at least some of the encapsulant is released from the nanoparticle.

13. The nanoparticle of claim 11, wherein the nanoparticle is sufficient such that, in the presence of at least one boronic acid binder, at least some of the encapsulant is released from the nanoparticle.

14. The nanoparticle of claim 1, wherein the surface of the nanoparticle has a higher proportion of B(OH)$_2$ groups than Y(OH)$_2$ groups.

15. The nanoparticle of claim 1, wherein the surface of the nanoparticle has a higher proportion of Y(OH)$_2$ functional groups than B(OH)$_2$ groups.

16. A surface-functionalized organoboronate nanoparticle, comprising a reaction product of the nanoparticle of claim 14 and a surface-functionalization agent, wherein in the reaction product the surface functionalization agent has reacted with at least one of the —BOH groups on the surface of the nanoparticle to form at least one covalent bond via an oxygen atom to the boron of the —BOH group.

17. A surface-functionalized organoboronate nanoparticle, comprising a reaction product of the nanoparticle of claim 15 and a surface-functionalization agent, wherein in the reaction product the surface functionalization agent has reacted with at least one of the —YOH groups on the surface of the nanoparticle to form at least one covalent bond via an oxygen atom to the Y of the —YOH group.

18. A method of using the nanoparticle of claim 11, comprising:
obtaining or providing the nanoparticle of claim 11;
subjecting the nanoparticle to conditions sufficient to cause at least some of the encapsulant to be released from the nanoparticle.

19. A nanoparticle comprising:
a polymer comprising a reaction product of a composition comprising a compound having the structure:

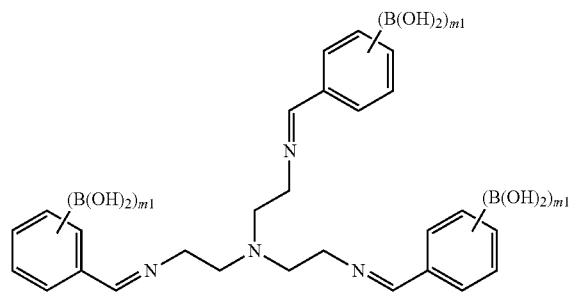

and a compound having the structure:

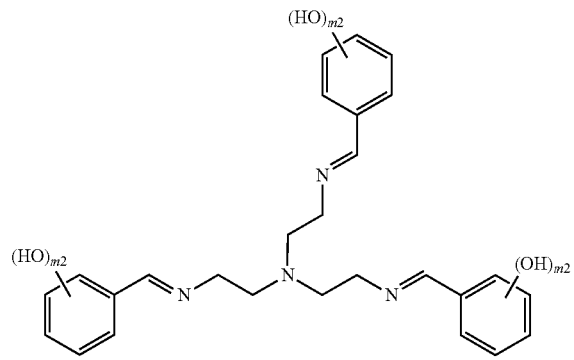

wherein each m1 is independently at each occurrence 1 to 5 and each m2 is independently at each occurrence 1 to 5.

20. A nanoparticle comprising:
a polymer comprising a reaction product of a composition comprising a compound having the structure:

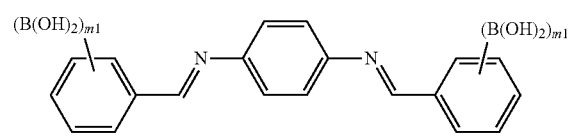

and a compound having the structure:

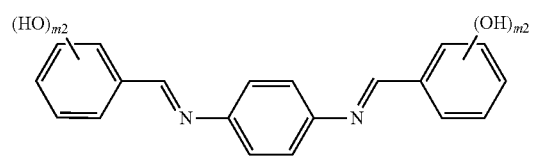

wherein each m1 is independently at each occurrence 1 to 5 and each m2 is independently at each occurrence 1 to 5.

* * * * *

UNITED STATES PATENT AND TRADEMARK OFFICE
CERTIFICATE OF CORRECTION

PATENT NO. : 9,012,584 B2
APPLICATION NO. : 14/206142
DATED : April 21, 2015
INVENTOR(S) : Thayumanavan et al.

It is certified that error appears in the above-identified patent and that said Letters Patent is hereby corrected as shown below:

In the claims

Column 51, line 57, Claim 2, delete "$(C_{1-5})$" and insert --$(C_{1-15})$--, therefor.

Signed and Sealed this
Twenty-seventh Day of October, 2015

Michelle K. Lee
*Director of the United States Patent and Trademark Office*